United States Patent
Lee et al.

(10) Patent No.: US 10,904,638 B2
(45) Date of Patent: Jan. 26, 2021

(54) DEVICE AND METHOD FOR INSERTING ADVERTISEMENT BY USING FRAME CLUSTERING

(71) Applicants: Eleven Street Co., Ltd., Seoul (KR); SK Planet Co., Ltd., Seongnam-si (KR)

(72) Inventors: Su-Bin Lee, Yongin-si (KR); Hyoung-Chul Shin, Seoul (KR); Ju-Hyeun Han, Seoul (KR); Byoung-Ki Jeon, Seoul (KR)

(73) Assignee: Eleven Street Co., Ltd., Seoul (KR)

( * ) Notice: Subject to any disclaimer, the term of this patent is extended or adjusted under 35 U.S.C. 154(b) by 775 days.

(21) Appl. No.: 14/898,450

(22) PCT Filed: Dec. 10, 2014

(86) PCT No.: PCT/KR2014/012159
§ 371 (c)(1),
(2) Date: Dec. 14, 2015

(87) PCT Pub. No.: WO2015/111840
PCT Pub. Date: Jul. 30, 2015

(65) Prior Publication Data
US 2016/0142792 A1    May 19, 2016

(30) Foreign Application Priority Data

Jan. 24, 2014  (KR) .................. 10-2014-0009193
Jan. 24, 2014  (KR) .................. 10-2014-0009194
(Continued)

(51) Int. Cl.
*G06K 9/40*   (2006.01)
*H04N 5/265*  (2006.01)
(Continued)

(52) U.S. Cl.
CPC ....... *H04N 21/812* (2013.01); *G06K 9/00744* (2013.01); *G06K 9/4661* (2013.01);
(Continued)

(58) Field of Classification Search
CPC ........... H04N 21/812; H04N 21/23418; H04N 21/235; H04N 21/854; G06K 9/00744;
(Continued)

(56) References Cited

U.S. PATENT DOCUMENTS 5,107,252 A * 4/1992 Traynar ................. H04N 5/272
                                                           345/173
5,263,933 A * 11/1993 Novacek ................... A61L 2/28
                                                           604/110
(Continued)

FOREIGN PATENT DOCUMENTS

CN      103299610       9/2013
EP      2597621 A1      5/2013
(Continued)

OTHER PUBLICATIONS

Autostitch, Aug. 22, 2015, https://web.archive.org/web/20150822224307/http://matthewalunbrown.com/autostitch/autostitch.html (Year: 2015).*
(Continued)

*Primary Examiner* — Kambiz Abdi
*Assistant Examiner* — Dipen M Patel
(74) *Attorney, Agent, or Firm* — Fenwick & West LLP

(57) ABSTRACT

The present invention is directed to a device and method for inserting an advertisement using frame clustering. According to the present invention, when an advertisement insertion region is set in at least one of the frames of a video, advertisement insertion target frames including advertisement insertion regions are searched for and clustered, and an advertisement is inserted for all the clustered frames in a (Continued)

uniform manner, thereby enabling the natural insertion of the advertisement.

5 Claims, 39 Drawing Sheets

(30) Foreign Application Priority Data

| Jan. 24, 2014 | (KR) | 10-2014-0009195 |
|---|---|---|
| Jan. 24, 2014 | (KR) | 10-2014-0009196 |
| Feb. 6, 2014 | (KR) | 10-2014-0013842 |

(51) Int. Cl.

| G06T 5/00 | (2006.01) |
|---|---|
| G06T 7/00 | (2017.01) |
| G06T 7/20 | (2017.01) |
| H04N 7/00 | (2011.01) |
| H04N 11/02 | (2006.01) |
| H04N 21/81 | (2011.01) |
| H04N 21/234 | (2011.01) |
| H04N 21/854 | (2011.01) |
| H04N 21/235 | (2011.01) |
| G11B 27/28 | (2006.01) |
| G11B 27/036 | (2006.01) |
| G06K 9/00 | (2006.01) |
| G06K 9/46 | (2006.01) |
| G06K 9/52 | (2006.01) |
| G06K 9/62 | (2006.01) |
| G06T 7/60 | (2017.01) |

(52) U.S. Cl.
CPC ............. *G06K 9/52* (2013.01); *G06K 9/6215* (2013.01); *G06K 9/6218* (2013.01); *G06T 7/20* (2013.01); *G06T 7/60* (2013.01); *G11B 27/036* (2013.01); *G11B 27/28* (2013.01); *H04N 21/235* (2013.01); *H04N 21/23418* (2013.01); *H04N 21/854* (2013.01); *G06K 2009/4666* (2013.01)

(58) Field of Classification Search
CPC ...... G06K 9/4661; G06K 9/52; G06K 9/6215; G06K 9/6218; G06K 2009/4666; G06T 7/20; G06T 7/60; G11B 27/036; G11B 27/02
See application file for complete search history.

(56) References Cited

U.S. PATENT DOCUMENTS

| 5,436,672 | A | * | 7/1995 | Medoni | H04N 5/272 |
| | | | | | 348/169 |
| 5,731,846 | A | * | 3/1998 | Kreitman | H04N 5/2628 |
| | | | | | 348/581 |
| 5,751,838 | A | * | 5/1998 | Cox | G06K 9/209 |
| | | | | | 348/155 |
| 6,181,345 | B1 | * | 1/2001 | Richard | H04N 5/272 |
| | | | | | 345/419 |
| 6,297,853 | B1 | * | 10/2001 | Sharir | G01S 3/7864 |
| | | | | | 348/153 |
| 6,987,520 | B2 | | 1/2006 | Criminisi et al. | |
| 7,199,793 | B2 | * | 4/2007 | Oh | G06T 15/205 |
| | | | | | 345/419 |
| 7,375,745 | B2 | * | 5/2008 | Rai | H04N 5/23238 |
| | | | | | 348/218.1 |
| 8,374,457 | B1 | * | 2/2013 | Wang | G06T 5/002 |
| | | | | | 382/266 |
| 8,717,412 | B2 | * | 5/2014 | Linder | G03B 37/00 |
| | | | | | 348/222.1 |
| 2002/0008697 | A1 | * | 1/2002 | Deering | G06T 5/20 |
| | | | | | 345/418 |
| 2006/0026628 | A1 | * | 2/2006 | Wan | H04N 5/272 |
| | | | | | 725/32 |
| 2007/0014554 | A1 | | 1/2007 | Sasaki et al. | |
| 2007/0092145 | A1 | * | 4/2007 | Shimizu | H04N 5/23248 |
| | | | | | 382/233 |
| 2007/0182861 | A1 | * | 8/2007 | Luo | G11B 27/28 |
| | | | | | 348/700 |
| 2008/0255943 | A1 | | 10/2008 | Morten et al. | |
| 2009/0167763 | A1 | * | 7/2009 | Waechter | G06T 17/005 |
| | | | | | 345/426 |
| 2010/0074548 | A1 | * | 3/2010 | Pan | G06T 5/004 |
| | | | | | 382/260 |
| 2010/0111396 | A1 | * | 5/2010 | Boucheron | G06K 9/6231 |
| | | | | | 382/133 |
| 2010/0296571 | A1 | * | 11/2010 | El-Saban | H04N 21/44012 |
| | | | | | 375/240.01 |
| 2012/0180084 | A1 | * | 7/2012 | Huang | G06T 19/006 |
| | | | | | 725/32 |
| 2013/0162787 | A1 | * | 6/2013 | Cho | H04N 13/30 |
| | | | | | 348/51 |
| 2016/0267349 | A1 | * | 9/2016 | Shoaib | G06T 5/50 |
| 2018/0167610 | A1 | * | 6/2018 | Park | H04N 19/513 |

FOREIGN PATENT DOCUMENTS

| JP | 2011055378 A | 3/2011 | |
| KR | 1019977001969 A | 7/2000 | |
| KR | 1020020047271 A | 6/2002 | |
| KR | 1020030002919 A | 1/2003 | |
| KR | 1020060105910 A | 10/2006 | |
| KR | 1020070088528 A | 8/2007 | |
| KR | 1020070115348 A | 12/2007 | |
| KR | 1020080004548 A | 1/2008 | |
| KR | 1020090007401 * | 1/2009 | ............... G06T 5/00 |
| KR | 100886149 B1 | 2/2009 | |
| KR | 1020100015479 A | 2/2010 | |
| KR | 1020100056549 A | 5/2010 | |
| KR | 1020100084075 A | 7/2010 | |
| KR | 1020100088282 A | 8/2010 | |
| KR | 1020100101397 A | 9/2010 | |
| KR | 1020120011216 A | 2/2012 | |
| KR | 1020130104215 A | 3/2012 | |
| KR | 1020120071226 A | 7/2012 | |
| KR | 1020120131425 A | 12/2012 | |
| KR | 1020130047846 A | 5/2013 | |
| KR | 1020130056407 A | 5/2013 | |
| KR | 1020130056532 A | 5/2013 | |
| KR | 1020130089715 A | 8/2013 | |
| KR | 101353038 B1 | 1/2014 | |
| WO | 95025399 A1 | 9/1995 | |
| WO | 2006105660 A1 | 10/2006 | |
| WO | 2008111860 A1 | 9/2008 | |
| WO | 2009032993 A2 | 3/2009 | |
| WO | 2012011180 A1 | 1/2012 | |

OTHER PUBLICATIONS

Richard Szeliski, Image Alignment and Stitching: A Tutorial, Jan. 26, 2005, Microsoft Research Microsoft Research Corporation, pp. 1-10, https://courses.cs.washington.edu/courses/cse576/05sp/papers/MSR-TR-2004-92.pdf (Year: 2005).*

Ardis, P. A. (2009). Controlling and evaluating inpainting with attentional models (Order No. 3395371). Available from ProQuest Dissertations and Theses Professional. (89170326). Retrieved from https://dialog.proquest.com/professional/docview/89170326?accountid=131444 (Year: 2009).*

International Search Report dated Feb. 5, 2015 for PCT/KR2014/012159.

Chinese Office Action in Chinese Application No. 201480033739.0, dated Dec. 4, 2017, 10 pages (with English translation).

* cited by examiner $$E = \frac{aS \times bT}{cA \times dC \times eF \times fD \times gV}$$

FIG. 12

DEVICE AND METHOD FOR INSERTING ADVERTISEMENT BY USING FRAME CLUSTERING

TECHNICAL FIELD

The present invention relates to a device and method for inserting an advertisement using frame clustering, and more particularly to a device and method for inserting an advertisement using frame clustering, which search for and cluster advertisement insertion target frames including advertisement insertion regions and then insert the advertisement for the clustered frames in a uniform manner.

The present invention claims the benefits of the filing dates of Korean Patent Application No. 10-2014-0009193 filed on Jan. 24, 2014, Korean Patent Application No. 10-2014-0009194 filed on Jan. 24, 2014, Korean Patent Application No. 10-2014-0009195 filed on Jan. 24, 2014, Korean Patent Application No. 10-2014-0009196 filed on Jan. 24, 2014, and Korean Patent Application No. 10-2014-0013842 filed on Feb. 6, 2014, in the Korean Patent and Trademark Office, this application is the PCT U.S. National Phase entry of International Application No. PCT/KR2014/012159 filed on Dec. 10, 2014, the content of which is incorporated herein in their entirety.

BACKGROUND ART

With the development of digital signal processing technology, virtual advertising that inserts a virtual image into a video has been popularized, and indirect advertising has established itself as an effective advertising means. Accordingly, interest in virtual indirect advertising that combines a virtual advertisement with an indirect advertisement and that naturally inserts an advertisement image into a previously generated video has been rapidly increasing.

Unlike in the case of virtual advertising, in the case of virtual indirect advertising, naturally inserting an advertisement image into an existing video is a more important issue because the disturbance of content occurs when a user easily recognizes that the advertisement image has been artificially inserted. In particular, when advertisement images are not presented in a uniform manner throughout video, serious inconvenience is caused to a user who is viewing the video in that the concentration of the user is dispersed and so on.

Conventional advertisement insertion technology is merely technology for replacing a specific pattern in a continuous image, and does not disclose and suggest a configuration for inserting an advertisement for all frames in a uniform manner.

Accordingly, there is an urgent need for new technology that, in order to insert an advertisement for all frames in a uniform manner, searches for and clusters advertisement insertion target frames including advertisement insertion regions, and inserts the advertisement in a uniform manner using a clustering factor, i.e., the result of the comparison between an advertisement insertion region in a reference frame and advertisement insertion regions in other frames.

Furthermore, there is an urgent need for new technology for the insertion of a virtual indirect advertisement that determines candidate regions into which a virtual indirect advertisement will be inserted, that measures the exposure levels of the candidate regions, and that provides the measured exposure levels to a user, thereby providing guide information so that the user can select a virtual indirect advertisement insertion region while more intuitively recognizing the advertising effects of the respective candidate regions.

Furthermore, there is an urgent need for new virtual indirect advertisement service technology that can minimize an inpainting region when directly indicating markers at a shooting spot, determining a region into which a virtual indirect advertisement will be inserted using the markers and eliminating the markers, and that can perform inpainting.

Furthermore, there is an urgent need for new virtual indirect advertising service technology that can minimize an inpainting region when inserting a virtual indirect advertisement in place of an existing advertisement into video image content, and that can perform inpainting.

DISCLOSURE

Technical Problem

An object of the present invention is to search for and cluster advertisement insertion target frames including advertisement insertion regions and then insert an advertisement for the clustered frames in a uniform manner, thereby enabling the advertisement to be more naturally inserted.

Furthermore, an object of the present invention is to insert the advertisement in a uniform manner using a clustering factor, i.e., the result of the comparison between an advertisement insertion region in a reference frame and advertisement insertion regions in other frames, thereby automatically inserting the advertisement into a plurality of frames only through the insertion of the advertisement into a single frame.

Furthermore, an object of the present invention is to extract only portions including advertisement insertion regions from frames and cluster the extracted portions, thereby enabling more rapid clustering.

Furthermore, an object of the present invention is to determine candidate regions into which a virtual indirect advertisement will be inserted, measure the exposure levels of the candidate regions, and provide the measured exposure levels to a user, thereby providing guide information so that the user can select a virtual indirect advertisement insertion region while more intuitively recognizing the advertising effects of the respective candidate regions.

Furthermore, an object of the present invention is to provide corresponding candidate region-related information to a user only when the level of a candidate region into which a virtual indirect advertisement will be inserted exceeds a level equal to or higher than a predetermined value, thereby providing guide information so that a virtual indirect advertisement insertion region can be more rapidly selected.

Furthermore, an object of the present invention is to provide a total exposure level, calculated by assigning weights based on various measurement criteria, such as the size, time, angle and location in, for, at and at which a virtual indirect advertisement is exposed, the speed at which a virtual indirect advertisement moves in a screen, the size of a region which is covered with another object, and the frequency at which a virtual indirect advertisement is covered with another object, to a user, thereby providing guide information so that a virtual indirect advertisement insertion region can be efficiently selected based on the advertising effects of respective candidate regions.

Furthermore, an object of the present invention is to insert a virtual indirect advertisement using markers inserted into video image content and perform inpainting on a marker region, thereby performing processing to achieve harmonization with a surrounding image.

Furthermore, an object of the present invention is to perform inpainting on only the region of a marker region which does not overlap an insertion region for a virtual indirect advertisement, thereby reducing the operation costs required for inpainting.

Furthermore, an object of the present invention is to reduce the operation costs required for inpainting, thereby maximizing advertising profits from a virtual indirect advertisement.

Furthermore, an object of the present invention is to insert a virtual indirect advertisement in place of an existing advertisement into video image content and perform inpainting on an existing advertisement region, thereby performing processing to achieve harmonization with a surrounding image.

Furthermore, an object of the present invention is to automatically calculate the boundary region pixel value of a virtual indirect advertisement that is inserted into video image content and perform processing so that a boundary line within which the virtual indirect advertisement has been inserted can harmonize with a surrounding image.

Furthermore, an object of the present invention is to calculate a boundary region pixel value after mixing a foreground pixel value and a background pixel value based on the distances by which the location of the boundary region pixel of a virtual indirect advertisement which will be inserted into video image content is spaced apart from a foreground pixel and a background pixel, thereby performing processing so that a boundary line within which a virtual indirect advertisement has been inserted can harmonize with a surrounding image.

Furthermore, an object of the present invention is to automatically calculate a boundary region pixel value by referring to the pixel values of frames previous and subsequent to a current frame into which a virtual indirect advertisement has been inserted, thereby performing processing so that a boundary line within which a virtual indirect advertisement has been inserted can harmonize with a surrounding image during the playback of video.

Technical Solution

In order to accomplish the above objects, the present invention provides a device for inserting an advertisement using frame clustering, including: a frame search unit configured to, when an advertisement insertion region is set in at least one of frames of a video, search for advertisement insertion target frames including advertisement insertion regions; a clustering unit configured to group the advertisement insertion target frames, select any one of the advertisement insertion target frames as a reference frame, compare an advertisement insertion region in the reference frame with advertisement insertion regions in advertisement insertion target frames other than the reference frame, calculate a value of a difference with the reference frame as a clustering factor, and perform clustering; and an advertisement insertion unit configured to, when an advertisement is inserted into at least one of the clustered frames, insert the advertisement for all the clustered frames in a uniform manner.

In this case, inserting in the uniform manner may insert the advertisement by applying the clustering factor to each of the clustered frames.

In this case, the clustering unit may include: a scene structure analysis unit configured to analyze the scene structure of the advertisement insertion region; a camera motion analysis unit configured to analyze the camera motion of the advertisement insertion region; and a clustering factor calculation unit configured to calculate the clustering factor using the scene structure and the camera motion.

In this case, the clustering factor calculation unit may select a frame in which the advertisement insertion region has been set as the reference frame, may compare an advertisement insertion region in the reference frame with advertisement insertion regions in advertisement insertion target frames other than the reference frame, and may calculate the value of a difference with the reference frame as the clustering factor.

In this case, the clustering factor calculation unit may compare the scene structure and the camera motion in the reference frame with scene structures and camera motions in the advertisement insertion target frames other than the reference frame.

In this case, the scene structure analysis unit may acquire any one or more of the location, size, rotation and perspective of the advertisement insertion region.

In this case, the camera motion analysis unit may acquire any one or more of the focus and shaking of the advertisement insertion region.

In this case, the clustering factor calculation unit may determine global movement between successive frames with respect to the clustered frames, and may calculate the clustering factor based on the result of the determination of the global movement.

In this case, the clustering unit may extract only portions including the advertisement insertion regions from the respective advertisement insertion target frames, and may cluster the extracted portions.

In this case, the clustering unit may cluster frames successive from the reference frame.

In this case, the frame search unit may determine global movement of the successive frames, and may search for the advertisement insertion target frames based on the result of the determination of the global movement.

In this case, the frame search unit may predict the location of the advertisement insertion region in any one or more of previous and subsequent frames using the result of the determination of the global movement, and may search for the advertisement insertion target frames.

In this case, the advertisement insertion unit may perform inpainting on the advertisement insertion region.

In this case, the reference frame may be the frame which is selected by the user when any one or more of advertisement insertion target frames are visually displayed to the user.

In this case, the reference frame may the frame of advertisement insertion target frames which has the widest advertisement insertion region.

Furthermore, the present invention provides a method of inserting an advertisement using frame clustering, including: when an advertisement insertion region is set in at least one of frames of a video, searching for advertisement insertion target frames including advertisement insertion regions; grouping the advertisement insertion target frames, selecting any one of the advertisement insertion target frames as a reference frame, comparing an advertisement insertion region in the reference frame with advertisement insertion regions in advertisement insertion target frames other than the reference frame, calculating a value of a difference with the reference frame as a clustering factor, and performing clustering; and, when an advertisement is inserted into at least one of the clustered frames, inserting the advertisement for all the clustered frames in a uniform manner.

In this case, inserting in the uniform manner may insert the advertisement by applying the clustering factor to each of the clustered frames.

In this case, performing the clustering may include: analyzing the scene structure of the advertisement insertion region; analyzing the camera motion of the advertisement insertion region; and calculating the clustering factor using the scene structure and the camera motion.

In this case, calculating the clustering factor may include selecting a frame in which the advertisement insertion region has been set as the reference frame, comparing an advertisement insertion region in the reference frame with advertisement insertion regions in advertisement insertion target frames other than the reference frame, and calculating the value of a difference with the reference frame as the clustering factor.

In this case, calculating the clustering factor may include comparing the scene structure and the camera motion in the reference frame with scene structures and camera motions in the advertisement insertion target frames other than the reference frame.

Furthermore, in order to accomplish the above objects, the present invention provides a device for providing insertion region guide information for the insertion of a virtual indirect advertisement, including: a candidate region determination unit configured to determine a candidate region into which a virtual indirect advertisement will be inserted in video image content; an advertisement insertion unit configured to process the virtual indirect advertisement and insert the processed virtual indirect advertisement into the candidate region; an exposure measurement unit configured to measure the exposure level of the virtual indirect advertisement based on exposure characteristics in which the virtual indirect advertisement is exposed in the video image content; and an information provision unit configured to provide insertion region guide information including the exposure level of the virtual indirect advertisement to a user.

In this case, the information provision unit may determine whether the exposure level of the virtual indirect advertisement exceeds a preset reference exposure level, and may provide the insertion region guide information including the exposure level of the virtual indirect advertisement to the user if the exposure level of the virtual indirect advertisement exceeds the preset reference exposure level.

In this case, the information provision unit may display any one or more of a candidate region into which the virtual indirect advertisement has been inserted and a candidate region which is present before the insertion of the virtual indirect advertisement.

In this case, the device for providing insertion region guide information for the insertion of a virtual indirect advertisement may further include an advertising expense calculation unit configured to calculate the advertising expenses of the virtual indirect advertisement based on the exposure level, and the information provision unit may display the advertising expenses to the user.

In this case, the advertisement insertion unit may include: an advertisement selection unit configured to select the virtual indirect advertisement which will be inserted into the candidate region; an advertisement processing unit configured to process the virtual indirect advertisement based on a preliminary processing characteristic so that the virtual indirect advertisement can be inserted into the candidate region; and a processed advertisement insertion unit configured to insert the processed virtual indirect advertisement into the candidate region.

In this case, the exposure characteristics may include a real-time characteristic which is measured in real time while the virtual indirect advertisement is being exposed in the video image content, and the preliminary processing characteristic.

In this case, the exposure measurement unit may include a size measurement unit configured to measure the exposure level in proportion to the ratio of the size of the exposed region of the virtual indirect advertisement which is exposed in the video image content to the size of the overall screen.

In this case, the exposure measurement unit may include a time measurement unit configured to measure the exposure level in proportion to the time for which the virtual indirect advertisement is exposed in the video image content.

In this case, the exposure measurement unit may include a deformation measurement unit configured to measure the exposure level in inverse proportion to the difference between the angle at which the virtual indirect advertisement is exposed in the video image content and a preset reference angle.

In this case, the exposure measurement unit may include a covered size measurement unit configured to measure the exposure level in inverse proportion to the size of the portion of the virtual indirect advertisement which is covered with another object while the virtual indirect advertisement is being exposed in the video image content.

In this case, the exposure measurement unit may include a frequency measurement unit configured to measure the exposure level in proportion to the frequency at which the virtual indirect advertisement is covered with another object while the virtual indirect advertisement is being exposed in the video image content.

In this case, the exposure measurement unit may include a covered size measurement unit configured to measure the exposure level in the proximity of the virtual indirect advertisement to the center of the screen.

In this case, the exposure measurement unit may include a speed measurement unit configured to measure the exposure level in proportion to the speed at which the virtual indirect advertisement moves within the screen while the virtual indirect advertisement is being exposed in the video image content.

In this case, the exposure measurement unit may calculate a total exposure level by collecting the exposure levels measured based on the exposure characteristics, and the advertising expense calculation unit may calculate the advertising expenses in proportion to the total exposure level.

Furthermore, the present invention provides a method of providing insertion region guide information for the insertion of a virtual indirect advertisement, including: determining a candidate region into which a virtual indirect advertisement will be inserted in video image content; processing the virtual indirect advertisement, and inserting the processed virtual indirect advertisement into the candidate region; measuring the exposure level of the virtual indirect advertisement based on exposure characteristics in which the virtual indirect advertisement is exposed in the video image content; and providing insertion region guide information including the exposure level of the virtual indirect advertisement to a user.

In this case, providing the insertion region guide information may include determining whether the exposure level of the virtual indirect advertisement exceeds a preset reference exposure level, and providing the insertion region guide information, including the exposure level of the virtual indirect advertisement, to the user if the exposure level of the virtual indirect advertisement exceeds the reference exposure level.

In this case, providing the insertion region guide information may include any one or more of a candidate region into which the virtual indirect advertisement has been inserted and a candidate region which is present before the insertion of the virtual indirect advertisement to the user.

In this case, the method of providing insertion region guide information for the insertion of a virtual indirect advertisement may further include calculating the advertising expenses of the virtual indirect advertisement based on the exposure level, and providing the insertion region guide information may include displaying the advertising expenses to the user.

In this case, processing and inserting the virtual indirect advertisement may include: selecting the virtual indirect advertisement which will be inserted into the candidate region; processing the virtual indirect advertisement based on a preliminary processing characteristic so that the virtual indirect advertisement can be inserted into the candidate region; and inserting the processed virtual indirect advertisement into the candidate region.

In this case, the exposure characteristics may include a real-time characteristic which is measured in real time while the virtual indirect advertisement is being exposed in the video image content, and the preliminary processing characteristic.

Furthermore, in order to accomplish the above objects, the present invention provides a device for inserting an advertisement, including: a marker recognition unit configured to recognize markers included in the frames of a video; a region determination unit configured to determine a marker region corresponding to the markers, an insertion region into which a virtual indirect advertisement will be inserted, and a marker elimination region using the marker region and the insertion region; a marker elimination unit configured to perform inpainting on only the marker elimination region; and an advertisement insertion unit configured to insert the virtual indirect advertisement into the insertion region after the inpainting of the marker elimination region.

In this case, the region determination unit may divide the marker region into an inpainting region and a non-inpainting region, and may determine the inpainting region to be the marker elimination region.

In this case, the region determination unit may determine whether each marker pixel within the marker region is present in the insertion region, and may determine marker pixels, not present in the insertion region, to be the inpainting region.

In this case, the region determination unit may determine whether each marker pixel within the marker region is present in the insertion region, and may determine marker pixels, present in the insertion region, to be the non-inpainting region.

In this case, the region determination unit may generate an insertion boundary region including pixels forming the insertion boundary, and may include part of the insertion boundary region in the inpainting region.

In this case, the region determination unit may determine whether each of the pixels forming the boundary of the insertion region is present within a preset distance from the boundary of the insertion region, may determine a region composed of pixels present within a preset distance to be the insertion boundary region, and may determine the marker elimination region by considering the insertion boundary region.

In this case, the region determination unit may determine whether each of the pixels within the insertion boundary region is present in the marker region and the insertion region, and may include pixels, present in the marker region and the insertion region, in the inpainting region.

In this case, the marker elimination unit may include: an image separation unit configured to divide an image corresponding to the inpainting region into a structure image and a texture image; a structure inpainting unit configured to generate a processed structure image by performing inpainting on the structure image in such a manner that a pixel proximate to the periphery of the inpainting region diffuses into the inpainting region along a line of an equal gray value; a texture synthesis unit configured to generate a processed texture image by performing texture synthesis on the texture image; and an image synthesis unit configured to synthesize the processed structure image with the processed texture image.

In this case, the marker elimination unit may include: a patch segmentation unit configured to divide a region, excluding the inpainting region and the inpainting region, into unit patches; a patch selection unit configured to select the most consistent patch from a region, excluding the inpainting region, with respect to each patch of the inpainting region; and a patch synthesis unit configured to synthesize each patch of the inpainting region with the selected patch.

In this case, the marker elimination unit may perform inpainting from a unit region corresponding to the periphery of the inpainting region in an internal direction.

In this case, the region determination unit may generate a marker boundary region including pixels forming the marker boundary, and may include part of the marker boundary region in the inpainting region.

In this case, the region determination unit may determine whether each of pixels forming the boundary of the marker region is present within a preset distance from the boundary of the marker region, may determine a region composed of pixels, present within the preset distance, to be the marker boundary region, and may determine the marker elimination region by considering the marker boundary region.

In this case, the region determination unit may determine whether each of pixels within the marker boundary region is present in the marker region and the insertion region, and may include pixels, not present in the marker region and the insertion region, in the inpainting region.

Furthermore, the present invention provides a method of eliminating markers for the insertion of a virtual indirect advertisement, including: recognizing markers included in the frames of a video; determining a marker region corresponding to the markers, an insertion region into which a virtual indirect advertisement will be inserted, and a marker elimination region using the marker region and the insertion region; performing inpainting on only the marker elimination region; and inserting the virtual indirect advertisement into the insertion region after the inpainting of the marker elimination region.

In this case, determining the marker elimination region may include dividing the marker region into an inpainting region and a non-inpainting region, and determining the inpainting region to be the marker elimination region.

In this case, determining the marker elimination region may include determining whether each marker pixel within the marker region is present in the insertion region, and determining marker pixels, not present in the insertion region, to be the inpainting region.

In this case, determining the marker elimination region may include determining whether each marker pixel within the marker region is present in the insertion region, and determining marker pixels, present in the insertion region, to be the non-inpainting region.

In this case, determining the marker elimination region may include generating an insertion boundary region including pixels forming the insertion boundary, and including part of the insertion boundary region in the inpainting region.

In this case, determining the marker elimination region may include determining whether each of the pixels forming the boundary of the insertion region is present within a preset distance from the boundary of the insertion region, determining a region composed of pixels present within a preset distance to be the insertion boundary region, and determining the marker elimination region by considering the insertion boundary region.

In this case, determining the marker elimination region may include determining whether each of the pixels within the insertion boundary region is present in the marker region and the insertion region, and including pixels, present in the marker region and the insertion region, in the inpainting region.

Furthermore, in order to accomplish the above objects, the present invention provides a device for calculating a boundary value for the insertion of a virtual indirect advertisement, including: a region determination unit configured to determine a boundary region including the boundary pixels of a virtual indirect advertisement inserted into a frame of a video; a reference pixel selection unit configured to, with respect to each boundary region pixel within the boundary region, select a foreground reference pixel and a background reference pixel from a remaining region other than the boundary region by considering a location of the boundary region pixel; and a boundary value calculation unit configured to calculate a value of the boundary region pixel using pixel values of the foreground reference pixel and the background reference pixel and weights of the foreground reference pixel and the background reference pixel.

In this case, the region determination unit may divide a remaining region other than the boundary region into a foreground region and a background region corresponding to the virtual indirect advertisement; and the reference pixel selection unit may include: a foreground reference pixel selection unit configured to select one of the pixels of the foreground region, which is closest to the boundary region pixel, to be the foreground reference pixel; and a background reference pixel selection unit configured to select one of the pixels of the background region, which is closest to the boundary region pixel, to be the background reference pixel.

In this case, a reference pixel selection unit may include: a previous frame reference pixel selection unit configured to, with respect to each boundary region pixel within the boundary region, select a previous frame reference pixel from a frame previous to the video frame by considering a location of the boundary region pixel; and a subsequent frame reference pixel selection unit configured to select a subsequent frame reference pixel from a frame subsequent to the video frame; and the boundary value calculation unit may calculate the boundary region pixel value further using the pixel values of the previous frame reference pixel and the subsequent frame reference pixel and the weights of the previous frame reference pixel and the subsequent frame reference pixel.

In this case, the reference pixel selection unit may select a pixel, corresponding to the location of the boundary region pixel in the previous frame, as the previous frame reference pixel, and may select a pixel, corresponding to the location of the boundary region pixel in the subsequent frame, as the subsequent frame reference pixel.

In this case, the boundary value calculation unit may set the weight of the foreground reference pixel based on the distance between the boundary region pixel and the foreground reference pixel, and may set the weight of the background reference pixel based on the distance between the boundary region pixel and the background reference pixel.

In this case, the boundary value calculation unit may set the weights of the foreground reference pixel and the background reference pixel in inverse proportion to the distance to the boundary region pixel.

In this case, the region determination unit may determine whether each of the pixels of the frame of the video is present within a preset distance from the boundary pixel, and may determine a region, composed of pixels present within the preset distance, to be a boundary region.

In this case, the region determination unit may set the preset distance by considering the overall resolution of the video frame.

In this case, the region determination unit may set a longer preset distance for the higher overall resolution of the frame of the video.

In this case, the reference pixel selection unit may further include a perpendicular line generation unit configured to generate a perpendicular line between the boundary region pixel and the boundary line of the remaining region; the foreground reference pixel selection unit may select one of the pixels of the foreground region, corresponding to the foot of the perpendicular line, which is closest to a boundary region pixel, as the foreground reference pixel; and the background reference pixel selection unit may select one of the pixels of the background region, corresponding to the foot of the perpendicular line, which is closest to the boundary region pixel, as the background reference pixel.

Furthermore, the present invention provides a method of calculating a boundary value for the insertion of a virtual indirect advertisement, including: determining a boundary region including boundary pixels of a virtual indirect advertisement inserted into a frame of a video; with respect to each boundary region pixel within the boundary region, selecting a foreground reference pixel and a background reference pixel from a remaining region other than the boundary region by considering the location of the boundary region pixel; and calculating a value of the boundary region pixel using pixel values of the foreground reference pixel and the background reference pixel and weights of the foreground reference pixel and the background reference pixel.

In this case, the method of calculating a boundary value for the insertion of a virtual indirect advertisement may further include dividing a remaining region other than the boundary region into a foreground region and a background region corresponding to the virtual indirect advertisement; and selecting the foreground reference pixel and the background reference pixel may include selecting one of the pixels of the foreground region, which is closest to the boundary region pixel, to be the foreground reference pixel, and selecting one of the pixels of the background region, which is closest to the boundary region pixel, to be the background reference pixel.

In this case, the method of calculating a boundary value for the insertion of a virtual indirect advertisement may further include, with respect to each boundary region pixel within the boundary region, selecting a previous frame reference pixel from a frame previous to the video frame by considering a location of the boundary region pixel, and selecting a subsequent frame reference pixel from a frame subsequent to the video frame; and calculating boundary region pixel value may include calculating the boundary region pixel value further using the pixel values of the previous frame reference pixel and the subsequent frame reference pixel and the weights of the previous frame reference pixel and the subsequent frame reference pixel.

In this case, selecting the previous frame reference pixel and the subsequent frame reference pixel may include selecting a pixel, corresponding to the location of the boundary region pixel in the previous frame, as the previous frame reference pixel, and selecting a pixel, corresponding to the location of the boundary region pixel in the subsequent frame, as the subsequent frame reference pixel.

In this case, calculating the boundary region pixel value may include setting the weight of the foreground reference pixel based on the distance between the boundary region pixel and the foreground reference pixel, and setting the weight of the background reference pixel based on the distance between the boundary region pixel and the background reference pixel.

In this case, calculating the boundary region pixel value may include setting the weights of the foreground reference pixel and the background reference pixel in inverse proportion to the distance to the boundary region pixel.

In this case, determining the boundary region may include determining whether each of the pixels of the frame of the video is present within a preset distance from the boundary pixel, and determining a region, composed of pixels present within the preset distance, to be a boundary region.

In this case, determining the boundary region may include setting the preset distance by considering the overall resolution of the video frame.

In this case, determining the boundary region may include setting a longer preset distance for the higher overall resolution of the frame of the video.

In this case, the method of calculating a boundary value for the insertion of a virtual indirect advertisement may further include generating a perpendicular line between the boundary region pixel and the boundary line of the remaining region; selecting as the foreground reference pixel may include selecting one of the pixels of the foreground region, corresponding to the foot of the perpendicular line, which is closest to a boundary region pixel, as the foreground reference pixel; and selecting as the background reference pixel may include selecting one of the pixels of the background region, corresponding to the foot of the perpendicular line, which is closest to the boundary region pixel, as the background reference pixel.

Advantageous Effects

According to the present invention, advertisement insertion target frames including advertisement insertion regions are searched for and clustered and then an advertisement is inserted for the clustered frames in a uniform manner, thereby enabling the advertisement to be more naturally inserted.

Furthermore, the present invention inserts the advertisement in a uniform manner using a clustering factor, i.e., the result of the comparison between an advertisement insertion region in a reference frame and advertisement insertion regions in other frames, thereby automatically inserting the advertisement into a plurality of frames only through the insertion of the advertisement into a single frame.

Furthermore, the present invention extracts only portions including advertisement insertion regions from frames and clusters the extracted portions, thereby enabling more rapid clustering.

Furthermore, the present invention determines candidate regions into which a virtual indirect advertisement will be inserted, measures the exposure levels of the candidate regions, and provides the measured exposure levels to a user, thereby providing guide information so that the user can select a virtual indirect advertisement insertion region while more intuitively recognizing the advertising effects of the respective candidate regions.

Furthermore, the present invention provides corresponding candidate region-related information to a user only when the level of a candidate region into which a virtual indirect advertisement will be inserted exceeds a level equal to or higher than a predetermined value, thereby enabling a virtual indirect advertisement insertion region to be more rapidly selected.

Furthermore, the present invention provides a total exposure level, calculated by assigning weights based on various measurement criteria, such as the size, time, angle and location in, for, at and at which a virtual indirect advertisement is exposed, the speed at which a virtual indirect advertisement moves in a screen, the size of a region which is covered with another object, and the frequency at which a virtual indirect advertisement is covered with another object, to a user, thereby enabling a virtual indirect advertisement insertion region to be efficiently selected based on the advertising effects of respective candidate regions.

Furthermore, the present invention inserts a virtual indirect advertisement using markers inserted into video image content and performs inpainting on a marker region, thereby performing processing to achieve harmonization with a surrounding image.

Furthermore, the present invention performs inpainting on only the region of a marker region which does not overlap an insertion region for a virtual indirect advertisement, thereby reducing the operation costs required for inpainting.

Furthermore, the present invention reduces the operation costs required for inpainting, thereby maximizing advertising profits from a virtual indirect advertisement.

Furthermore, according to the present invention, a virtual indirect advertisement is inserted into video image content in place of an existing advertisement, and inpainting is performed on an existing advertisement region, thereby performing processing to achieve harmonization with a surrounding image.

Furthermore, according to the present invention, the boundary region pixel value of a virtual indirect advertisement that is inserted into video image content can be automatically calculated, and processing can be performed so that a boundary line within which the virtual indirect advertisement has been inserted can harmonize with a surrounding image.

Furthermore, the present invention calculates a boundary region pixel value after mixing a foreground pixel value and a background pixel value based on the distances by which the location of the boundary region pixel of a virtual indirect advertisement which will be inserted into video image content is spaced apart from a foreground pixel and a background pixel, thereby performing processing so that a boundary line within which a virtual indirect advertisement has been inserted can harmonize with a surrounding image.

Furthermore, the present invention automatically calculates a boundary region pixel value by referring to the pixel values of frames previous and subsequent to a current frame into which a virtual indirect advertisement has been inserted, thereby performing processing so that a boundary line within which a virtual indirect advertisement has been inserted can harmonize with a surrounding image during the playback of video.

DESCRIPTION OF DRAWINGS

FIG. 12 is an equation showing an example of an equation computed by the exposure measurement unit shown in FIG. 9;

FIG. 17 is a block diagram showing an example of the inpainting unit shown in FIG. 26;

FIG. 18 is a block diagram showing another example of the inpainting unit shown in FIG. 26;

MODE FOR INVENTION

Figure 1:
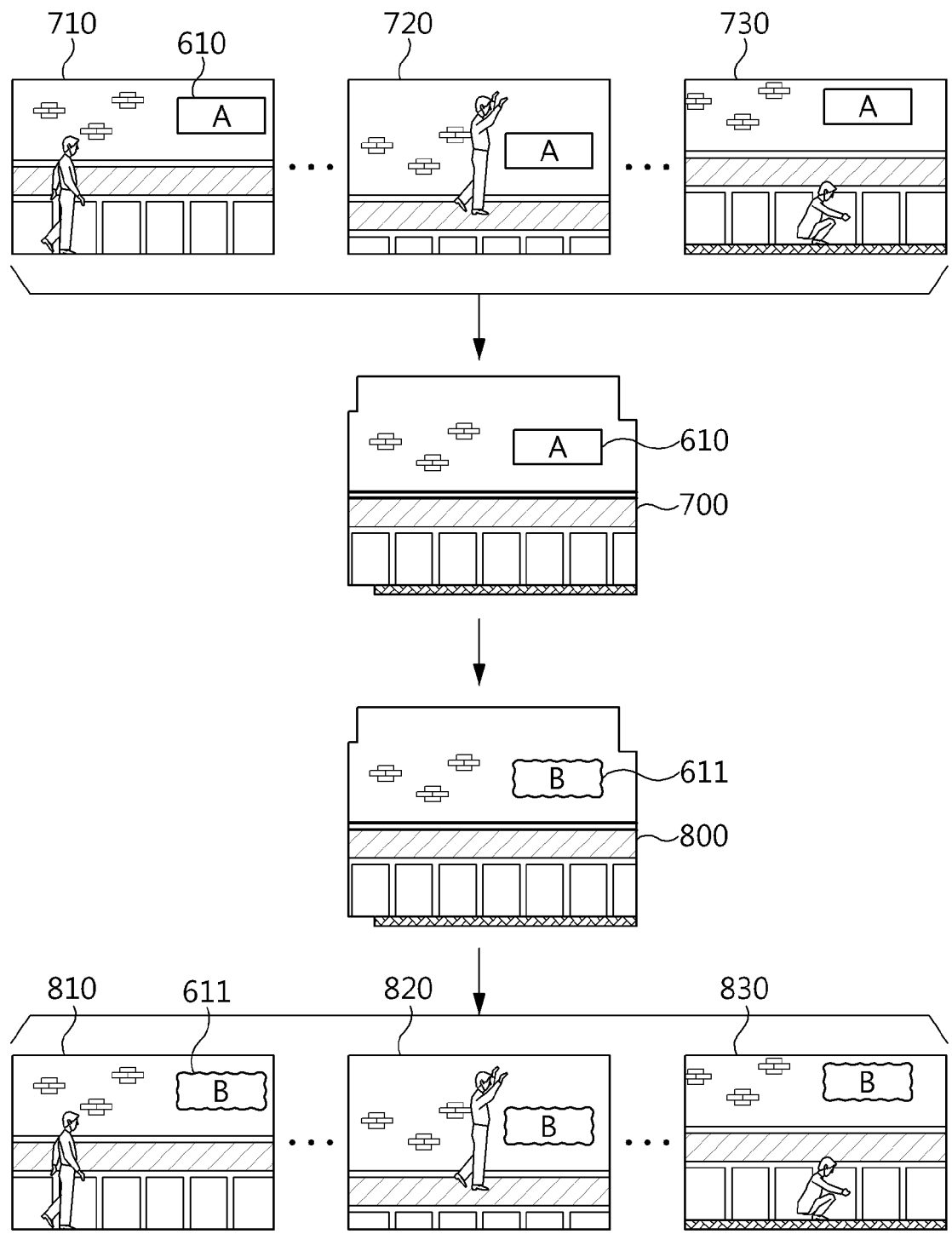
FIG. 1 is a diagram showing an overall method of inserting an advertisement using frame clustering the present invention.

Preferred embodiments of the present invention will be described in detail below with reference to the accompanying drawings. However, detailed descriptions of well-known functions and configurations that may make the gist of the present invention unnecessarily obscure will be omitted in the following description and the attached drawings. Furthermore, it should be noted that the same components are designated by the same reference symbols throughout the drawings as much as possible.

The terms and words used in the following specification and the claims should not be restrictively interpreted as having common and dictionary meanings, but should be interpreted as having meanings and concepts in conformity with the technical spirit of the present invention based on the principle that an inventor can appropriately define the concepts of terms in order to describe his or her invention in the best way. Accordingly, since the embodiments described in the present specification and the configurations shown in the drawings merely correspond to the preferred embodiments of the present invention and do not cover all the technical spirit of the present invention, it should be appreciated that there may be various equivalents and modifications that may replace the configurations at the time at which the present application is filed. Furthermore, the terms "first," "second" and so on are used to describe various components, and are intended to distinguish one component from other components but are not intended to limit these components.

A device for inserting an advertisement using frame clustering according to a preferred embodiment of the present invention is provided by a processor, a memory unit, and a user interface.

The processor receives a plurality of successive frames, stores the plurality of successive frames in the memory unit, and inserts an advertisement related to the plurality of successive video frames stored in the memory unit.

Furthermore, the memory unit stores various types of information including the processing program of the processor.

Furthermore, the user interface receives various types of information from a user, and provides the information to the processor.

FIG. 1 is a diagram showing an overall method of inserting an advertisement using frame clustering the present invention.

Referring to FIG. 1, the method of inserting an advertisement using frame clustering according to the present invention performs clustering by performing target search on advertisement insertion target frames 710, 720 and 730 including advertisement insertion regions 610.

In this case, the method of inserting an advertisement using frame clustering according to the present invention displays a stitching frame 700, i.e., the result of the stitching of the advertisement insertion target frames 710, 720 and 730, to the user as the result of the performance of clustering.

In this case, the method of inserting an advertisement using frame clustering according to the present invention, when a user inserts an advertisement into the stitching frame 700, inserts the advertisement into all the advertisement insertion target frames 710, 720 and 730, acquired by clustering regions 611 into which the advertisement has been inserted, in a uniform manner while displaying the result 800 that the advertisement has been inserted into the stitching frame 700, thereby acquiring frames 810, 820 and 830 into which the advertisement has been inserted.

As described above, it can be seen that in the method of inserting an advertisement using frame clustering according to the present invention, advertisement insertion target frames including advertisement insertion regions are searched for, the advertisement insertion target frames are clustered, and an advertisement is inserted for all the clustered frames in a uniform manner, thereby enabling the more natural insertion of the advertisement.

Figure 2:
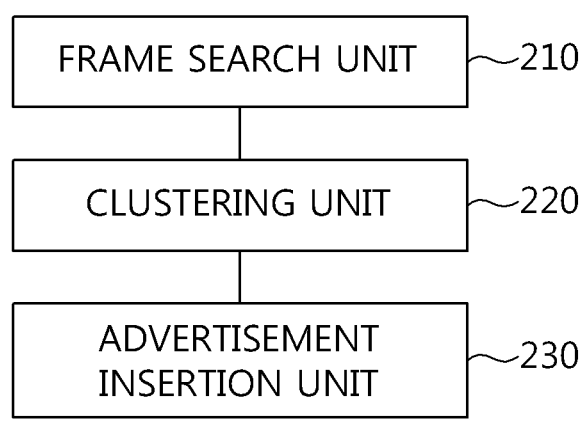
FIG. 2 is a block diagram showing a device for inserting an advertisement using frame clustering according to an embodiment of the present invention.

FIG. 2 is a block diagram showing a device for inserting an advertisement using frame clustering according to an embodiment of the present invention.

Referring to FIG. 2, the device for inserting an advertisement using frame clustering according to an embodiment of the present invention includes a frame search unit 210, a clustering unit 220, and an advertisement insertion unit 230.

The frame search unit 210 searches for advertisement insertion target frames including advertisement insertion regions when an advertisement insertion region is set in at least one of the frames of a video.

In this case, the frame search unit 210 may extract a feature point from a reference frame, and may acquire advertisement insertion target frames using the feature point.

In this case, the feature point may be extracted using the Kanade-Lucas-Tomasi Feature Tracker (KLT).

In this case, the reference frame may be the frame of advertisement insertion target frames in which the user has set an advertisement insertion region.

In this case, the reference frame may be the frame which is selected by the user when any one or more of advertisement insertion target frames are visually displayed to the user.

In this case, the reference frame may the frame of advertisement insertion target frames which has the widest advertisement insertion region.

In this case, the frame search unit 210 may determine the global movement of successive frames, and may search for advertisement insertion target frames based on the result of the determination of the global movement.

In this case, the frame search unit 210 may predict the locations of advertisement insertion regions in any one or more of previous and subsequent frames using the result of the determination of the global movement, and search for the advertisement insertion target frames.

The clustering unit 220 groups advertisement insertion target frames, calculates a clustering factor for the advertisement insertion target frames, and clusters the advertisement insertion target frames.

In this case, the clustering unit 220 may detects a homography matrix using the feature points of the advertisement insertion target frames, and may perform clustering using the homography matrix so that the advertisement insertion target frames are stitched together with respect to a single frame.

In this case, the feature points may be extracted using the Kanade-Lucas-Tomasi Feature Tracker (KLT).

In this case, the homography matrix may be detected using the RANSAC process.

In this case, the RANSAC process follows the following sequence:

1. Four arbitrary feature points between two frames are selected.

2. Homography matrix H that satisfies a relationship, such as that of the following Equation 1, between the four feature points is calculated:

$$x' = Hx \qquad (1)$$

-continued $$\begin{pmatrix} x' \\ y' \\ 1 \end{pmatrix} = \begin{pmatrix} h_1 & h_2 & h_3 \\ h_4 & h_5 & h_6 \\ h_7 & h_8 & h_9 \end{pmatrix} \begin{pmatrix} x \\ y \\ 1 \end{pmatrix}$$

$$x' = \frac{h_1 x + h_2 y + h_3}{h_7 x + h_8 y + h_9} \quad y' = \frac{h_4 x + h_5 y + h_6}{h_7 x + h_8 y + h_9}$$

In this case, (x, y) is the feature point of a first frame, and (x', y') is the feature point of a second frame. In Equation 1, H is a homography matrix. In the case of a two dimensional (2D) image, H may be represented as a 3*3 matrix.

3. For all the feature points, $d_h = \sqrt{(P_2^K - HP_1^K)^2}$ is calculated, where $P_1$ is the feature point of the first frame, $P_2$ is the feature point of the second frame and k is the number of feature points. In this case, although $P_2 = HP_1$ in accordance with Equation 1, an error may occur in the calculation of H, and thus the same value is not calculated for $P_2$ and $HP_1$. $d_k$ denotes an error between $P_2$ and $HP_1$.

4. The number of points where $d_k$ is equal to or lower than a predetermined value is denoted as $NI_i$.

5. Steps 1 to 4 are performed a predetermined number of times.

6. Final homography matrix H is obtained by recalculating H using feature points when $NI_i$ is maximum.

As described above, in the RANSAC process, H is calculated by repeatedly selecting an arbitrary feature point a predetermined number of times, and H when $NI_i$, i.e., the number of points where $d_k$ is equal to or lower than a predetermined value, is maximum is determined to be the homography matrix of the present invention.

In this case, the clustering unit 220 may analyze the scene structures of the advertisement insertion regions, may analyze the camera motions of the advertisement insertion regions, and may calculate a clustering factor using the scene structures and the camera motions.

In this case, the clustering unit 220 may select any one of the advertisement insertion target frames as a reference frame, may compare the advertisement insertion region of the reference frame with the advertisement insertion regions of advertisement insertion target frames other than the reference frame, and may calculate the value of a difference with the reference frame as the clustering factor.

In this case, the clustering unit 220 may compare the scene structure and the camera motion in the reference frame with the scene structures and the camera motions in the advertisement insertion target frames other than the reference frame.

In this case, the clustering unit 220 may acquire any one or more of location, size, rotation and perspective of each of the advertisement insertion regions.

In this case, the clustering unit 220 may acquire any one or more of the focus and shaking of each of the advertisement insertion regions.

In this case, the clustering unit 220 may determine global movement between successive frames for the clustered frames, and may calculate the clustering factor based on the result of the determination of the global movement.

In this case, the clustering unit 220 extracts only a portion including an advertisement insertion region from each of the advertisement insertion target frames, and then may perform clustering.

In this case, the clustering unit 220 may cluster frames successive from the reference frame.

The advertisement insertion unit 230 inserts an advertisement for all the clustered frames in a uniform manner when the advertisement is inserted into at least one of the clustered frames.

In this case, the integrated insertion may refer to inserting the advertisement by applying the clustering factor to each of the clustered frames.

In this case, the advertisement insertion unit 230 may separate the advertisement using the inverse matrix of the homography matrix after the insertion of the advertisement when the advertisement insertion target frames are stitched together with respect to a single frame.

In this case, the advertisement insertion unit 230 may perform inpainting on the advertisement insertion regions.

In this case, the advertisement insertion unit 230 may insert a virtual image into the advertisement insertion regions.

Figure 3:
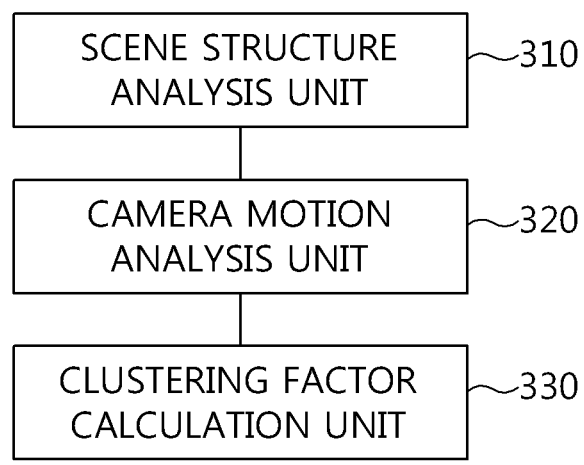
FIG. 3 is a block diagram showing an example of the clustering unit shown in FIG. 1.

FIG. 3 is a block diagram showing an example of the clustering unit 220 shown in FIG. 1.

Referring to FIG. 3, the clustering unit 220 shown in FIG. 1 includes a scene structure analysis unit 310, a camera motion analysis unit 320, and a clustering factor calculation unit 330.

The scene structure analysis unit 310 analyzes the scene structures of the advertisement insertion regions.

In this case, the scene structure analysis unit 310 may acquire any one or more of the location, size, rotation and perspective of each of the advertisement insertion regions.

The camera motion analysis unit 320 analyzes the camera motions of the advertisement insertion regions.

In this case, the camera motion analysis unit 320 may acquire any one or more of the focus and shaking of each of the advertisement insertion regions.

The clustering factor calculation unit 330 may calculate a clustering factor using the scene structures and the camera motions.

In this case, the clustering factor calculation unit 330 may select any one of the advertisement insertion target frames as a reference frame, may compare the advertisement insertion region in the reference frame with the advertisement insertion regions in advertisement insertion target frames other than the reference frame, and may calculate the value of a difference with the reference frame as the clustering factor.

In this case, the clustering factor calculation unit 330 may compare the scene structure and the camera motion in the reference frame with the scene structures and the camera motions in the advertisement insertion target frames other than the reference frame.

In this case, the clustering factor calculation unit 330 may determine global movement between successive frames with respect to the clustered frames, and may calculate the clustering factor based on the result of the determination of the global movement.

Figure 4:
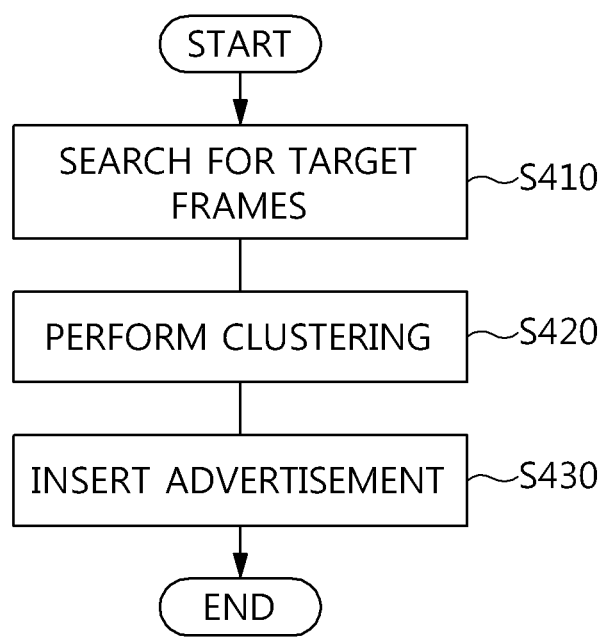
FIG. 4 is an operation flowchart showing a method of inserting an advertisement using frame clustering according to an embodiment of the present invention.

FIG. 4 is an operation flowchart showing a method of inserting an advertisement using frame clustering according to an embodiment of the present invention.

Referring to FIG. 4, in the method of inserting an advertisement using frame clustering according to an embodiment of the present invention, when an advertisement insertion region is set in at least one of the frames of a video, advertisement insertion target frames including advertisement insertion regions are searched for at step S410.

In this case, at step S410, advertisement insertion target frames may be searched for in frames successive from a reference frame.

In this case, at step S410, a feature point may be detected from the reference frame, and advertisement insertion target frames may be acquired using the feature point.

In this case, the feature point may be detected using the Kanade-Lucas-Tomasi Feature Tracker (KLT).

In this case, the reference frame may be the frame of advertisement insertion target frames in which a user has set an advertisement insertion region.

In this case, the reference frame may be the frame which visually displays any one or more of advertisement insertion target frames to the user and has been selected by the user.

In this case, the reference frame may the frame of advertisement insertion target frames which has the widest advertisement insertion region.

In this case, at step S410, the global movement of successive frames may be determined, and advertisement insertion target frames may be searched for based on the result of the determination of the global movement.

In this case, at step S410, the locations of advertisement insertion regions may be predicted in any one or more of previous and subsequent frames using the result of the determination of the global movement, and advertisement insertion target frames may be searched for.

Furthermore, in the method of inserting an advertisement using frame clustering according to an embodiment of the present invention, the advertisement insertion target frames are grouped, a clustering factor is calculated for the advertisement insertion target frames, and the advertisement insertion target frames are clustered at step S420.

In this case, at step S420, a homography matrix may be detected using the feature points of the advertisement insertion target frames, and clustering may be performed using the homography matrix so that the advertisement insertion target frames are stitched together with respect to a single frame.

In this case, the feature points may be extracted using the Kanade-Lucas-Tomasi Feature Tracker (KLT).

In this case, the homography matrix may be detected using the RANSAC process.

In this case, the RANSAC process follows the following sequence:

1. Four arbitrary feature points between two frames are selected.
2. Homography matrix H that satisfies a relationship, such as that of the above Equation 1, between the four feature points is calculated.
3. For all the feature points, $d_h = \sqrt{(P_2{}^K - HP_1{}^K)^2}$ is calculated, where $P_1$ is the feature point of the first frame, $P_2$ is the feature point of the second frame, and k is the number of feature points. In this case, although $P_2 = HP_1$ in accordance with Equation 1, an error may occur in the calculation of H, and thus the same value is not calculated for $P_2$ and $HP_1$. $d_k$ denotes an error between $P_2$ and $HP_1$.
4. The number of points where $d_k$ is equal to or lower than a predetermined value is denoted as $NI_i$.
5. Steps 1 to 4 are performed a predetermined number of times.
6. Final homography matrix H is obtained by recalculating H using feature points when $NI_i$ is maximum.

As described above, in the RANSAC process, H is calculated by repeatedly selecting an arbitrary feature point a predetermined number of times, and H when $NI_i$, i.e., the number of points where $d_k$ is equal to or lower than a predetermined value, is maximum is determined to be the homography matrix of the present invention.

In this case, at step S420, the scene structures of the advertisement insertion regions may be analyzed, the camera motions of the advertisement insertion region may be analyzed, and a clustering factor may be calculated using the scene structures and the camera motions.

In this case, at step S420, any one of the advertisement insertion target frames may be selected as a reference frame, the advertisement insertion region of the reference frame may be compared with the advertisement insertion regions of advertisement insertion target frames other than the reference frame, and the value of a difference with the reference frame may be calculated as the clustering factor.

In this case, at step S420, the scene structure and the camera motion in the reference frame may be compared with the scene structures and the camera motions in the advertisement insertion target frames other than the reference frame In this case, at step S420, any one or more of location, size, rotation and perspective of each of the advertisement insertion regions may be acquired.

In this case, at step S420, any one or more of the focus and shaking of each of the advertisement insertion regions may be acquired.

In this case, at step S420, global movement between successive frames may be determined for the clustered frames, and the clustering factor may be calculated based on the result of the determination of the global movement.

In this case, at step S420, only a portion including an advertisement insertion region may be extracted from each of the advertisement insertion target frames, and then clustering may be performed.

In this case, at step S420, frames successive from the reference frame may be clustered.

In the method of inserting an advertisement using frame clustering according to an embodiment of the present invention, when the advertisement is inserted into at least one of the clustered frames, an advertisement is inserted for all the clustered frames in a uniform manner at step S430.

In this case, at step S430, when the advertisement insertion target frames are stitched together with respect to a single frame, the advertisement may be separated using the inverse matrix of the homography matrix after the insertion of the advertisement.

In this case, at step S430, inpainting may be performed on the advertisement insertion regions.

In this case, at step S430, a virtual image may be inserted into the advertisement insertion regions.

Figure 5:
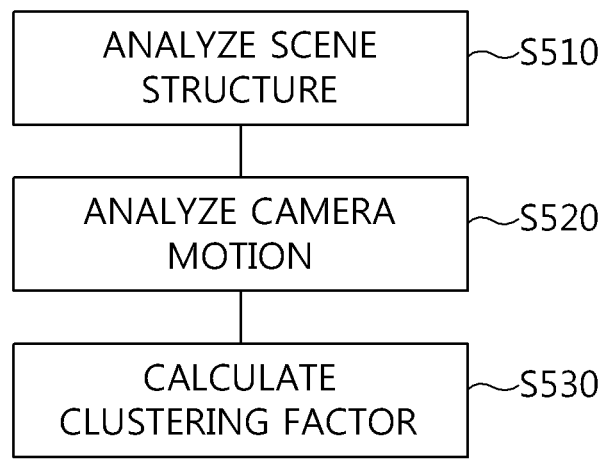
FIG. 5 is an operation flowchart showing an example of the clustering step shown in FIG. 4.

FIG. 5 is an operation flowchart showing an example of clustering step S420 shown in FIG. 4.

Referring to FIG. 5, in clustering step S420 shown in FIG. 4, the scene structures of the advertisement insertion regions are analyzed at step S510.

In this case, at step S510, any one or more of the location, size, rotation and perspective of each of the advertisement insertion regions may be acquired.

Furthermore, in clustering step S420 shown in FIG. 4, the camera motions of the advertisement insertion regions are analyzed at step S520.

In this case, at step S520, any one or more of the focus and shaking of each of the advertisement insertion regions may be acquired.

Furthermore, in clustering step S420 shown in FIG. 4, a clustering factor is calculated using the scene structures and the camera motions at step S530.

In this case, at step S530, any one of the advertisement insertion target frames may be selected as a reference frame, the advertisement insertion region in the reference frame may be compared with the advertisement insertion regions in advertisement insertion target frames other than the reference frame, and the value of a difference with the reference frame may be calculated as the clustering factor.

In this case, at step S530, the scene structure and the camera motion in the reference frame may be compared with the scene structures and the camera motions in the advertisement insertion target frames other than the reference frame.

In this case, at step S530, global movement between successive frames may be determined for the clustered frames, and the clustering factor may be calculated based on the result of the determination of the global movement.

Figure 6:
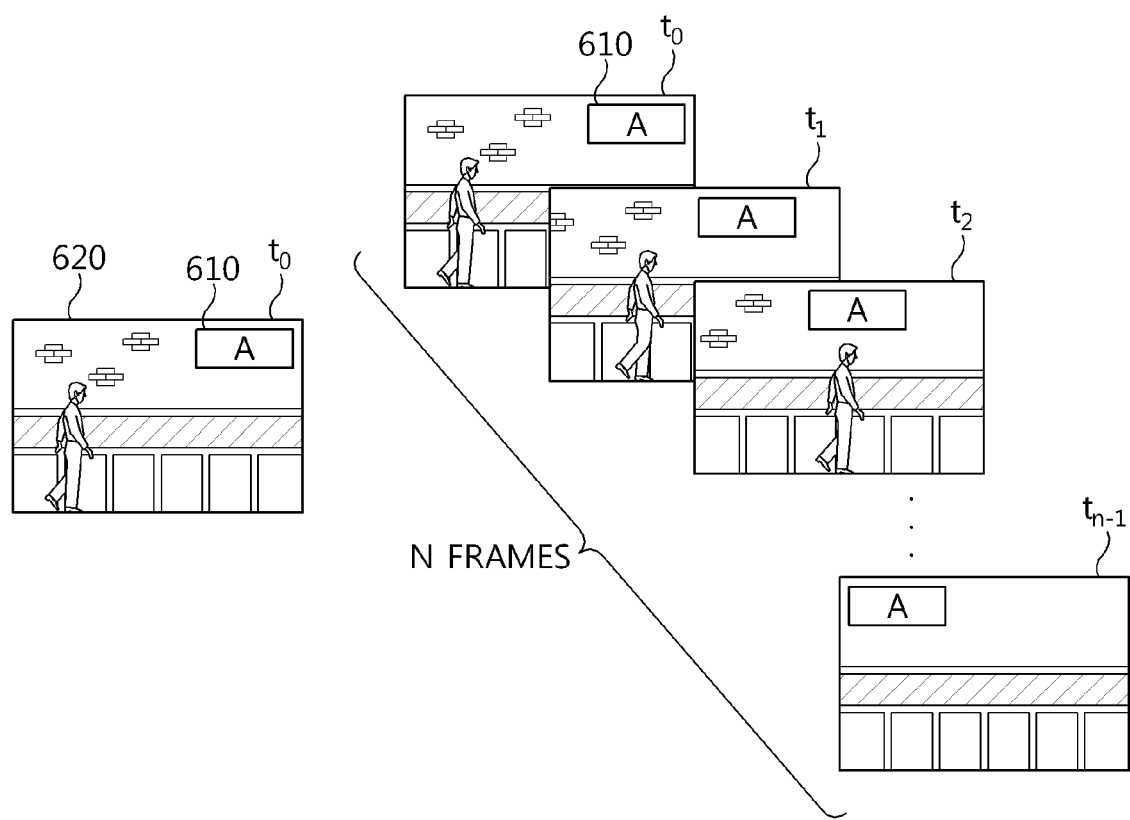
FIG. 6 is a diagram showing examples of a reference frame and frame clustering according to present invention.

FIG. 6 is a diagram showing examples of a reference frame 620 and frame clustering according to present invention.

Referring to FIG. 6, in a method of inserting an advertisement using frame clustering according to the present invention, advertisement insertion target frames $t_0$ to $t_{n-1}$ including advertisement insertion regions 610 may be searched for in video frames.

In this case, in the method of inserting an advertisement using frame clustering according to the present invention, any one of the advertisement insertion target frames $t_0$ to $t_{n-1}$ may be made a reference frame 620 for the performance of clustering.

For example, in the method of inserting an advertisement using frame clustering according to the present invention, the earliest one $t_0$ of the advertisement insertion target frames $t_0$ to $t_{n-1}$ may be made the reference frame 620.

In this case, in the method of inserting an advertisement using frame clustering according to the present invention, the advertisement insertion region 610 in the reference frame 620 may be compared with the advertisement insertion regions 610 in the advertisement insertion target frames $t_1$ to $t_{n-1}$ other than the reference frame 620, and the value of a difference with the reference frame may be calculated as a clustering factor.

For example, in the method of inserting an advertisement using frame clustering according to the present invention, the advertisement insertion region 610 in the reference frame 620 may be compared with the advertisement insertion regions 610 in the advertisement insertion target frames $t_1$ to $t_{n-1}$ other than the reference frame 620, and the relative locations of the advertisement insertion regions 610 in the advertisement insertion target frames $t_1$ to $t_{n-1}$ may be acquired and made the clustering factor.

In the method of inserting an advertisement using frame clustering according to the present invention, although not shown in FIG. 6, the frame of n advertisement insertion target frames $t_0$ to $t_{n-1}$ in which a user has set the advertisement insertion region 610 may be made the reference frame 620.

Furthermore, in the method of inserting an advertisement using frame clustering according to the present invention, any one or more of the advertisement insertion target frames $t_0$ to $t_{n-1}$ may be visually displayed to the user, and a frame selected by the user may be made the reference frame 620.

In the method of inserting an advertisement using frame clustering according to the present invention, a frame having an advertisement insertion region 610 that is the widest of the advertisement insertion target frames $t_0$ to $t_{n-1}$ may be made the reference frame 620.

Figure 7:
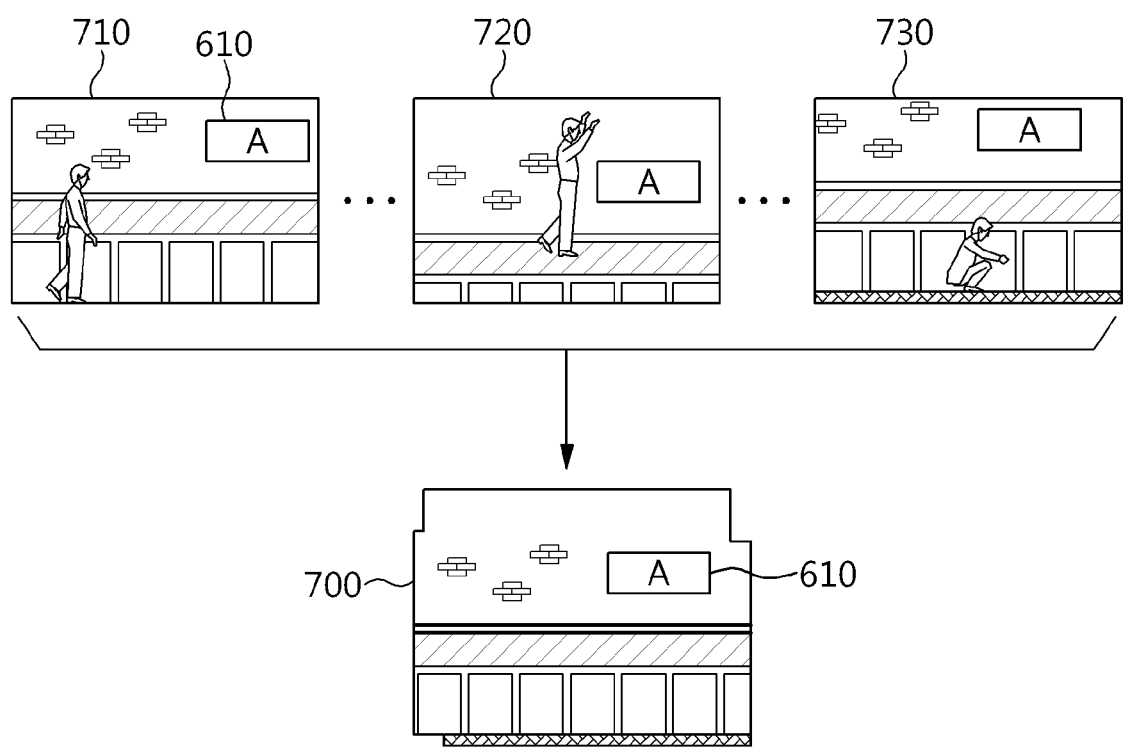
FIG. 7 is a diagram showing an example of a method of inserting an advertisement using frame clustering according to the present invention.

FIG. 7 is a diagram showing an example of a method of inserting an advertisement using frame clustering according to the present invention.

Referring to FIG. 7, in the method of inserting an advertisement using frame clustering according to the present invention, advertisement insertion target frames 710, 720 and 730 including advertisement insertion regions 610 are clustered.

In this case, in the method of inserting an advertisement using frame clustering according to the present invention, a stitching frame 700, i.e., the result of the stitching of the advertisement insertion target frames 710, 720 and 730, may be displayed to a user as the result of the performance of the clustering.

In this case, the advertisement insertion target frames 710, 720 and 730 may be some of the advertisement insertion target frames $t_0$ to $t_{n-1}$ shown in FIG. 6.

Figure 8:
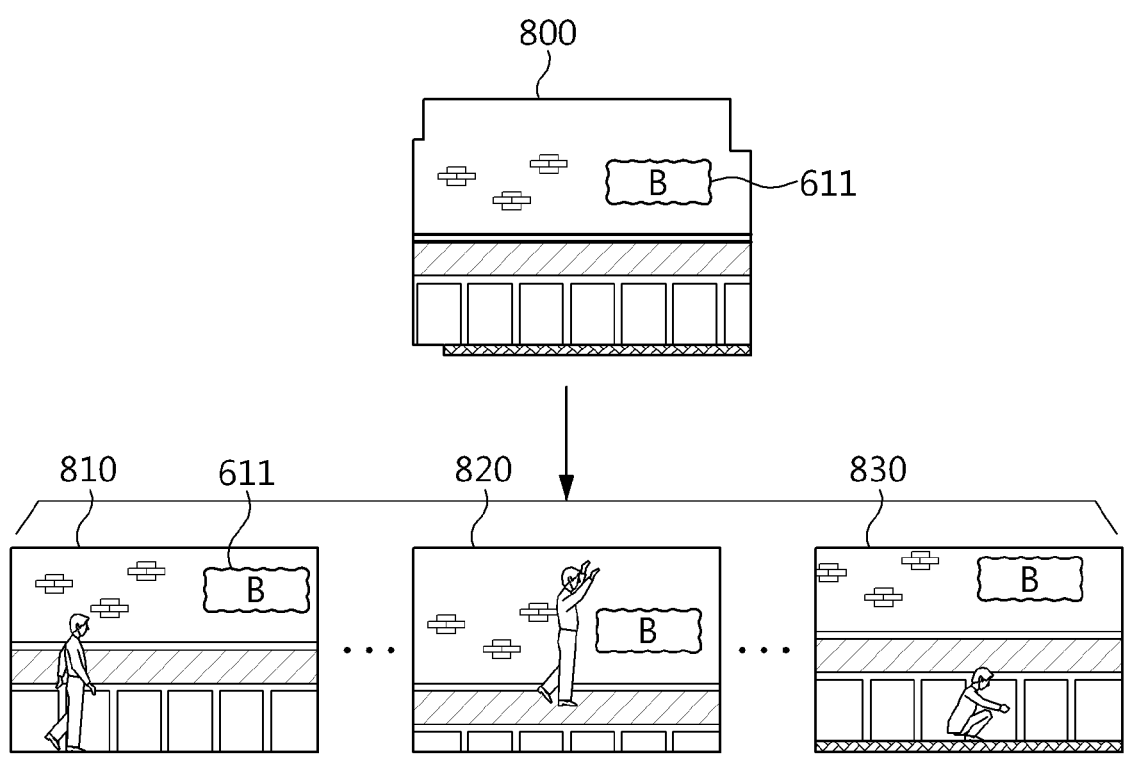
FIG. 8 is a diagram showing another example of a method of inserting an advertisement using frame clustering according to the present invention.

FIG. 8 is a diagram showing another example of a method of inserting an advertisement using frame clustering according to the present invention.

Referring to FIG. 8, in the method of inserting an advertisement using frame clustering according to the present invention, when an advertisement is inserted into the advertisement insertion region 610 with respect to at least one of the clustered advertisement insertion target frames 710, 720 and 730 shown in FIG. 7, frames 810, 820 and 830 into which the advertisement has been inserted are acquired by inserting the advertisement into all the clustered advertisement insertion target frames 710, 720 and 730, acquired by clustering regions 611 into which the advertisement has been inserted, in a uniform manner.

In this case, in the method of inserting an advertisement using frame clustering according to the present invention, the stitching frame 700 shown in FIG. 7 may be displayed to a user, and the result of the insertion of the advertisement into the stitching frame 700 may be displayed when the user inserts the advertisement into the stitching frame 700.

The method of inserting an advertisement using frame clustering according to the present invention may be implemented as a program or smart phone app that can be executed by various computer means. In this case, the program or smart phone app may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

The device and method for inserting an advertisement using frame clustering according to the present invention are not limited to the configurations and methods of the above-described embodiments, but some or all of the embodiments may be configured to be selectively combined such that the embodiments can be modified in various manners.

A device and method for providing insertion region guide information for the insertion of a virtual indirect advertisement according to embodiments of the present invention are described below.

Figure 9:
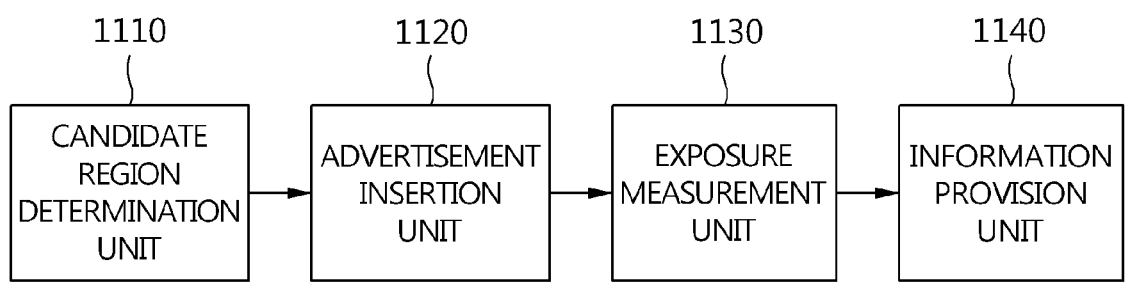
FIG. 9 is a block diagram showing a device for providing insertion region guide information for the insertion of a virtual indirect advertisement according to an embodiment of the present invention.

FIG. 9 is a block diagram showing a device for providing insertion region guide information for the insertion of a virtual indirect advertisement according to an embodiment of the present invention.

Referring to FIG. 9, the device for providing insertion region guide information for the insertion of a virtual indirect advertisement according to the embodiment of the present invention includes a candidate region determination unit 1110, an advertisement insertion unit 1120, an exposure measurement unit 1130, and an information provision unit 1140.

The candidate region determination unit 1110 determines a candidate region, into which a virtual indirect advertisement will be inserted in video image content.

The advertisement insertion unit 1120 processes the virtual indirect advertisement and inserts the virtual indirect advertisement into the candidate region.

In this case, the advertisement insertion unit 1120 may select the virtual indirect advertisement to be inserted into the candidate region, may process the virtual indirect advertisement based on preliminary processing characteristics so that the virtual indirect advertisement can be inserted into the candidate region, and may insert the processed virtual indirect advertisement into the candidate region.

In this case, the preliminary processing characteristics may include any one or more of the size of the portion of the virtual indirect advertisement which is exposed in the video image content, the deformation which is made based on the angle, the size of the portion of the virtual indirect advertisement which is covered with another object, and the speed at which the virtual indirect advertisement moves within a screen.

The exposure measurement unit 1130 measures the exposure level of the virtual indirect advertisement based on exposure characteristics in which the virtual indirect advertisement is exposed in the video image content.

In this case, the exposure characteristics may include a real-time characteristic which is measured in real time while the virtual indirect advertisement is being exposed in the video image content, and the preliminary processing characteristic.

In this case, the real-time characteristic may include any one or more of the time for which the virtual indirect advertisement is exposed in the video image content, the frequency at which the virtual indirect advertisement is covered with another object, and the location at which the virtual indirect advertisement is disposed in the screen.

In this case, the exposure measurement unit 1130 may measure the exposure level in proportion to the ratio of the size of the exposed region of the virtual indirect advertisement which is exposed in the video image content to the size of the overall screen.

In this case, the exposure measurement unit 1130 may measure the exposure level in proportion to the time for which the virtual indirect advertisement is exposed in the video image content.

In this case, the exposure measurement unit 1130 may measure the exposure level in inverse proportion to the difference between the angle at which the virtual indirect advertisement is exposed in the video image content and a preset reference angle.

In this case, the exposure measurement unit 1130 may measure the exposure level in inverse proportion to the size of the portion of the virtual indirect advertisement which is covered with another object while the virtual indirect advertisement is being exposed in the video image content.

In this case, the exposure measurement unit 1130 may measure the exposure level in proportion to the frequency at which the virtual indirect advertisement is covered with another object while the virtual indirect advertisement is being exposed in the video image content.

In this case, the exposure measurement unit 1130 may measure the exposure level in the proximity of the virtual indirect advertisement to the center of the screen.

In this case, the exposure measurement unit 1130 may measure the exposure level in proportion to the speed at which the virtual indirect advertisement moves within the screen while the virtual indirect advertisement is being exposed in the video image content.

In this case, the exposure measurement unit 1130 may calculate a total exposure level by collecting the exposure levels measured based on the exposure characteristics.

The information provision unit 1140 provides insertion region guide information, including the exposure level of the virtual indirect advertisement, to a user.

In this case, the information provision unit 1140 may determine whether the exposure level of the virtual indirect advertisement exceeds a preset reference exposure level, and may provide the insertion region guide information, including the exposure level of the virtual indirect advertisement, to the user if the exposure level of the virtual indirect advertisement exceeds the reference exposure level.

In this case, the information provision unit 1140 may display any one or more of a candidate region into which the virtual indirect advertisement has been inserted and a candidate region which is present before the insertion of the virtual indirect advertisement to the user.

That is, a user may be provided with a candidate region to which the virtual indirect advertisement will be inserted and exposure level information corresponding to the candidate region by the device for providing insertion region guide information for the insertion of a virtual indirect advertisement according to the embodiment of the present invention. In this case, the user may select a region into which the virtual indirect advertisement will be finally inserted while viewing the candidate region and the exposure level together. Furthermore, the user may select a region into which the virtual indirect advertisement will be finally inserted while viewing the candidate region into which the virtual indirect advertisement will be inserted.

As described above, when the user selects some from a plurality of candidate regions into which the virtual indirect advertisement will be inserted and inserts the advertisement using the device for providing insertion region guide information for the insertion of a virtual indirect advertisement according to the embodiment of the present invention, insertion regions may be selected more conveniently.

Furthermore, the user may receive only information corresponding to candidate regions whose exposure level exceeds a predetermined level using the device for providing insertion region guide information for the insertion of a virtual indirect advertisement according to the embodiment of the present invention. For example, the user may receive only information corresponding to candidate regions above the upper 30%.

As described above, using the device for providing insertion region guide information for the insertion of a virtual indirect advertisement according to the embodiment of the present invention, the user may more rapidly select a region having a high advertising effect from a plurality of candidate regions into which the virtual indirect advertisement can be inserted.

Although not shown in FIG. 9, the device for providing insertion region guide information for the insertion of a virtual indirect advertisement according to the embodiment of the present invention may further include an advertising expense calculation unit configured to calculate the advertising expenses of the virtual indirect advertisement based on the exposure level.

In this case, the information provision unit 1140 may display the advertising expenses to the user.

In this case, the advertising expense calculation unit may measure the advertising expenses of the virtual indirect advertisement in proportion to the exposure level, and may measure the advertising expenses in proportion to the total exposure level calculated by an exposure calculation unit.

Figure 10:
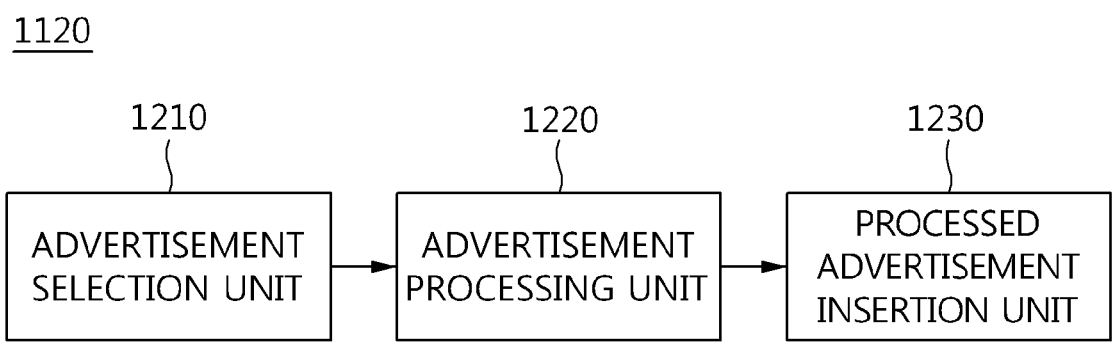
FIG. 10 is a block diagram showing an example of the advertisement insertion unit shown in FIG. 9.

FIG. 10 is a block diagram showing an example of the advertisement insertion unit 1120 shown in FIG. 9.

Referring to FIG. 10, the advertisement insertion unit 1120 shown in FIG. 9 includes an advertisement selection unit 1210, an advertisement processing unit 1220, and a processed advertisement insertion unit 1230.

The advertisement selection unit 1210 selects a virtual indirect advertisement which will be inserted into the candidate region.

The advertisement processing unit 1220 processes the virtual indirect advertisement based on preliminary processing characteristics so that the virtual indirect advertisement can be inserted into the candidate region.

In this case, the preliminary processing characteristics may include any one or more of the size of the portion of the virtual indirect advertisement which is exposed in the video image content, the deformation which is made based on the angle, the size of the portion of the virtual indirect advertisement which is covered with another object, and the speed at which the virtual indirect advertisement moves within a screen.

The processed advertisement insertion unit 1230 inserts the processed virtual indirect advertisement into the candidate region.

Figure 11:
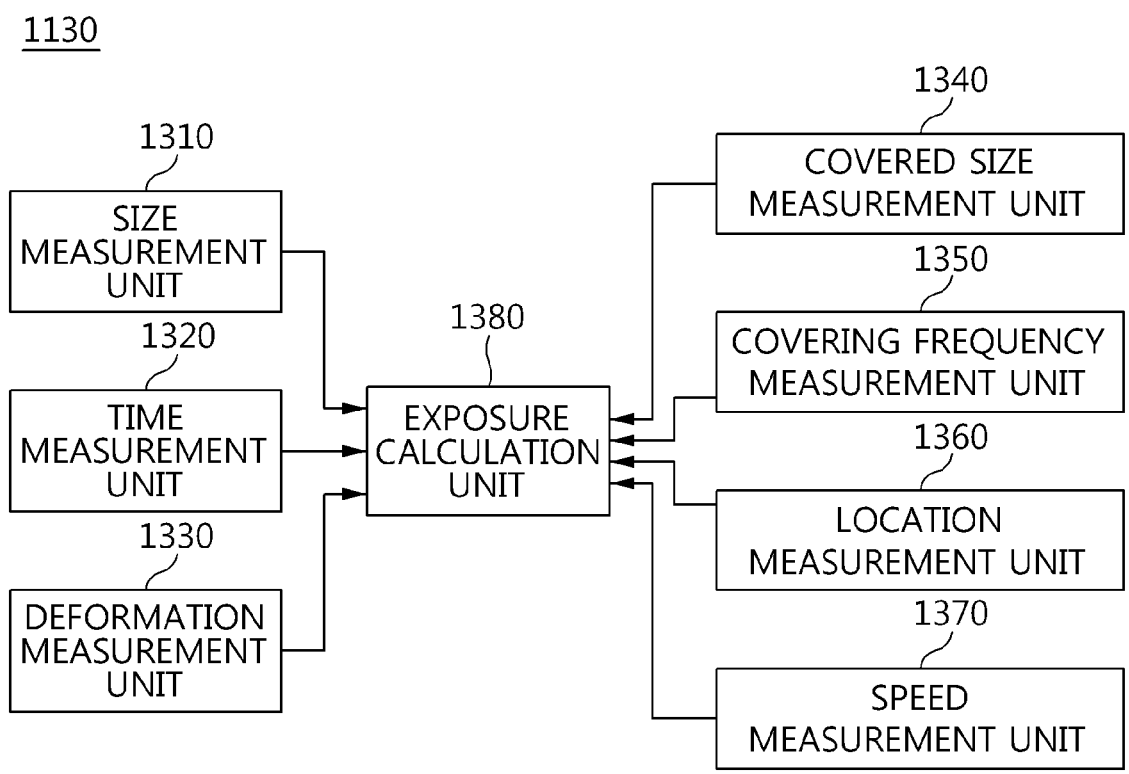
FIG. 11 is a block diagram showing an example of the exposure measurement unit shown in FIG. 9.

FIG. 11 is a block diagram showing an example of the exposure measurement unit 1130 shown in FIG. 9.

Referring to FIG. 11, the exposure measurement unit 1130 shown in FIG. 9 includes a size measurement unit 1310, a time measurement unit 1320, a deformation measurement unit 1330, a covered size measurement unit 1340, a covering frequency measurement unit 1350, a location measurement unit 1360, a speed measurement unit 1370, and an exposure calculation unit 1380.

The size measurement unit 1310 measures the exposure level in proportion to the ratio of the size of the exposed region of the virtual indirect advertisement which is exposed in the video image content to the size of the overall screen.

It will be apparent that the objective exposure level becomes higher as the size of the exposed region of the virtual indirect advertisement is exposed in the screen increases.

In this case, the size of the exposed region of the virtual indirect advertisement which is exposed in the video image content may not be measured in real time, but may be measured based on information when the virtual indirect advertisement is processed by the advertisement processing unit.

The time measurement unit 1320 measures the exposure level in proportion to the exposure time for which the virtual indirect advertisement is exposed in the video image content.

It will be apparent that the objective exposure level becomes higher as the time for which the virtual indirect advertisement is exposed in the screen increases.

The deformation measurement unit 1330 measures the level at which the virtual indirect advertisement is deformed based on the angle of the view point of a camera.

In this case, the deformation measurement unit 1330 may measure the exposure level in inverse proportion to the difference between the angle at which the virtual indirect advertisement is exposed in the video image content and a preset reference angle.

In this case, the preset reference angle may be an angle corresponding to the front surface of the virtual indirect advertisement.

Accordingly, a deformation level is in proportion to the difference between the angle at which the virtual indirect advertisement is exposed and the angle corresponding to the front surface of the virtual indirect advertisement, and the exposure level is measured in inverse proportion to the difference.

In this case, the angle at which the virtual indirect advertisement is exposed in the video image content may not be measured in real time, but may be measured based on information when the virtual indirect advertisement is processed by the advertisement processing unit.

The covered size measurement unit 1340 measures the exposure level in inverse proportion to the size of the region of the virtual indirect advertisement which is covered with another object while the virtual indirect advertisement is being exposed in the video image content.

It will be apparent that the exposure level is in inverse proportion to the level at which the virtual indirect advertisement is covered with another object.

In this case, the size of the region of the virtual indirect advertisement which is covered with another object while the virtual indirect advertisement is being exposed in the video image content may not be measured in real time, but may be measured based on information when the virtual indirect advertisement is processed by the advertisement processing unit.

The covering frequency measurement unit 1350 measures the exposure level in inverse proportion to the frequency at which the virtual indirect advertisement is covered with another object while the virtual indirect advertisement is being exposed in the video image content.

It will be apparent that the exposure level is in inverse proportion to the frequency at which the virtual indirect advertisement is covered with another object.

The location measurement unit 1360 measures the exposure level in proportion to the proximity of the disposed virtual indirect advertisement to the center of a screen.

That is, a virtual indirect advertisement that is disposed closer to the center of a screen may be a virtual indirect advertisement having higher prominence. A viewer will be more interested in a virtual indirect advertisement having higher prominence. Accordingly, the exposure level is measured in proportion to the prominence of a virtual indirect advertisement.

The speed measurement unit 1370 measures the exposure level in inverse proportion to the speed at which the virtual indirect advertisement moves within a screen while the virtual indirect advertisement is being exposed in the video image content.

That is, since it becomes difficult for a viewer to identify or be interested in a virtual indirect advertisement in proportion to the speed at which the virtual indirect advertisement moves within a screen, the exposure level is measured in inverse proportion to the speed.

In this case, the speed at which the virtual indirect advertisement moves within a screen while the virtual indirect advertisement is being exposed in the video image content may not be measured in real time, but may be measured based on information when the virtual indirect advertisement is processed by the advertisement processing unit.

The exposure calculation unit 1380 calculates a total exposure level by collecting the exposure levels measured based on the exposure characteristics.

In this case, different weights may be applied to the respective criteria.

For example, an exposure level measured based on the size of an exposed region may have a larger weight than an exposure level measured based on deformation based on an angle.

FIG. 12 is an equation showing an example of an equation computed by the exposure measurement unit 1130 shown in FIG. 9.

Referring to FIG. 12, the equation calculated by the exposure measurement unit 1130 includes coefficients a to g and variables E, S, T, A, C, F, D and V.

The variable E denotes an exposure level. This is derived from the equation shown in FIG. 12.

The variable S denotes the size of the region of the virtual indirect advertisement which is exposed in the video image content.

In this case, S is calculated by dividing the number of pixels of the exposed region by the number of pixels of an overall screen.

The exposure level is calculated in proportion to the variable S.

The variable T denotes the time during which the virtual indirect advertisement is exposed in the video image content.

In this case, the variable T may be calculated in seconds, milliseconds, on a frame count basis, or the like.

The exposure level is calculated in proportion to the variable T.

The variable A denotes the level at which the virtual indirect advertisement is deformed based on an angle while the virtual indirect advertisement is being exposed in the video image content.

In this case, the variable A is calculated based on the difference between a preset reference angle and the angle at which the virtual indirect advertisement is exposed in the video image content.

In this case, the preset reference angle may be an angle corresponding to the front surface of the virtual indirect advertisement.

The exposure level is calculated in inverse proportion to the variable A.

The variable C denotes the size of the region of the virtual indirect advertisement is covered with another object while the virtual indirect advertisement is being exposed in the video image content.

The variable C is calculated by dividing the number of pixels included in the region covered with another object by the number of pixels included in the region of the virtual indirect advertisement that is exposed in the video image content.

The exposure level is calculated in inverse proportion to the variable C.

The variable F denotes the frequency at which the virtual indirect advertisement is covered with another object while the virtual indirect advertisement is being exposed in the video image content.

The variable F is calculated by dividing the time during which the virtual indirect advertisement is covered with another object in the video image content by an overall exposure time.

The exposure level is calculated in inverse proportion to the variable F.

The variable D denotes the distance between the location at which the virtual indirect advertisement is exposed in the video image content and the center of a screen.

The exposure level is calculated in inverse proportion to the variable D.

The variable V denotes the speed at which the virtual indirect advertisement moves within a screen while the virtual indirect advertisement is being exposed in the video image content.

The exposure level is calculated in inverse proportion to the variable V.

A method by which the exposure level is calculated by the exposure measurement unit shown in FIG. 9 is not limited to the equation shown in FIG. 12, but the exposure level may be differently calculated in accordance with an equation different from the equation shown in FIG. 12.

Figure 13:
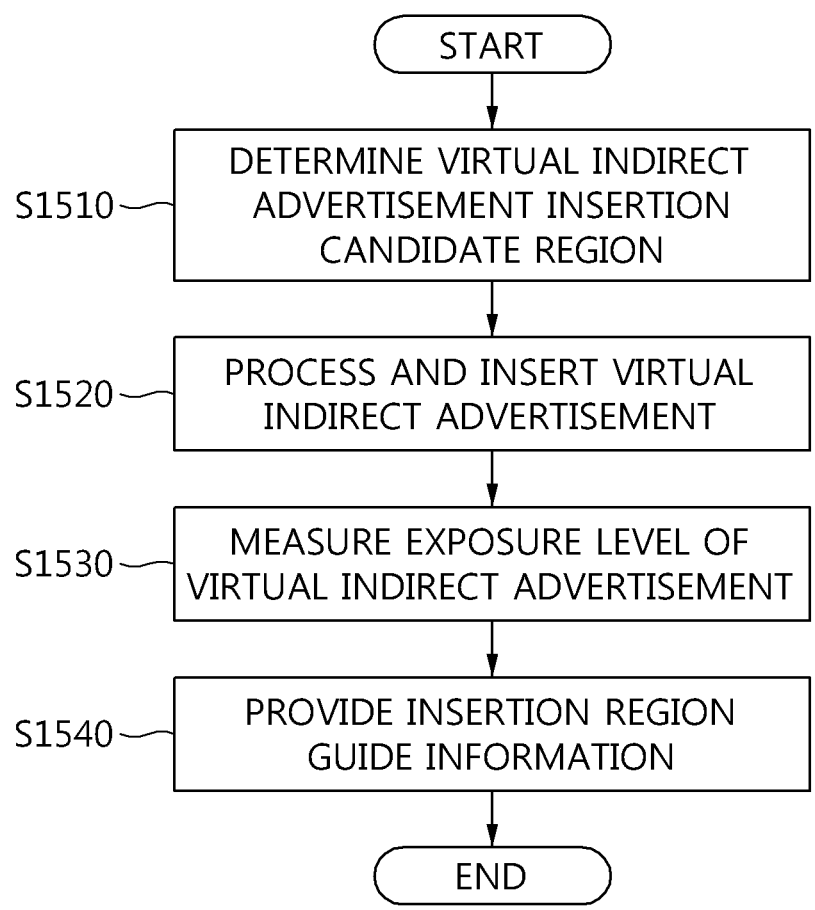
FIG. 13 is an operation flowchart showing a method of providing insertion region guide information for the insertion of a virtual indirect advertisement according to an embodiment of the present invention.

FIG. 13 is an operation flowchart showing a method of providing insertion region guide information for the insertion of a virtual indirect advertisement according to an embodiment of the present invention.

Referring to FIG. 13, in the method of providing insertion region guide information for the insertion of a virtual indirect advertisement according to the embodiment of the present invention, a candidate region into which a virtual indirect advertisement will be inserted in video image content is determined at step S1510.

Furthermore, in the method of providing insertion region guide information for the insertion of a virtual indirect advertisement according to the embodiment of the present invention, the virtual indirect advertisement is processed and inserted into the candidate region at step S1520.

In this case, at step S1520, the virtual indirect advertisement to be inserted into the candidate region may be selected, the virtual indirect advertisement may be processed based on preliminary processing characteristics so that the virtual indirect advertisement can be inserted into the candidate region, and the processed virtual indirect advertisement may be inserted to the candidate region.

In this case, the preliminary processing characteristics may include any one or more of the size of the portion of the virtual indirect advertisement which is exposed in the video image content, the deformation which is made based on the angle, the size of the portion of the virtual indirect advertisement which is covered with another object, and the speed at which the virtual indirect advertisement moves within a screen.

Furthermore, in the method of providing insertion region guide information for the insertion of a virtual indirect advertisement according to the embodiment of the present invention, the exposure level of the virtual indirect advertisement is measured based on exposure characteristics in which the virtual indirect advertisement is exposed in the video image content at step S1530.

In this case, the exposure characteristics may include a real-time characteristic which is measured in real time while the virtual indirect advertisement is being exposed in the video image content and the preliminary processing characteristic.

In this case, the real-time characteristic may include any one or more of the time for which the virtual indirect advertisement is exposed in the video image content, the frequency at which the virtual indirect advertisement is covered with another object, and the location at which the virtual indirect advertisement is disposed in the screen.

In this case, at step S1530, the exposure level may be measured in proportion to the ratio of the size of the exposed region of the virtual indirect advertisement which is exposed in the video image content to the size of the overall screen.

In this case, at step S1530, the exposure level may be measured in proportion to the time for which the virtual indirect advertisement is exposed in the video image content.

In this case, at step S1530, the exposure level may be measured in inverse proportion to the difference between the angle at which the virtual indirect advertisement is exposed in the video image content and a preset reference angle.

In this case, at step S1530, the exposure level may be measured in inverse proportion to the size of the portion of the virtual indirect advertisement which is covered with another object while the virtual indirect advertisement is being exposed in the video image content.

In this case, at step S1530, the exposure level may be measured in proportion to the frequency at which the virtual indirect advertisement is covered with another object while the virtual indirect advertisement is being exposed in the video image content.

In this case, at step S1530, the exposure level may be measured in the proximity of the virtual indirect advertisement to the center of the screen.

In this case, at step S1530, the exposure level may be measured in proportion to the speed at which the virtual indirect advertisement moves within the screen while the virtual indirect advertisement is being exposed in the video image content.

In this case, at step S1530, a total exposure level may be calculated by collecting the exposure levels measured based on the exposure characteristics.

Furthermore, in the method of providing insertion region guide information for the insertion of a virtual indirect advertisement according to the embodiment of the present invention, insertion region guide information, including the exposure level of the virtual indirect advertisement, is provided to a user at step S1540.

In this case, at step S1540, it may be determined whether the exposure level of the virtual indirect advertisement exceeds a preset reference exposure level, and the insertion region guide information, including the exposure level of the virtual indirect advertisement, may be provided to the user if the exposure level of the virtual indirect advertisement exceeds the reference exposure level.

In this case, at step S1540, any one or more of a candidate region into which the virtual indirect advertisement has been inserted and a candidate region which is present before the insertion of the virtual indirect advertisement may be displayed to the user.

Although not shown in FIG. 13, the advertising expenses of the virtual indirect advertisement may be calculated based on the exposure level in the method of providing insertion region guide information for the insertion of a virtual indirect advertisement according to an embodiment of the present invention.

In this case, at step S1540, the advertising expenses may be displayed to the user.

Figure 14:
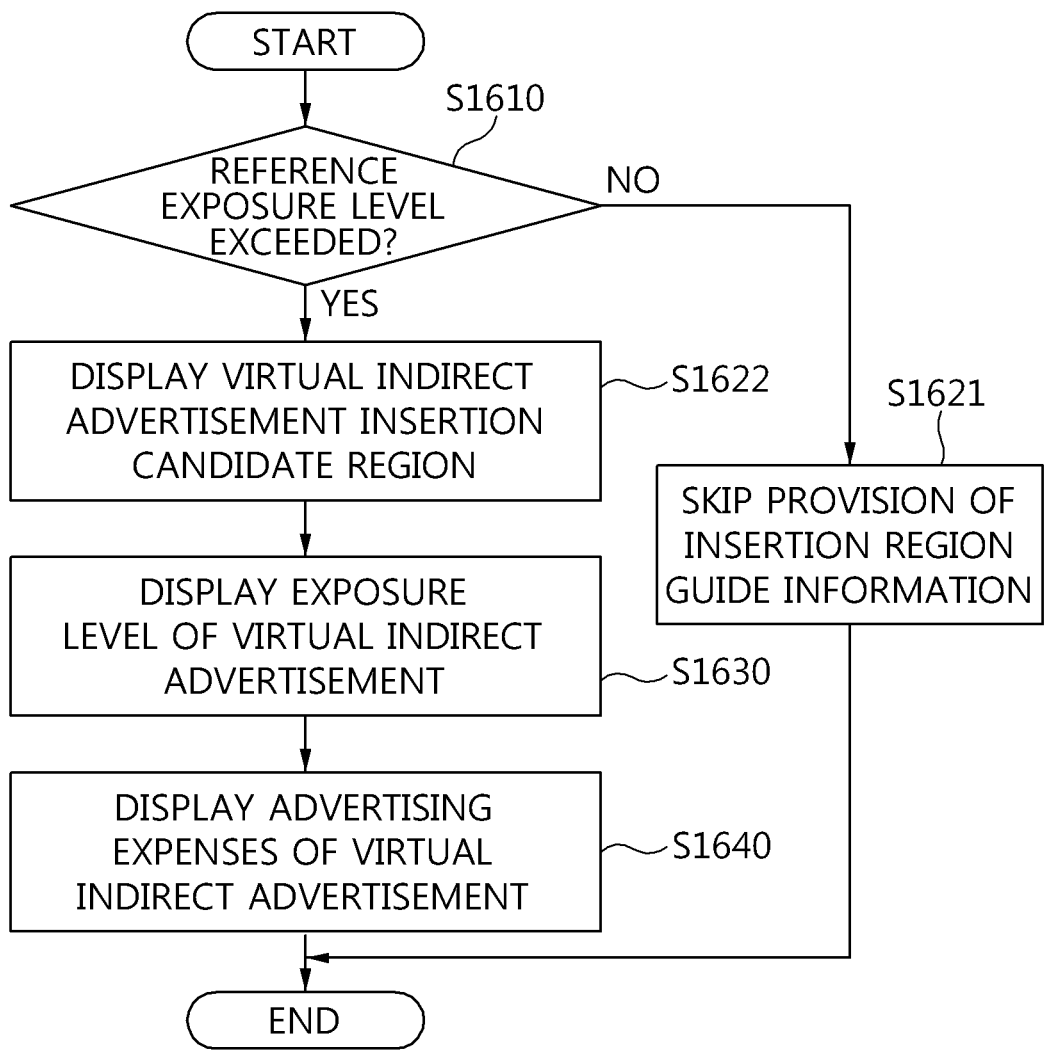
FIG. 14 is an operation flowchart showing an example of the step of providing insertion region guide information, which is shown in FIG. 13.

FIG. 14 is an operation flowchart showing an example of step S1540 of providing insertion region guide information, which is shown in FIG. 13.

Referring to FIG. 14, at step S1540 of providing insertion region guide information, it is determined whether the exposure level of the virtual indirect advertisement exceeds a preset reference exposure level at step S1610.

In this case, the reference exposure level may be an absolute value or a relative value.

For example, when the reference exposure level is an absolute value, the reference exposure level may be set to a value corresponding to 50% of the maximum value of the exposure level.

For example, when the reference exposure level is a relative value, the reference exposure level may be set to a value which falls within the upper 30% of the exposure levels of the virtual indirect advertisement inserted into all the candidate regions.

In step S1540 of providing insertion region guide information, which is shown in FIG. 13, if, as a result of the determination at step S1610, the exposure level of the virtual indirect advertisement does not exceed the reference exposure level, the provision of insertion region guide information is skipped at step S1621.

That is, in the method of providing insertion region guide information for the insertion of a virtual indirect advertisement according to an embodiment of the present invention, the reference exposure level may be adjusted, and the provision of insertion region guide information may be sipped for some of the candidate regions having low exposure levels.

In step S1540 of providing insertion region guide information, shown in FIG. 13, if, as a result of the determination at step S1610, the exposure level of the virtual indirect advertisement exceeds the reference exposure level, candidate regions into which the virtual indirect advertisement has been inserted are displayed at step S1622.

Furthermore, in step S1540 of providing insertion region guide information, shown in FIG. 13, the exposure level of the virtual indirect advertisement is displayed at step S1630.

Furthermore, in step S1540 of providing insertion region guide information, shown in FIG. 13, the advertising expenses of the virtual indirect advertisement are displayed at step S1640.

That is, it can be seen that in the method of providing insertion region guide information for the insertion of a virtual indirect advertisement according to an embodiment of the present invention, the reference exposure level is adjusted and then insertion region guide information is provided only for some of the candidate regions having exposure levels that exceed the reference exposure level.

Figure 15:
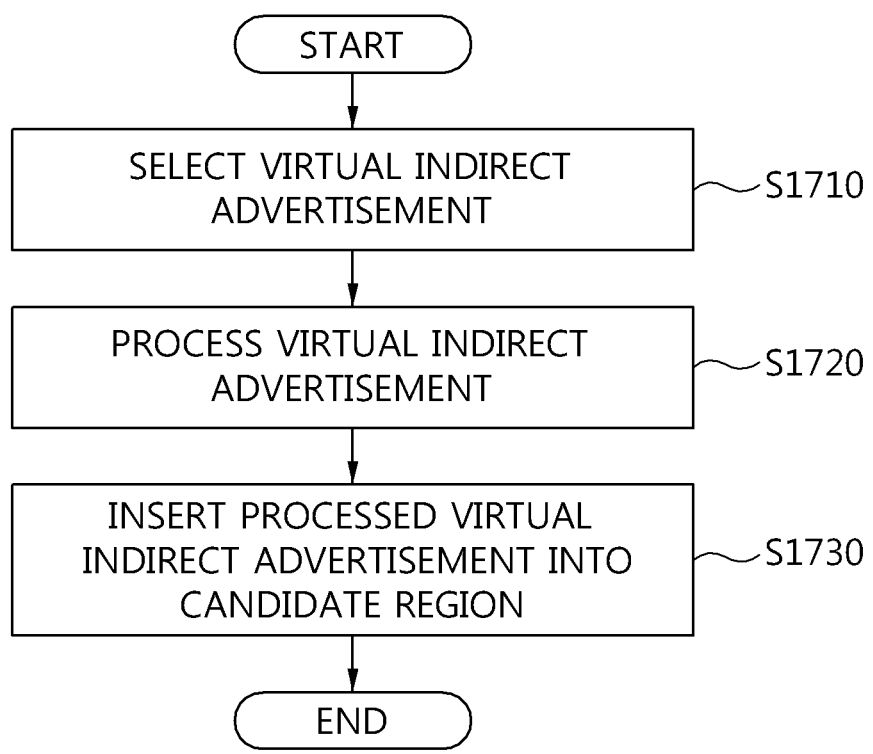
FIG. 15 is an operation flowchart showing an example of the step of processing and inserting virtual indirect advertisement, which is shown in FIG. 13.

FIG. 15 is an operation flowchart showing an example of step S1520 of processing and inserting virtual indirect advertisement, which is shown in FIG. 13.

Referring to FIG. 15, in step S1520 of processing and inserting virtual indirect advertisement, shown in FIG. 13, the virtual indirect advertisement which will be inserted into the candidate region is selected at step S1710.

Furthermore, in step S1520 of processing and inserting virtual indirect advertisement, shown in FIG. 13, the virtual indirect advertisement is processed based on preliminary processing characteristics so that the virtual indirect advertisement can be inserted into the candidate region at step S1720.

In this case, the preliminary processing characteristics may include any one or more of the size of the portion of the virtual indirect advertisement which is exposed in the video image content, the deformation which is made based on the angle, the size of the portion of the virtual indirect advertisement which is covered with another object, and the speed at which the virtual indirect advertisement moves within a screen.

The processed advertisement insertion unit 1230 inserts the processed virtual indirect advertisement into the candidate region.

Furthermore, in step S1520 of processing and inserting virtual indirect advertisement, shown in FIG. 13, the processed virtual indirect advertisement is inserted into the candidate region at step S1730.

The steps shown in each of FIGS. 13 to 15 may be performed in the sequence shown in each of FIGS. 13 to 15, in a sequence reverse to the former sequence, or concurrently.

The method of providing insertion region guide information for the insertion of a virtual indirect advertisement according to the present invention may be implemented as a program or smart phone app that can be executed by various computer means. In this case, the program or smart phone app may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

The device and method for inserting an advertisement using frame clustering according to the present invention are not limited to the configurations and methods of the above-described embodiments, but some or all of the embodiments may be configured to be selectively combined such that the embodiments can be modified in various manners.

A device and method for eliminating markers for the insertion of a virtual indirect advertisement according to embodiments of the present invention are described below.

Figure 16:
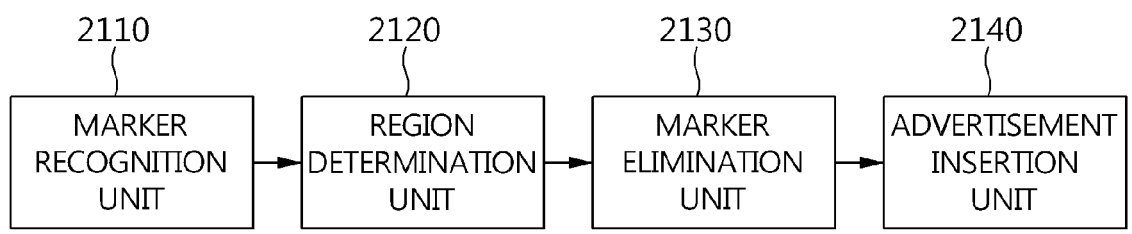
FIG. 16 is a block diagram showing a device for eliminating markers for the insertion of a virtual indirect advertisement according to an embodiment of the present invention.

FIG. 16 is a block diagram showing a device for eliminating markers for the insertion of a virtual indirect advertisement according to an embodiment of the present invention.

Referring to FIG. 16, the device for eliminating markers for the insertion of a virtual indirect advertisement according to the embodiment of the present invention includes a marker recognition unit 2110, a region determination unit 2120, a marker elimination unit 2130, and an advertisement insertion unit 2140.

The marker recognition unit 2110 recognizes markers included in the frames of a video.

In this case, the marker recognition unit 2110 may recognize markers included in the frames of a video using a preset algorithm or input received from a user.

The region determination unit 2120 determines a marker region corresponding to each marker, an insertion region into which a virtual indirect advertisement will be inserted, and a marker elimination region using the marker region and the insertion region.

In this case, the region determination unit 2120 may determine the marker region and the insertion region using a preset algorithm or input received from the user.

In this case, the region determination unit 2120 may divide the marker region into an inpainting region and a non-inpainting region, and may determine the inpainting region to be a marker elimination region.

In this case, the region determination unit 2120 may determine whether each of marker pixels within the marker region is present in the insertion region, and may determine marker pixels, not present in the insertion region, to be the inpainting region.

In this case, the region determination unit 2120 may determine whether each of marker pixels within the marker region is present in the insertion region, and may determine marker pixels, present in the insertion region, to be the non-inpainting region.

That is, since the non-inpainting region is a marker portion that is covered with and hidden by the virtual indirect advertisement, inpainting may be performed on only a non-overlapping region.

Accordingly, this can reduce inpainting operation costs compared to performing inpainting on the overall marker.

In this case, the region determination unit 2120 may generate an insertion boundary region including pixels forming an insertion boundary, and may include part of the insertion boundary region in the inpainting region.

In this case, the region determination unit 2120 may determine whether each of the pixels forming the boundary of the insertion region is present within a preset distance from the boundary of the insertion region, may determine a region composed of pixels present within a preset distance to be the insertion boundary region, and may determine the marker elimination region by considering the insertion boundary region.

In this case, the region determination unit 2120 may determine whether each of the pixels within the insertion boundary region is present in the marker region and the insertion region, and may include pixels, present in the marker region and the insertion region, in the inpainting region.

In this case, the region determination unit 2120 may generate the marker boundary region including the pixels forming the marker boundary, and may include part of the marker boundary region in the inpainting region.

In this case, the region determination unit 2120 may determine whether each of pixels forming the boundary of the marker region is present within a preset distance from the boundary of the marker region, may determine a region composed of pixels, present within the preset distance, to be the marker boundary region, and may determine the marker elimination region by considering the marker boundary region.

In this case, the region determination unit 2120 may determine whether each of pixels within the marker boundary region is present in the marker region and the insertion region, and may include pixels, not present in the marker region and the insertion region, in the inpainting region.

The marker elimination unit 2130 performs inpainting on only the marker elimination region.

In this case, the marker elimination unit 2130 may divide an image, corresponding to the inpainting region, into a structure image and a texture image, may generate a processed structure image by performing inpainting on the structure image in such a manner that a pixel proximate to the periphery of the inpainting region diffuses into the inpainting region along a line of an equal gray value, may generate a processed texture image by performing texture synthesis on the texture image, and may synthesize the processed structure image with the processed texture image.

In this case, the structure image may be an image including only the structure of an object included in the image. That is, the structure image includes the shape, color, brightness and the like of the object.

In this case, the texture image may be an image including only the texture of the object included in the image. That is, the texture image includes the pattern, texture and the like of the object.

In this case, since the vision of humans is more sensitive to the attribute of a region, such as the structure, texture or the like, than gray values, inpainting based on the attribute of a region, such as the structure, texture or the like, may generate a more natural image than inpainting based on gray values when inpainting is performed.

In this case, in the case of the algorithm which performs inpainting through diffusion along a line of an equal gray value, a good-looking result is generated by connecting the structures of the region of an inpainting target, but a disadvantage arises in that blur occurs in an image in the case of a region having texture.

In this case, the texture synthesis refers to generating the texture information of a large image from the texture information of a small sample image. That is, the texture information of a large image which will fill the inpainting region is generated from the texture information of a sample image selected from a region excluding the inpainting region.

In this case, as to the sample image, a single sample image may be selected and then texture synthesis may be performed, or a plurality of sample images may be selected and then texture synthesis may be performed, thereby generating a single large image.

In this case, the marker elimination unit 2130 may segment each of the inpainting region and the region excluding the inpainting region into unit patches, may select the most consistent patch in the region excluding the inpainting region with respect to each patch of the inpainting region, and may synthesize each patch of the inpainting region with a selected patch.

In this case, the size of the patch may not be fixed, but may vary depending on the situation.

In this case, when the patch is selected, the most consistent patch may be selected based on assigned priorities or weights. In this case, a higher priority may be assigned to a patch having high sparsity different from surroundings. In this case, the weight may be assigned based on the distance.

In this case, a single patch may not be selected, but the sum of the weights of a plurality of candidate patches may be obtained using nonlocal means and then selection may be performed. Alternatively, local patch consistency may be used instead of the nonlocal means.

In this case, the marker elimination unit 2130 may perform inpainting from a unit region corresponding to the periphery of the inpainting region in an internal direction. Accordingly, this can perform inpainting more natural than inpainting in a unit region corresponding to the interior of the inpainting region where an image that can be referred to is not present in surroundings, and is more efficient because inpainting can be terminated when a target region is terminated or a non-inpainting region is met.

The advertisement insertion unit 2140 inserts a virtual indirect advertisement into the insertion region after the inpainting of the marker elimination region.

Figure 17:
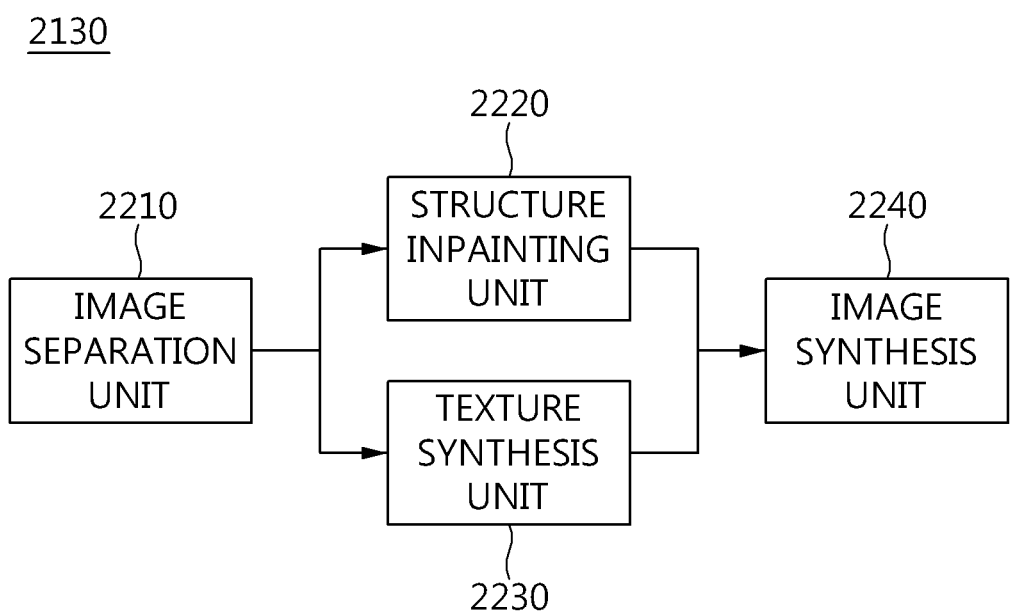
FIG. 17 is a block diagram showing an example of the marker elimination unit shown in FIG. 16.

FIG. 17 is a block diagram showing an example of the marker elimination unit 2130 shown in FIG. 16.

Referring to FIG. 17, the marker elimination unit 2130 shown in FIG. 16 includes an image separation unit 2210, a structure inpainting unit 2220, a texture synthesis unit 2230, and an image synthesis unit 2240.

The image separation unit 2210 divides an image, corresponding to an inpainting region, into a structure image and a texture image.

In this case, the structure image may be an image including only the structure of an object included in the image. That is, the structure image includes the shape, color, brightness and the like of the object.

In this case, the texture image may be an image including only the texture of the object included in the image. That is, the texture image includes the pattern, texture and the like of the object.

In this case, since the vision of humans is more sensitive to the attribute of a region, such as the structure, texture or the like, than gray values, inpainting based on the attribute of a region, such as the structure, texture or the like, may generate a more natural image than inpainting based on gray values when inpainting is performed.

Accordingly, inpainting is performed on the structure and the texture. Since an algorithm for generating an optimum result for the structure of the region and an algorithm for generating an optimum result for the texture of a region are different, separate optimum inpainting is performed on each of the structure and texture of the region, and then results are synthesized into a single image. In this case, more natural inpainting can be performed.

The structure inpainting unit 2220 generates a processed structure image by performing inpainting on the structure image in such a manner that a pixel proximate to the periphery of the inpainting region diffuses into the inpainting region along a line of an equal gray value.

In this case, in the case of the algorithm which performs inpainting through diffusion along a line of an equal gray value, a good-looking result is generated by connecting the structures of the region of an inpainting target, but a disadvantage arises in that blur occurs in an image in the case of a region having texture.

Accordingly, inpainting cannot be performed on the texture information of the image corresponding to the inpainting region, but inpainting can be performed on the structure information thereof.

The texture synthesis unit 2230 generates a processed texture image by performing texture synthesis on the texture image.

In this case, the texture synthesis refers to generating the texture information of a large image from the texture information of a small sample image. That is, the texture information of a large image which will fill the inpainting region is generated from the texture information of a sample image selected from a region excluding the inpainting region.

In this case, as to the sample image, a single sample image may be selected and then texture synthesis may be performed, or a plurality of sample images may be selected and then texture synthesis may be performed, thereby generating a single large image.

Accordingly, inpainting cannot be performed on the structure information of the image corresponding to the inpainting region, but inpainting can be performed on the texture information thereof.

The image synthesis unit 2240 synthesizes the processed structure image with the processed texture image.

Accordingly, an image in which inpainting has been performed on both the structure and texture of the image corresponding to the inpainting region can be acquired.

Figure 18:
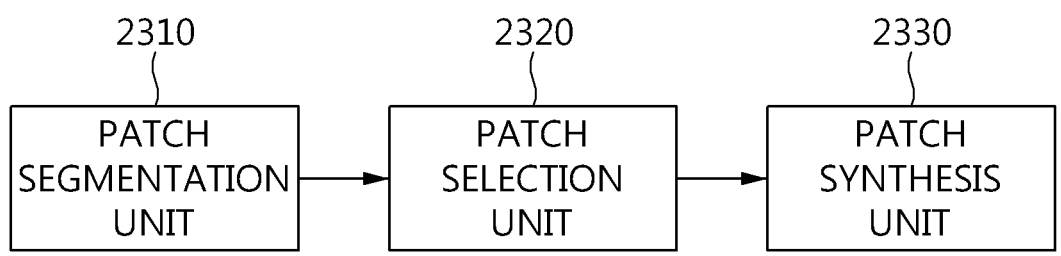
FIG. 18 is a block diagram showing another example of the marker elimination unit shown in FIG. 16.

FIG. 18 is a block diagram showing another example of the marker elimination unit 2130 shown in FIG. 16.

Referring to FIG. 18, the marker elimination unit 2130 shown in FIG. 16 includes a patch segmentation unit 2310, a patch selection unit 2320, and a patch synthesis unit 2330.

The patch segmentation unit 2310 segments each of the inpainting region and a region excluding the inpainting region into unit patches.

In this case, the size of the patch may not be fixed, but may vary depending on the situation.

The patch selection unit 2320 may select the most consistent patch from the region excluding the inpainting region for each patch of the inpainting region.

In this case, when the patch is selected, the most consistent patch may be selected based on assigned priorities or weights. In this case, a higher priority may be assigned to a patch having high sparsity different from surroundings. In this case, the weight may be assigned based on the distance.

In this case, a single patch may not be selected, but the sum of the weights of a plurality of candidate patches may be obtained using nonlocal means and then selection may be performed. Alternatively, local patch consistency may be used instead of the nonlocal means.

The patch synthesis unit 2330 synthesizes each patch of the inpainting region with a selected patch.

Figure 19:
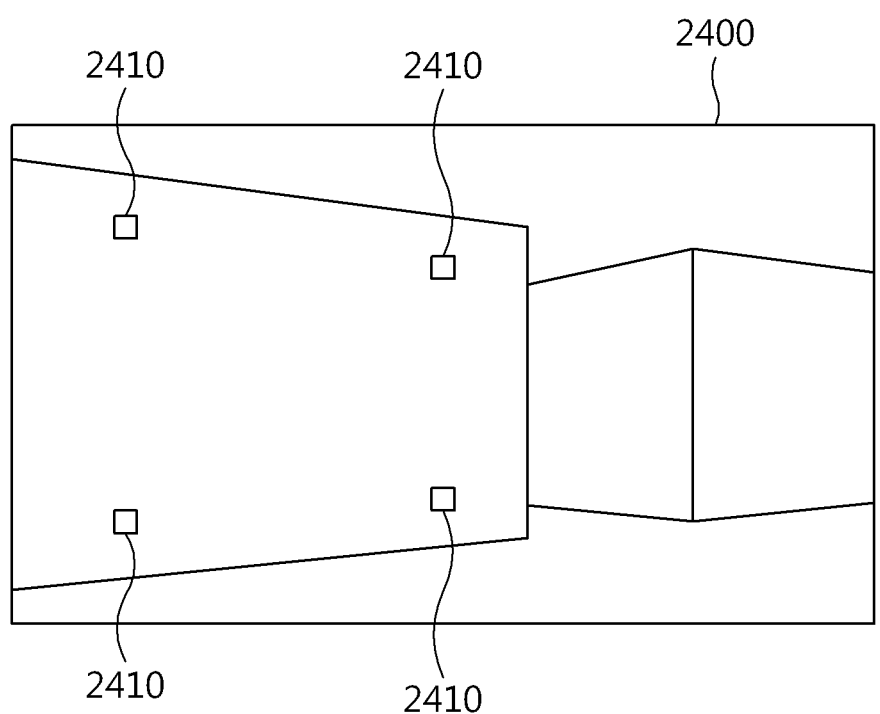
FIG. 19 is a diagram showing an example of a video frame including markers for the insertion of a virtual indirect advertisement according to the present invention.

FIG. 19 is a diagram showing an example of a video frame 2400 including markers 2410 for the insertion of a virtual indirect advertisement according to the present invention.

The device for eliminating markers for the insertion of a virtual indirect advertisement according to the present invention recognizes the markers 2410 in the video frame 2400.

In this case, the device for eliminating markers for the insertion of a virtual indirect advertisement according to the present invention may recognize the markers 2410 using a preset algorithm or input received from a user.

In this case, the video frame 2400 includes markers 2410 directly indicated in a shooting spot.

That is, the markers 2410 are directly indicated in a shooting spot, and are indications that can be easily distinguished from surroundings.

For example, the markers 2410 may be tapes including a specific color or pattern.

Figure 20:
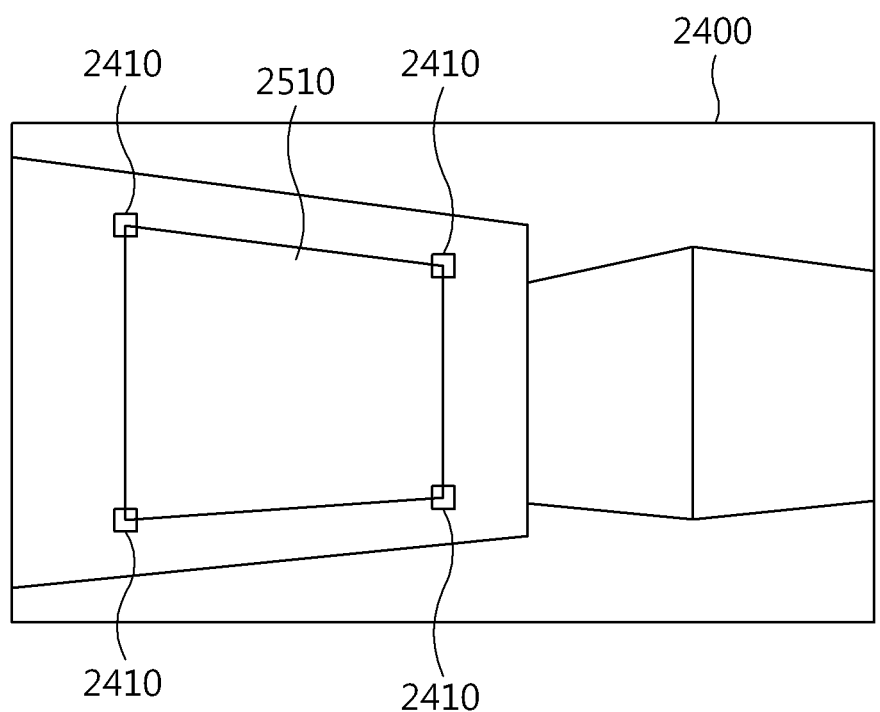
FIG. 20 is a diagram showing an example of a video frame into which a virtual indirect advertisement has been inserted according to the present invention.

FIG. 20 is a diagram showing an example of a video frame 2400 into which a virtual indirect advertisement 2510 has been inserted according to the present invention.

The device for eliminating markers for the insertion of a virtual indirect advertisement according to the present invention determines an insertion region into which a virtual indirect advertisement 2510 will be inserted based on markers 2410.

In this case, the device for eliminating markers for the insertion of a virtual indirect advertisement according to the present invention may determine the insertion region into which the virtual indirect advertisement 2510 will be inserted using a preset algorithm or input received from a user.

For example, the device for eliminating markers for the insertion of a virtual indirect advertisement according to the present invention may determine a region of a shape, having the center points of the markers 2410 as its vertices, to be the insertion region, and may insert the virtual indirect advertisement 2510 into the insertion region.

Figure 21:
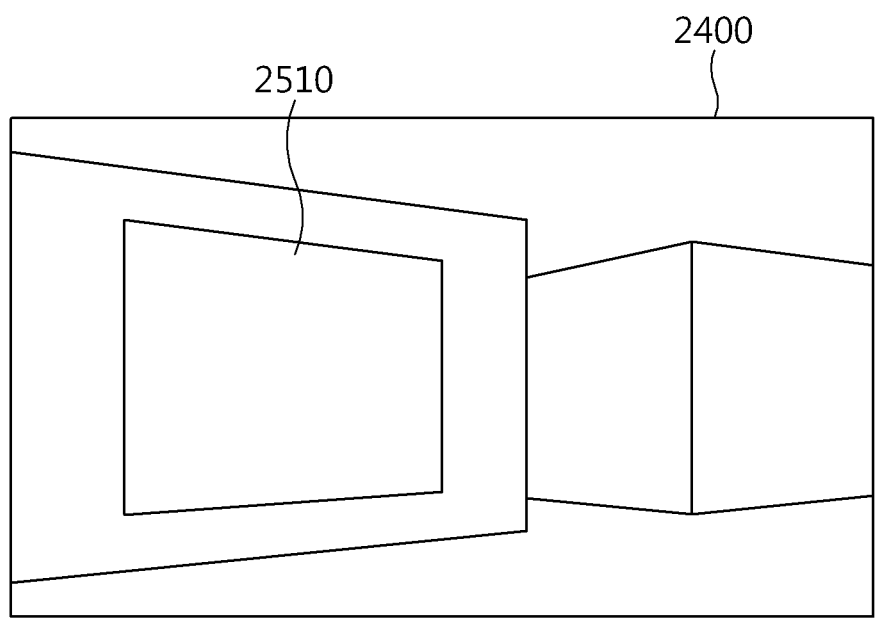
FIG. 21 is a diagram showing an example of a video frame into which a virtual indirect advertisement has been inserted and from which markers have been eliminated according to the present invention.

FIG. 21 is a diagram showing an example of a video frame 2400 into which a virtual indirect advertisement 2510 has been inserted and from which markers 2410 have been eliminated according to the present invention.

Once an insertion region into which the virtual indirect advertisement 2510 will be inserted has been determined based on the markers 2410, the device for eliminating markers for the insertion of a virtual indirect advertisement according to the present invention eliminates the markers 2410 from the video frame 2400 using inpainting.

As described above, referring to FIGS. 19 to 21, it can be seen that the device for eliminating markers for the insertion of a virtual indirect advertisement according to the present invention inserts the virtual indirect advertisement 2510 determined using the insertion region markers 2410 and eliminates the markers 2410 based on the video frame 2400 including the markers 2410 directly indicated in a shooting spot.

Figure 22:
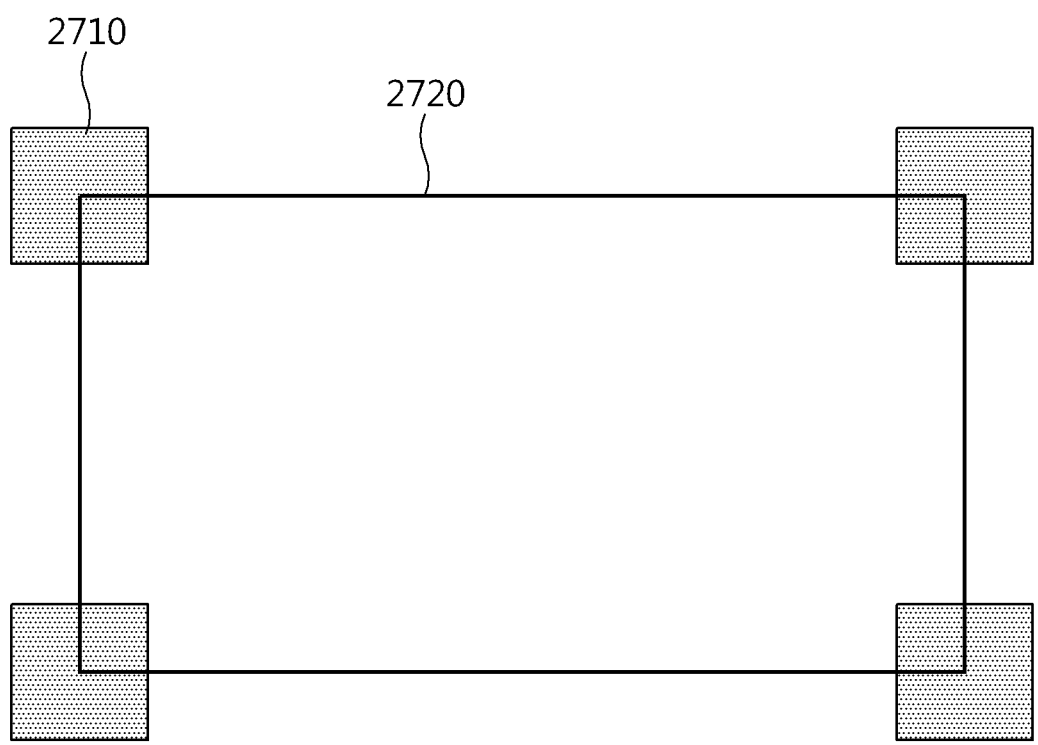
FIG. 22 is a diagram showing examples of a marker region and an insertion region according to the present invention.

FIG. 22 is a diagram showing examples of a marker region 2710 and an insertion region 2720 according to the present invention.

The marker region 2710 corresponds to the marker 2410 shown in FIG. 19.

The insertion region 2720 is a region which will be inserted into the virtual indirect advertisement 2510 shown in FIG. 20.

The marker region 2710 and the insertion region 2720 according to the present invention are determined by the region determination unit 2120 shown in FIG. 16.

In this case, the region determination unit 2120 shown in FIG. 16 may determine a region composed of pixels including recognized markers to be the marker region 2710.

In this case, the marker region 2710 may be determined using a preset algorithm or input received from a user.

Furthermore, the region determination unit 2120 shown in FIG. 16 may determine a region, calculated using the recognized markers, to be the insertion region 2720.

For example, the insertion region 2720 may be a region of a shape having the center points of the recognized markers as its vertices.

In this case, the insertion region 2720 may be determined using a preset algorithm or input received from a user.

In this case, it can be seen that the marker region 2710 is divided into a portion overlapping the insertion region 2720 and a non-overlapping portion.

In this case, a region in which the marker region 2710 and the insertion region 2720 overlap each other is covered with and hidden by a virtual indirect advertisement inserted or to be inserted, inpainting may be performed on only a non-overlapping region.

Figure 23:
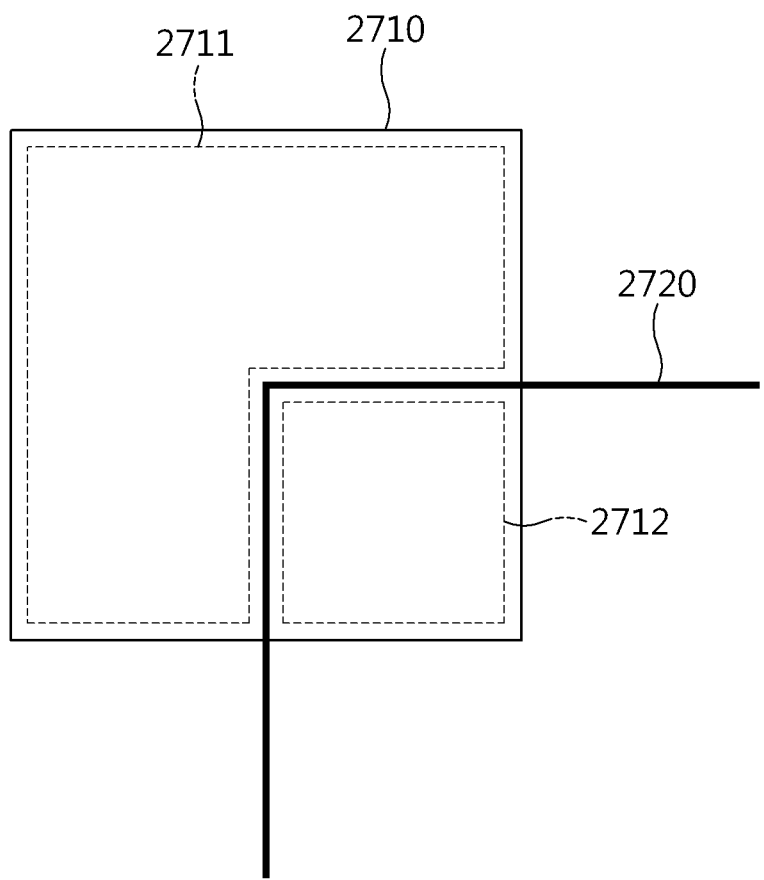
FIG. 23 is a diagram showing an example of an inpainting region according to the present invention.
Figure 24:
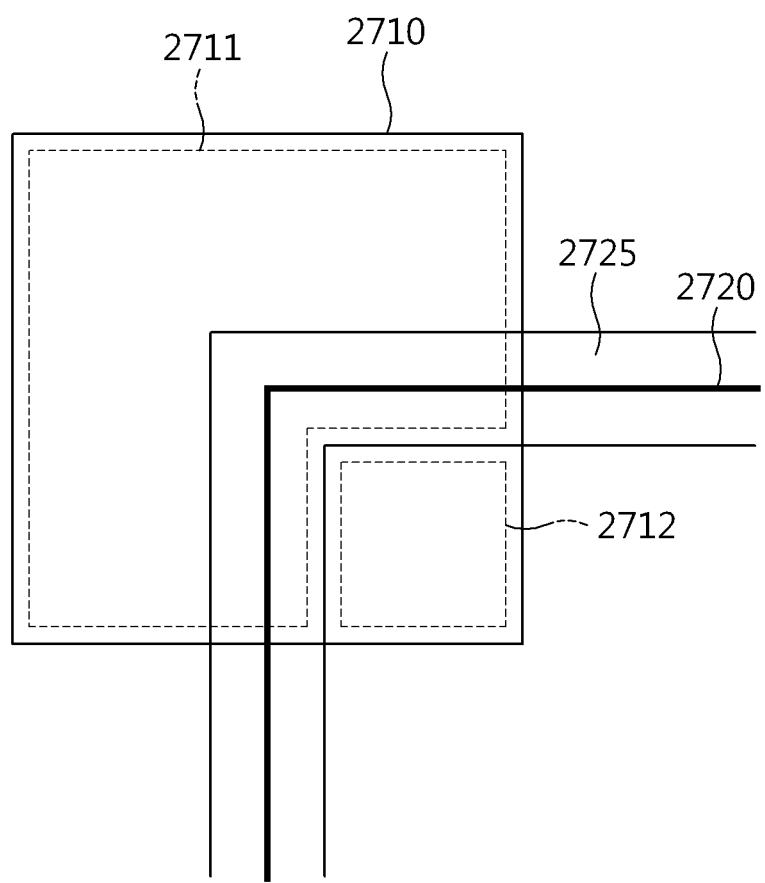
FIG. 24 is a diagram showing another example of an inpainting region according to the present invention.

In FIGS. 23 and 24, a method for performing inpainting only part of a marker region 2710 is described in detail below.

FIG. 23 is a diagram showing an example of an inpainting region 2711 according to the present invention.

Referring to FIG. 23, it can be seen that the inpainting region 2711 according to the present invention is part of the marker region 2710 shown in FIG. 22.

The inpainting region 2711 according to the present invention may be determined by the region determination unit 2120 shown in FIG. 16.

The region determination unit 2120 shown in FIG. 16 may divide the marker region 2710 into the inpainting region 2711 and the non-inpainting region 2712, and may determine the inpainting region 2711 to be a marker elimination region.

In this case, the region determination unit 2120 may determine whether each of marker pixels within the marker region 2710 is present in the insertion region 2720, and may determine marker pixels, not present in the insertion region 2720, to be the inpainting region 2711.

In this case, the region determination unit 2120 may determine whether each of marker pixels within the marker region 2710 is present in the insertion region 2720, and may determine marker pixels, present in the insertion region 2720, to be the non-inpainting region 2712.

That is, since the non-inpainting region is a marker portion that is covered with and hidden by the virtual indirect advertisement, inpainting may be performed on only a non-overlapping region.

Accordingly, this can reduce inpainting operation costs compared to performing inpainting on the overall marker.

FIG. 24 is a diagram showing another example of an inpainting region according to the present invention.

Referring to FIG. 24, it can be seen that the inpainting region 2711 according to the present invention is part of the marker region 2710 shown in FIG. 22.

Furthermore, it can be seen that the inpainting region 2711 according to the present invention includes part of the insertion region 2720, unlike the inpainting region shown in FIG. 23.

The inpainting region 2711 according to the present invention may be determined by the region determination unit 2120 shown in FIG. 16.

The region determination unit 2120 shown in FIG. 16 may generate an insertion boundary region 2725 including pixels forming an insertion boundary, and may include part of the insertion boundary region 2725 in the inpainting region 2711.

In this case, the region determination unit 2120 shown in FIG. 16 may determine whether each of pixels forming the boundary of the insertion region 2720 is present within a preset distance from the boundary insertion region 2720, may determine a region composed of pixels present within the preset distance to be the insertion boundary region 2725, and may determine a marker elimination region by considering the insertion boundary region 2725.

In this case, the region determination unit 2120 shown in FIG. 16 may determine whether each of pixels within the insertion boundary region 2725 is present in the marker region 2710 and the insertion region 2720, and may include pixels, present in the marker region 2710 and the insertion region 2720, in the inpainting region 2711.

As described above, the traces of markers that may occur on the boundary surface of the insertion region 2720 can be more efficiently eliminated by extending the inpainting region 2711 according to the present invention.

Although not shown in FIG. 24, the region determination unit 2120 shown in FIG. 16 may extend the inpainting region 2711 in order to perform inpainting on predetermined pixels outside the marker boundary.

For example, the region determination unit 2120 shown in FIG. 16 may generate a marker boundary region including pixels forming the marker boundary, and may include part of the marker boundary region in the inpainting region 2711.

In this case, the region determination unit 2120 shown in FIG. 16 may determine whether each of pixels forming the boundary of the marker region 2710 is present within a preset distance from the boundary of the marker region 2710, may determine a region composed of pixels present within the preset distance to be a marker boundary region, and may determine a marker elimination region by considering the marker boundary region.

In this case, the region determination unit 2120 shown in FIG. 16 may determine whether each of pixels within the marker boundary region is present in the marker region 2710 and the insertion region 272, and may include pixels, not present in the marker region 2710 and the insertion region 2720, in the inpainting region 2711.

As described above, the traces of markers that may occur on the boundary surface of the insertion region 2710 can be more efficiently eliminated by extending the inpainting region 2711 according to the present invention.

Figure 25:
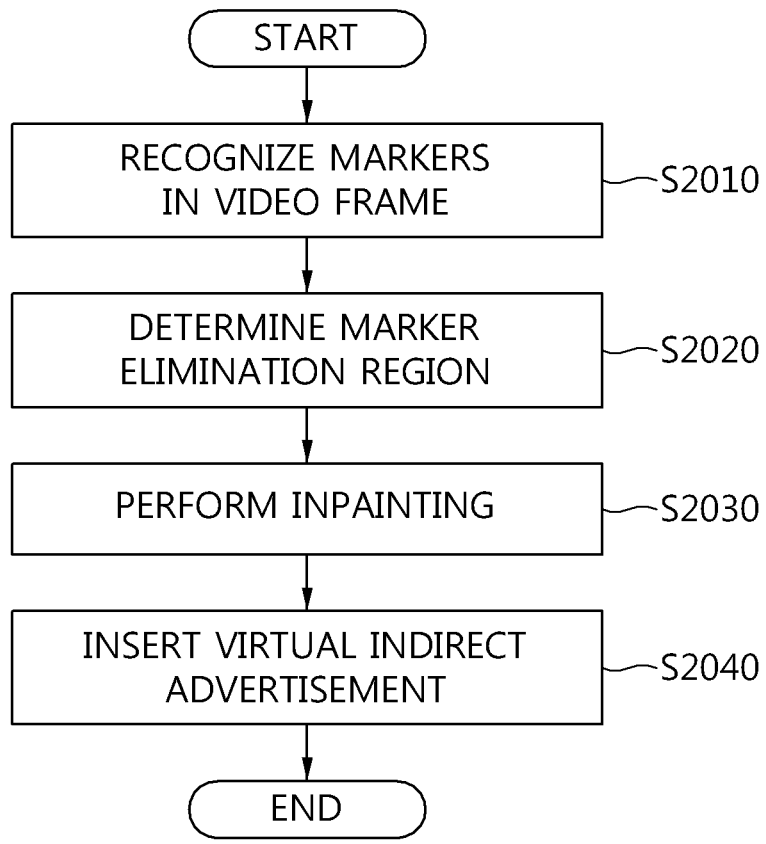
FIG. 25 is an operation flowchart showing a method of eliminating markers for the insertion of a virtual indirect advertisement according to an embodiment of the present invention.

FIG. 25 is an operation flowchart showing a method of eliminating markers for the insertion of a virtual indirect advertisement according to an embodiment of the present invention.

Referring to FIG. 25, in the method of eliminating markers for the insertion of a virtual indirect advertisement according to the embodiment of the present invention, markers included in the frames of a video are recognized at step S2010.

In this case, at step S2010, markers included in the frames of a video may be recognized using a preset algorithm or input received from a user.

Furthermore, in the method of eliminating markers for the insertion of a virtual indirect advertisement according to the embodiment of the present invention, a marker region corresponding to each marker, an insertion region into which a virtual indirect advertisement will be inserted, and a marker elimination region are determined using the marker region and the insertion region at step S2020.

In this case, at step S2020, the marker region and the insertion region may be determined using a preset algorithm or input received from the user.

In this case, at step S2020, the marker region may be divided into an inpainting region and a non-inpainting region, and the inpainting region may be determined to be a marker elimination region.

In this case, at step S2020, it may be determined whether each of marker pixels within the marker region is present in the insertion region, and marker pixels, not present in the insertion region, may be determined to be the inpainting region.

In this case, at step S2020, it may be determined whether each of marker pixels within the marker region is present in the insertion region, and marker pixels, present in the insertion region, may be determined to be the non-inpainting region.

That is, since the non-inpainting region is a marker portion that is covered with and hidden by the virtual indirect advertisement, inpainting may be performed on only a non-overlapping region.

Accordingly, this can reduce inpainting operation costs compared to performing inpainting on the overall marker.

In this case, at step S2020, an insertion boundary region including pixels forming an insertion boundary may be generated, and part of the insertion boundary region may be included in the inpainting region.

In this case, at step S2020, it may be determined whether each of the pixels forming the boundary of the insertion region is present within a preset distance from the boundary of the insertion region, a region composed of pixels present within a preset distance may be determined to be the insertion boundary region, and the marker elimination region may be determined by considering the insertion boundary region.

In this case, at step S2020, it may be determined whether each of the pixels within the insertion boundary region is present in the marker region and the insertion region, and pixels, present in the marker region and the insertion region, may be included in the inpainting region.

In this case, at step S2020, the marker boundary region including the pixels forming the marker boundary may be generated, and part of the marker boundary region may be included in the inpainting region.

In this case, at step S2020, it may be determined whether each of pixels forming the boundary of the marker region is present within a preset distance from the boundary of the marker region, a region composed of pixels, present within the preset distance, may be determined to be the marker boundary region, and the marker elimination region may be determined by considering the marker boundary region.

In this case, at step S2020, it may be determined whether each of pixels within the marker boundary region is present in the marker region and the insertion region, and pixels, not present in the marker region and the insertion region, may be included in the inpainting region.

Furthermore, in the method of eliminating markers for the insertion of a virtual indirect advertisement according to the embodiment of the present invention, inpainting is performed on only the marker elimination region at step S2030.

In this case, at step S2030, an image, corresponding to the inpainting region, may be divided into a structure image and a texture image, a processed structure image may be generated by performing inpainting on the structure image in such a manner that a pixel proximate to the periphery of the inpainting region diffuses into the inpainting region along a line of an equal gray value, a processed texture image may be generated by performing texture synthesis on the texture image, and the processed structure image may be synthesized with the processed texture image.

In this case, the structure image may be an image including only the structure of an object included in the image. That is, the structure image includes the shape, color, brightness and the like of the object.

In this case, the texture image may be an image including only the texture of the object included in the image. That is, the texture image includes the pattern, texture and the like of the object.

In this case, since the vision of humans is more sensitive to the attribute of a region, such as the structure, texture or the like, than gray values, inpainting based on the attribute of a region, such as the structure, texture or the like, may generate a more natural image than inpainting based on gray values when inpainting is performed.

In this case, in the case of the algorithm which performs inpainting through diffusion along a line of an equal gray value, a good-looking result is generated by connecting the structures of the region of an inpainting target, but a disadvantage arises in that blur occurs in an image in the case of a region having texture.

In this case, the texture synthesis refers to generating the texture information of a large image from the texture information of a small sample image. That is, the texture information of a large image which will fill the inpainting region is generated from the texture information of a sample image selected from a region excluding the inpainting region.

In this case, as to the sample image, a single sample image may be selected and then texture synthesis may be performed, or a plurality of sample images may be selected and then texture synthesis may be performed, thereby generating a single large image.

In this case, at step S2030, each of the inpainting region and the region excluding the inpainting region may be segmented into unit patches, the most consistent patch may be selected in the region excluding the inpainting region with respect to each patch of the inpainting region, and each patch of the inpainting region may be synthesized with a selected patch.

In this case, the size of the patch may not be fixed, but may vary depending on the situation.

In this case, when the patch is selected, the most consistent patch may be selected based on assigned priorities or weights. In this case, a higher priority may be assigned to a patch having high sparsity different from surroundings. In this case, the weight may be assigned based on the distance.

In this case, a single patch may not be selected, but the sum of the weights of a plurality of candidate patches may be obtained using nonlocal means and then selection may be performed. Alternatively, local patch consistency may be used instead of the nonlocal means.

In this case, at step S2030, inpainting may be performed from a unit region corresponding to the periphery of the inpainting region in an internal direction.

Accordingly, this can perform inpainting more natural than inpainting in a unit region corresponding to the interior of the inpainting region where an image that can be referred to is not present in surroundings, and is more efficient because inpainting can be terminated when a target region is terminated or a non-inpainting region is met.

Furthermore, in the method of eliminating markers for the insertion of a virtual indirect advertisement according to the embodiment of the present invention, a virtual indirect advertisement is inserted into the insertion region after the inpainting of the marker elimination region at step 2040.

The steps shown in FIG. 25 may be performed in the sequence shown in FIG. 25, in a sequence reverse to the former sequence, or concurrently.

The method of eliminating markers for the insertion of a virtual indirect advertisement according to the present invention may be implemented as a program or smart phone app that can be executed by various computer means. In this case, the program or smart phone app may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

The device and method of eliminating markers for the insertion of a virtual indirect advertisement according to the present invention are not limited to the configurations and methods of the above-described embodiments, but some or all of the embodiments may be configured to be selectively combined such that the embodiments can be modified in various manners.

A virtual indirect advertisement service device and method according to embodiments of the present invention are described below.

Figure 26:
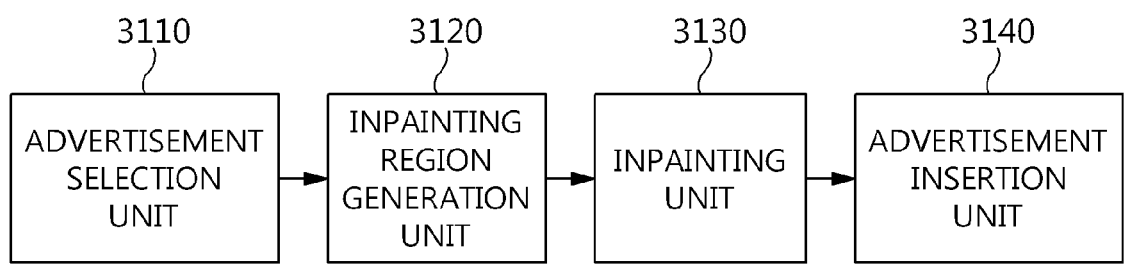
FIG. 26 is a block diagram showing a virtual indirect advertisement service device according to an embodiment of the present invention.

FIG. 26 is a block diagram showing a virtual indirect advertisement service device according to an embodiment of the present invention.

Referring to FIG. 26, the virtual indirect advertisement service device according to the embodiment of the present invention includes an advertisement selection unit 3110, an inpainting region generation unit 3120, an inpainting unit 3130, and an advertisement insertion unit 3140.

The advertisement selection unit 3110 selects a virtual indirect advertisement which will be inserted into video image content.

The inpainting region generation unit 3120 generates an inpainting region and a non-inpainting region by comparing the virtual indirect advertisement with an existing advertisement included in the video image content.

In this case, the inpainting region generation unit 3120 may generate a target region including the region of the existing advertisement, and may generate the inpainting region and the non-inpainting region by dividing the target region.

In this case, the target region is a region including the region of the existing advertisement, and may be set using a preset algorithm or input received from a user.

In this case, the non-inpainting region is a region that is completely covered when the virtual indirect advertisement is inserted. In this case, the non-inpainting region may be a region which is smaller than or equal to a virtual indirect advertisement to be inserted.

In this case, the inpainting region may be a region obtained by excluding the non-inpainting region from the target region.

That is, since the non-inpainting region is covered with and hidden by the virtual indirect advertisement, inpainting may be performed on only a non-overlapping region.

Accordingly, this can reduce inpainting operation costs compared to performing inpainting on the overall target region.

The inpainting unit 3130 performs inpainting on only the inpainting region.

In this case, the inpainting unit 3130 may perform inpainting from a unit region corresponding to the periphery of the inpainting region in an internal direction.

Accordingly, this can perform inpainting more natural than inpainting in a unit region corresponding to the interior of the inpainting region where an image that can be referred to is not present in surroundings, and is more efficient because inpainting can be terminated when a target region is terminated or a non-inpainting region is met.

The advertisement insertion unit 3140 inserts a virtual indirect advertisement into the video image content after the inpainting of the marker elimination region.

Figure 27:
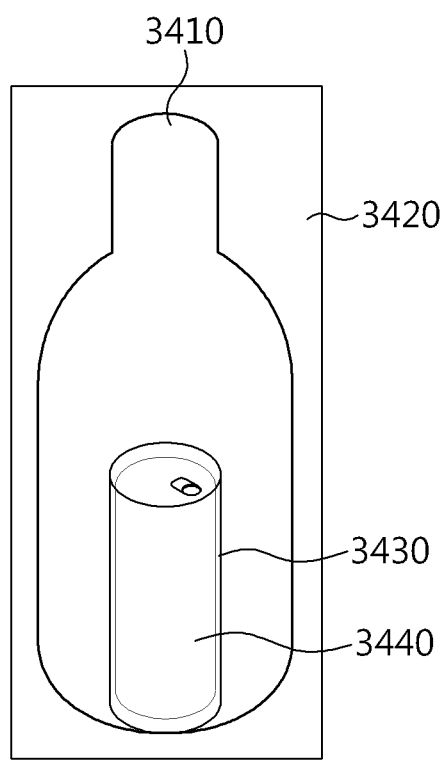
FIG. 27 is a diagram showing an example of an inpainting region according to an embodiment of the present invention.

FIG. 27 is a diagram showing an example of an inpainting region according to an embodiment of the present invention.

Referring to FIG. 27, video image content into which a virtual indirect advertisement has been inserted according to an embodiment of the present invention includes an existing advertisement region 3410, a target region 3420, a virtual indirect advertisement 3430, and a non-inpainting region 3440.

The target region 3420 including the existing advertisement region 3410 is generated.

In this case, the target region 3420 may be set using a preset algorithm or input received from a user.

In this case, the target region 3420 may be generated to include the existing advertisement region 3410 while having no connection with the shape of the existing advertisement region 3410 or maintaining the shape of the existing advertisement region 3410.

The non-inpainting region 3440 is a region that is completely covered when the virtual indirect advertisement 3430 is inserted. In this case, the non-inpainting region 3440 may be the same as or smaller than the region of the virtual indirect advertisement 3430 that is inserted.

The inpainting region is a region obtained by excluding the non-inpainting region 3440 from the target region 3420.

Performing inpainting on only the inpainting region can reduce inpainting operation costs compared to performing inpainting on the overall target region 3420.

Figure 28:
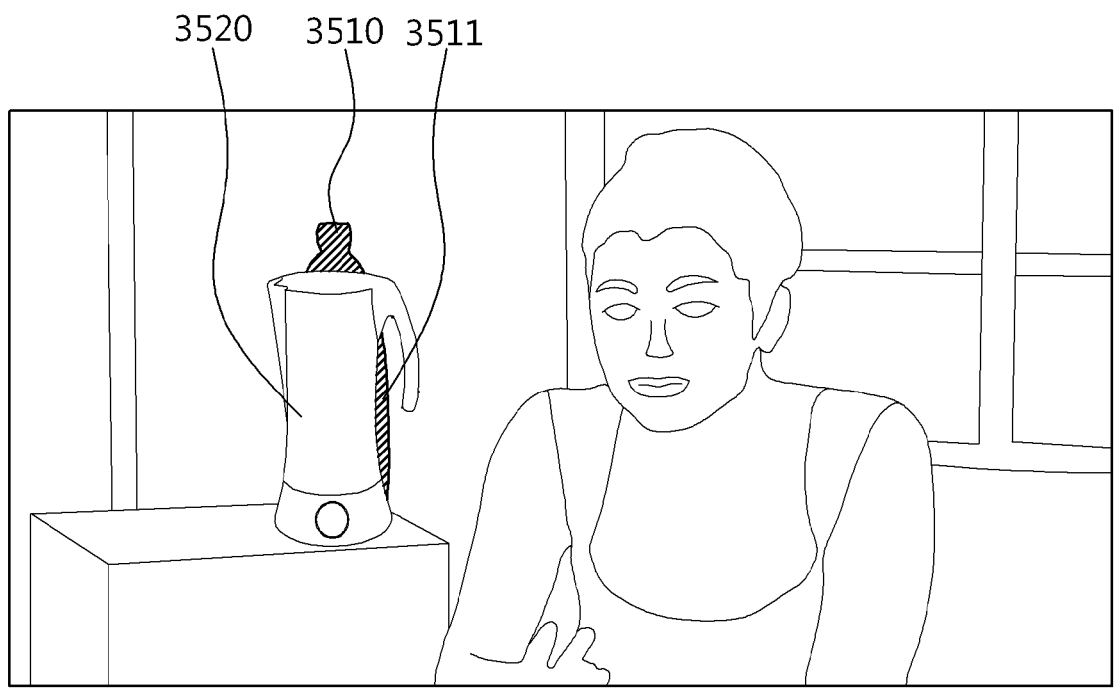
FIG. 28 is a diagram showing an example of video image content into which virtual indirect advertisement has been inserted according to an embodiment of the present invention.

FIG. 28 is a diagram showing an example of video image content into which virtual indirect advertisement has been inserted according to an embodiment of the present invention.

Referring to FIG. 28, the video image content into which a virtual indirect advertisement has been inserted according to the embodiment of the present invention includes an inpainting region 3510 and a virtual indirect advertisement 3520.

The inpainting region 3510 is a region generated by comparing the virtual indirect advertisement 3520 with an existing advertisement included in the video image content.

In this case, inpainting regions 3510 and 3511 may be separated into two or more discontinuous regions.

A target region including the existing advertisement region is generated.

In this case, the target region may be set using a preset algorithm or input received from the user.

In this case, the target region may be generated to include the existing advertisement region while having no connection with the shape of the existing advertisement region or maintaining the shape of the existing advertisement region.

The non-inpainting region is a region that is completely covered when the virtual indirect advertisement 3520 is inserted. In this case, the non-inpainting region may be the same as or smaller than the region of the virtual indirect advertisement 3520 that is inserted.

The inpainting region 3510 and 3511 is a region obtained by excluding the non-inpainting region from the target region.

Performing inpainting on only the inpainting regions 3510 and 3511 can reduce inpainting operation costs compared to performing inpainting on the overall target region.

Figure 29:
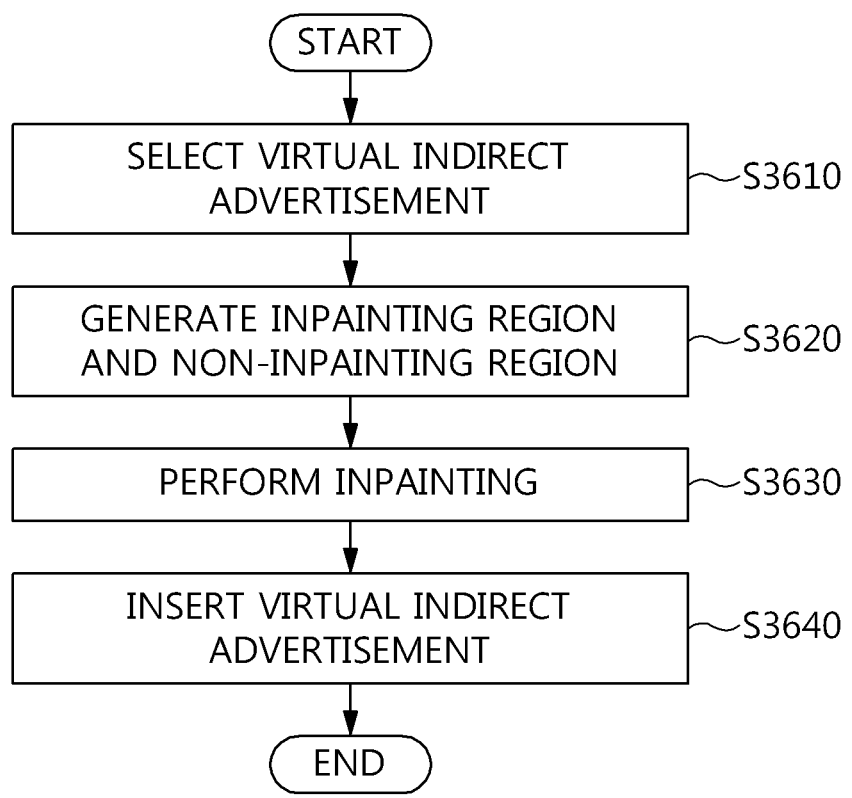
FIG. 29 is an operation flowchart showing an example of a virtual indirect advertisement service method according to an embodiment of the present invention.

FIG. 29 is an operation flowchart showing an example of a virtual indirect advertisement service method according to an embodiment of the present invention.

Referring to FIG. 29, in the virtual indirect advertisement service method according to the embodiment of the present invention, a virtual indirect advertisement which will be inserted into video image content is selected at step S3610.

Furthermore, in the virtual indirect advertisement service method according to the embodiment of the present invention, an inpainting region and a non-inpainting region are generated by comparing the virtual indirect advertisement with an existing advertisement included in the video image content at step S3620.

In this case, at step 3120 of generating an inpainting region and a non-inpainting region, a target region including the existing advertisement region may be generated, and the inpainting region and the non-inpainting region may be generated by dividing the target region.

In this case, the target region is a region including the existing advertisement region, and may be set using a preset algorithm or input received from the user.

In this case, the non-inpainting region is a region that is completely covered when the virtual indirect advertisement is inserted. In this case, the non-inpainting region may be the same as or smaller than the virtual indirect advertisement that is inserted.

In this case, the inpainting region is a region obtained by excluding the non-inpainting region from the target region.

That is, since the non-inpainting region is covered with and hidden by the virtual indirect advertisement, inpainting may be performed on only a non-overlapping region.

Accordingly, this can reduce inpainting operation costs compared to performing inpainting on the overall target region.

In this case, the non-inpainting region may be a region which belongs to the target region and overlaps the region of the virtual indirect advertisement.

Since an overlap between the target region and the virtual indirect advertisement is covered with the virtual indirect advertisement, it may be generated as a non-inpainting region on which inpainting is not performed.

Furthermore, in the virtual indirect advertisement service method according to the embodiment of the present invention, inpainting is performed on only the inpainting region at step S3630.

In this case, at the step of performing inpainting, inpainting may be performed from a unit region corresponding to the periphery of the inpainting region in an internal direction.

Accordingly, this can perform inpainting more natural than inpainting in a unit region corresponding to the interior of the inpainting region where an image that can be referred to is not present in surroundings, and is more efficient because inpainting can be terminated when a target region is terminated or a non-inpainting region is met.

Furthermore, in the virtual indirect advertisement service method according to the embodiment of the present invention, a virtual indirect advertisement is inserted into the video image content after the inpainting of the inpainting region at step S3640.

Figure 30:
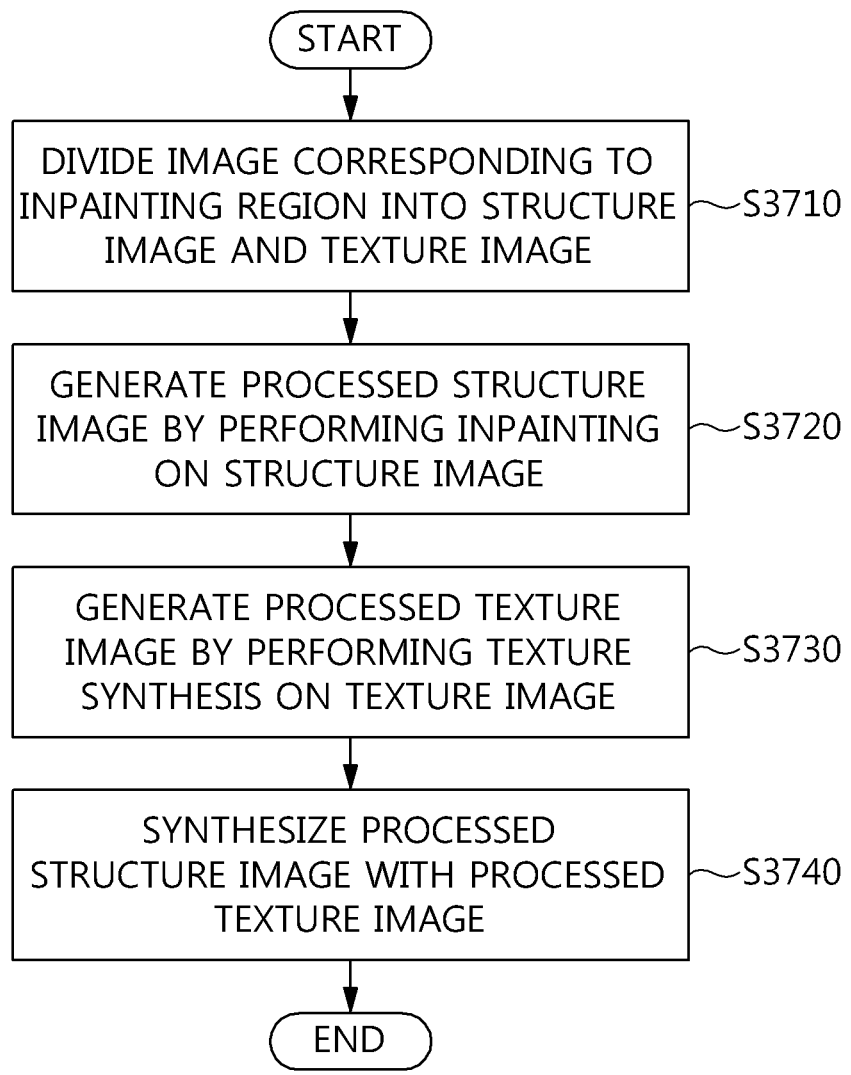
FIG. 30 is an operation flowchart showing an example of the step of performing inpainting, which is shown in FIG. 29.

FIG. 30 is an operation flowchart showing an example of the step of performing inpainting, which is shown in FIG. 29.

Referring to FIG. 30, at the step of performing inpainting, shown in FIG. 29, an image corresponding to the inpainting region is divided into a structure image and a texture image at step S3710.

In this case, the structure image may be an image including only the structure of an object included in the image. That is, the structure image includes the shape, color, brightness and the like of the object.

In this case, the texture image may be an image including only the texture of the object included in the image. That is, the texture image includes the pattern, texture and the like of the object.

Since the vision of humans is more sensitive to the attribute of a region, such as the structure, texture or the like, than gray values, inpainting based on the attribute of a region, such as the structure, texture or the like, may generate a more natural image than inpainting based on gray values when inpainting is performed.

Accordingly, inpainting is performed on the structure and the texture. Since an algorithm for generating an optimum result for the structure of the region and an algorithm for generating an optimum result for the texture of a region are different, separate optimum inpainting is performed on each of the structure and texture of the region, and then results are synthesized into a single image. In this case, more natural inpainting can be performed.

Furthermore, at the step of performing inpainting, shown in FIG. 29, a processed structure image is generated by performing inpainting on the structure image in such a manner that a pixel proximate to the periphery of the inpainting region diffuses into the inpainting region along a line of an equal gray value.

In this case, in the case of the algorithm which performs inpainting through diffusion along a line of an equal gray value, a good-looking result is generated by connecting the structures of the region of an inpainting target, but a disadvantage arises in that blur occurs in an image in the case of a region having texture.

Accordingly, inpainting cannot be performed on the texture information of the image corresponding to the inpainting region, but inpainting can be performed on the structure information thereof.

Furthermore, at the step of performing inpainting, shown in FIG. 29, a processed texture image is generated by performing texture synthesis on the texture image.

In this case, the texture synthesis refers to generating the texture information of a large image from the texture information of a small sample image. That is, the texture information of a large image which will fill the inpainting region is generated from the texture information of a sample image selected from a region excluding the inpainting region.

In this case, as to the sample image, a single sample image may be selected and then texture synthesis may be performed, or a plurality of sample images may be selected and then texture synthesis may be performed, thereby generating a single large image.

Accordingly, inpainting cannot be performed on the structure information of the image corresponding to the inpainting region, but inpainting can be performed on the texture information thereof.

Furthermore, at the step of performing inpainting, shown in FIG. 29, the processed structure image is synthesized with the processed texture image at step S3740.

Accordingly, an image in which inpainting has been performed on both the structure and texture of the image corresponding to the inpainting region can be acquired.

Figure 31:
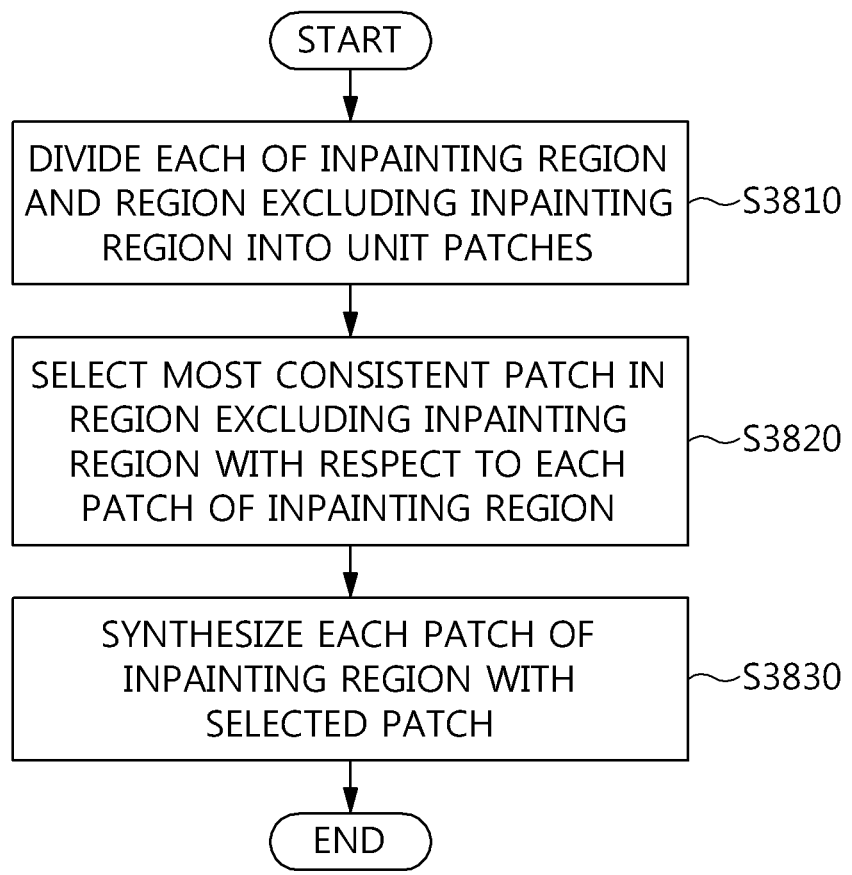
FIG. 31 is an operation flowchart showing another example of the step of performing inpainting, which is shown in FIG. 29.

FIG. 31 is an operation flowchart showing another example of the step of performing inpainting, which is shown in FIG. 29.

Referring to FIG. 31, at the step of performing inpainting, shown in FIG. 29, each of the inpainting region and a region excluding the inpainting region is divided into unit patches at step S3810.

In this case, the size of the patch may not be fixed, but may vary depending on the situation.

In the step of performing inpainting, shown in FIG. 29, the most consistent patch may be selected in the region excluding the inpainting region with respect to each patch of the inpainting region at step S3820.

In this case, when the patch is selected, the most consistent patch may be selected based on assigned priorities or weights. In this case, a higher priority may be assigned to a patch having high sparsity different from surroundings. In this case, the weight may be assigned based on the distance.

In this case, a single patch may not be selected, but the sum of the weights of a plurality of candidate patches may be obtained using nonlocal means and then selection may be performed. Alternatively, local patch consistency may be used instead of the nonlocal means.

In the step of performing inpainting, shown in FIG. 29, each patch of the inpainting region is synthesized with the selected patch at step S3830.

The steps shown in each of FIGS. 29, 30 and 31 may be performed in the sequence shown in each of FIGS. 29, 30 and 31, in a sequence reverse to the former sequence, or concurrently.

The virtual indirect advertisement service method according to the present invention may be implemented as a program or smart phone app that can be executed by various computer means. In this case, the program or smart phone app may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

The virtual indirect advertisement service method and device according to the present invention are not limited to the configurations and methods of the above-described embodiments, but some or all of the embodiments may be configured to be selectively combined such that the embodiments can be modified in various manners.

A device and method for calculating a boundary value for the insertion of a virtual indirect advertisement according to embodiments of the present invention are described below.

Figure 32:
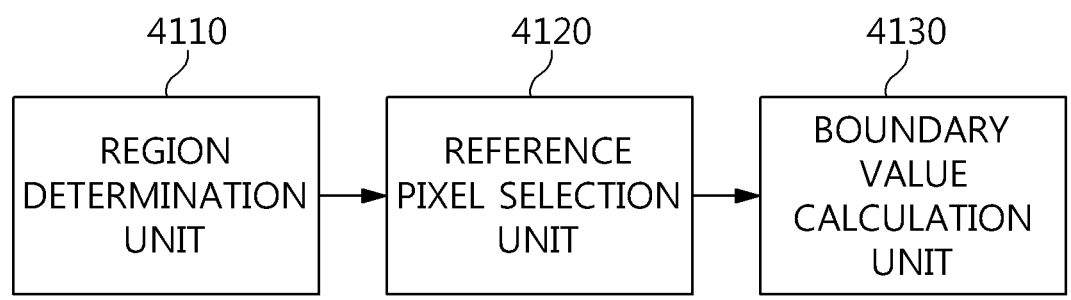
FIG. 32 is a block diagram showing a device for calculating a boundary value for the insertion of a virtual indirect advertisement according to an embodiment of the present invention.

FIG. 32 is a block diagram showing a device for calculating a boundary value for the insertion of a virtual indirect advertisement according to an embodiment of the present invention.

Referring to FIG. 32, the device for calculating a boundary value for the insertion of a virtual indirect advertisement according to the embodiment of the present invention includes a region determination unit 4110, a reference pixel selection unit 4120, and a boundary value calculation unit 4130.

The region determination unit 4110 determines a boundary region including a boundary pixel of a virtual indirect advertisement that is inserted into a frame of a video.

In this case, the region determination unit 4110 may determine whether each of the pixels of the frame of the video is present within a preset distance from the boundary pixel, and may determine a region, composed of pixels present within the preset distance, to be a boundary region.

In this case, the region determination unit 4110 may set the preset distance by considering the overall resolution of the video frame.

In this case, the region determination unit 4110 may set a longer preset distance for the higher overall resolution of the frame of the video.

In this case, the region determination unit 4110 may set the preset distance in proportion to the overall resolution of the frame of the video.

For example, the region determination unit 4110 may set the preset distance to 4 pixels when the overall resolution of the frame of the video is 1280*4720, and may set the preset distance to 6 pixels when the overall resolution of the frame of the video is 1920*1080.

In this case, the region determination unit 4110 may divide a remaining region other than the boundary region into a foreground region and a background region corresponding to the virtual indirect advertisement.

For example, the region determination unit 4110 may determine a remaining region, into which the virtual indirect advertisement has been inserted, excluding the boundary region, to be a foreground region, and may determine a region, obtained by excluding the boundary region and the foreground region from the frame of the video, to be a background region.

As described above, the device for calculating a boundary value for the insertion of a virtual indirect advertisement according to the present invention may designate pixels surrounding a virtual indirect advertisement insertion boundary line as a boundary region, and may newly calculate the pixel value of the boundary region, thereby enabling a virtual indirect advertisement insertion boundary surface to be naturally viewed.

The reference pixel selection unit 4120, with respect to each boundary region pixel within the boundary region, selects a foreground reference pixel and a background reference pixel from a remaining region other than the boundary region by considering the location of the boundary region pixel.

In this case, the reference pixel selection unit 4120 may select one of the pixels of the foreground region, which is closest to the boundary region pixel, as the foreground reference pixel.

Furthermore, the reference pixel selection unit 4120 may select one of the pixels of the background region, which is closes to the boundary region pixel, as the background reference pixel.

In this case, the foreground reference pixel is a pixel of the foreground region, and the background reference pixel is a pixel of the background region.

In this case, the reference pixel selection unit 4120 may generate a perpendicular line between the boundary region pixel and the boundary line of the remaining region.

For example, the reference pixel selection unit 4120 may draw a perpendicular line from the boundary region pixel to the boundary line of the foreground region.

In this case, the reference pixel selection unit 4120 may select one of the pixels of the foreground region, corresponding to the foot of the perpendicular line, which is closest to the boundary region pixel, as the foreground reference pixel.

Furthermore, the reference pixel selection unit 4120 may draw a perpendicular line from the boundary region pixel to the boundary line of the background region.

In this case, the reference pixel selection unit 4120 may select one of the pixels of the background region, corresponding to the foot of the perpendicular line, which is closest to the boundary region pixel, as the background reference pixel.

As described above, the device for calculating a boundary value for the insertion of a virtual indirect advertisement according to the present invention newly calculates the pixel value of the boundary region by referring to the pixel values of the background and the foreground, with respect to pixels surrounding the virtual indirect advertisement insertion boundary line, thereby enabling a virtual indirect advertisement insertion boundary surface to be naturally viewed.

In this case, the reference pixel selection unit 4120, with respect to each boundary region pixel within the boundary region, selects a previous frame reference pixel from a frame previous to the video frame and a subsequent frame reference pixel from a frame subsequent to the video frame by considering the location of the boundary region pixel.

As described above, the device for calculating a boundary value for the insertion of a virtual indirect advertisement according to the present invention newly calculates the pixel value of the current frame by referring to not only pixels surrounding the virtual indirect advertisement insertion boundary line but also the pixel values of the previous/subsequent frames, thereby enabling a virtual indirect advertisement insertion boundary surface to be naturally viewed during the playback of video.

In this case, the reference pixel selection unit 4120 may select a pixel corresponding to the location of the boundary region pixel from the previous frame as the previous frame reference pixel, and may select a pixel corresponding to the location of the boundary region pixel from the subsequent frame as the subsequent frame reference pixel.

The boundary value calculation unit 4130 calculates the boundary region pixel value using the pixel values of the foreground reference pixel and the background reference pixel and the weights of the foreground reference pixel and the background reference pixel.

In this case, the boundary value calculation unit 4130 may calculate the boundary region pixel value, as in Equation 2 below:

$$A = w_f * A_f + w_b * A_b \quad (2)$$

where A is the boundary region pixel value, $A_f$ is the foreground reference pixel value, $A_b$ is the background reference pixel value, $w_f$ is the foreground reference pixel weight, and $w_b$ is the background reference pixel weight.

In this case, the boundary value calculation unit 4130 may set the weight of the foreground reference pixel based on the distance between the boundary region pixel and the foreground reference pixel, and may set the weight of the background reference pixel based on the distance between the boundary region pixel and the background reference pixel.

In this case, the boundary value calculation unit 4130 may set the weight of the foreground reference pixel and the background reference pixel in inverse proportion to the distance from the boundary region pixel.

In this case, the boundary value calculation unit 4130 may set the weights so that the sum of the weight of the foreground reference pixel and the weight of the background reference pixel becomes 1.

For example, when the distance between the boundary region pixel and the foreground reference pixel is 1 and the distance between the boundary region pixel and the background reference pixel is 3, the boundary value calculation unit 4130 may set the weight of the foreground reference pixel to 0.75 and the weight of the background reference pixel to 0.25.

As described above, the device for calculating a boundary value for the insertion of a virtual indirect advertisement according to the present invention newly calculates the pixel value of the boundary region by referring to the pixel values of the background and the foreground, with respect to pixels surrounding the virtual indirect advertisement insertion boundary line, thereby enabling a virtual indirect advertisement insertion boundary surface to be naturally viewed.

In this case, the boundary value calculation unit 4130 may calculate the boundary region pixel value using the pixel values of the previous frame reference pixel and the subsequent frame reference pixel and the weights of the previous frame reference pixel and the subsequent frame reference pixel.

In this case, the boundary value calculation unit 4130 may calculate the boundary region pixel value, as in Equation 3 below:

$$A = w_{t-1} * A(t-1) + w_t * A(t) + w_{t+1} * A(t-1), A(t) = w_{f,t} * A_{f,t} + w_{b,t} * A_{b,t} \quad (3)$$

where A is the boundary region pixel value, $A_f$ is the foreground reference pixel value, $A_b$ is the background reference pixel value, $w_f$ is the foreground reference pixel weight, and $w_b$ is the background reference pixel weight.

where A is the final boundary region pixel value, A(t) is the reference frame reference pixel value, A(t−1) is the boundary region pixel value of the previous frame, A(t+1) is the boundary region pixel value of the subsequent frame, $w_t$ is the weight of the reference frame reference pixel, $w_{t-1}$ is the weight of the previous frame reference pixel, $w_{t+1}$ is the weight of the subsequent frame reference pixel, $A_{f,t}$ is the foreground reference pixel value of the reference frame, $A_{b,t}$ is the background reference pixel value of the reference frame, $w_{f,t}$ is the foreground reference pixel weight of the reference frame, and $w_{b,t}$ is the background reference pixel weight of the reference frame.

In this case, the boundary value calculation unit 4130 may set the weights so that the sum of the weight of the previous frame reference pixel, the weight of the subsequent frame reference pixel and the weight of the reference frame reference pixel becomes 1.

For example, when the distance between the boundary region pixel and the foreground reference pixel is 1 and the distance between the boundary region pixel and the background reference pixel is 3, the boundary value calculation unit 4130 may set the weight of the foreground reference pixel to 0.75, the weight of the background reference pixel to 0.25, the weight of the previous frame reference pixel to 0.25, the weight of the subsequent frame reference pixel to 0.25, and the weight of the reference frame reference pixel to 0.5.

As described above, the device for calculating a boundary value for the insertion of a virtual indirect advertisement according to the present invention newly calculates the pixel value of the current frame by referring to not only pixels surrounding the virtual indirect advertisement insertion boundary line but also the pixel values of the previous/subsequent frames, thereby enabling a virtual indirect advertisement insertion boundary surface to be naturally viewed during the playback of video.

Figure 33:
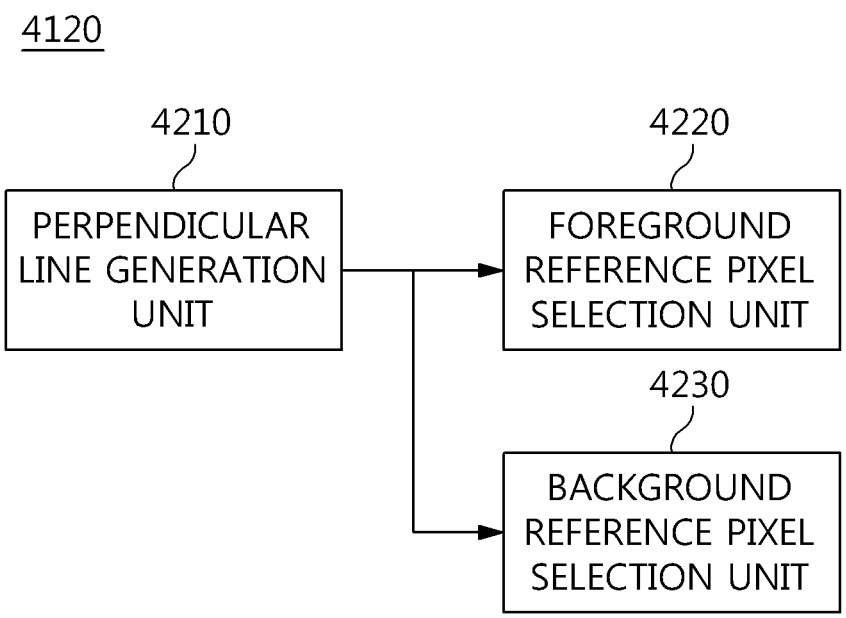
FIG. 33 is a block diagram showing an example of the reference pixel selection unit shown in FIG. 32.

FIG. 33 is a block diagram showing an example of the reference pixel selection unit 4120 shown in FIG. 32.

Referring to FIG. 33, the reference pixel selection unit 4120 shown in FIG. 32 includes a perpendicular line generation unit 4210, a foreground reference pixel selection unit 4220, and a background reference pixel selection unit 4230.

The perpendicular line generation unit 4210 may draw a perpendicular line from a boundary region pixel to the boundary line of a foreground region.

The foreground reference pixel selection unit 4220 may select one of the pixels of the foreground region, corresponding to the foot of the perpendicular line, which is closest to a boundary region pixel, as a foreground reference pixel.

The background reference pixel selection unit 4230 may select one of the pixels of the background region, corresponding to the foot of the perpendicular line, which is closest to the boundary region pixel, as a background reference pixel.

That is, it can be seen that the reference pixel selection unit 4120 shown in FIG. 32 selects the foreground reference pixel and the background reference pixel using the foot of the perpendicular line.

Although not shown in FIG. 33, the reference pixel selection unit 4120 shown in FIG. 32 may select a pixel corresponding to the location of the boundary region pixel from a previous frame as a previous frame reference pixel, and may select a pixel corresponding to the location of the boundary region pixel from a subsequent frame as a subsequent frame reference pixel.

That is, it can be seen that the reference pixel selection unit 4120 shown in FIG. 32 selects not only the foreground reference pixel and the background reference pixel but also the previous frame reference pixel and the subsequent frame reference pixel.

Figure 34:
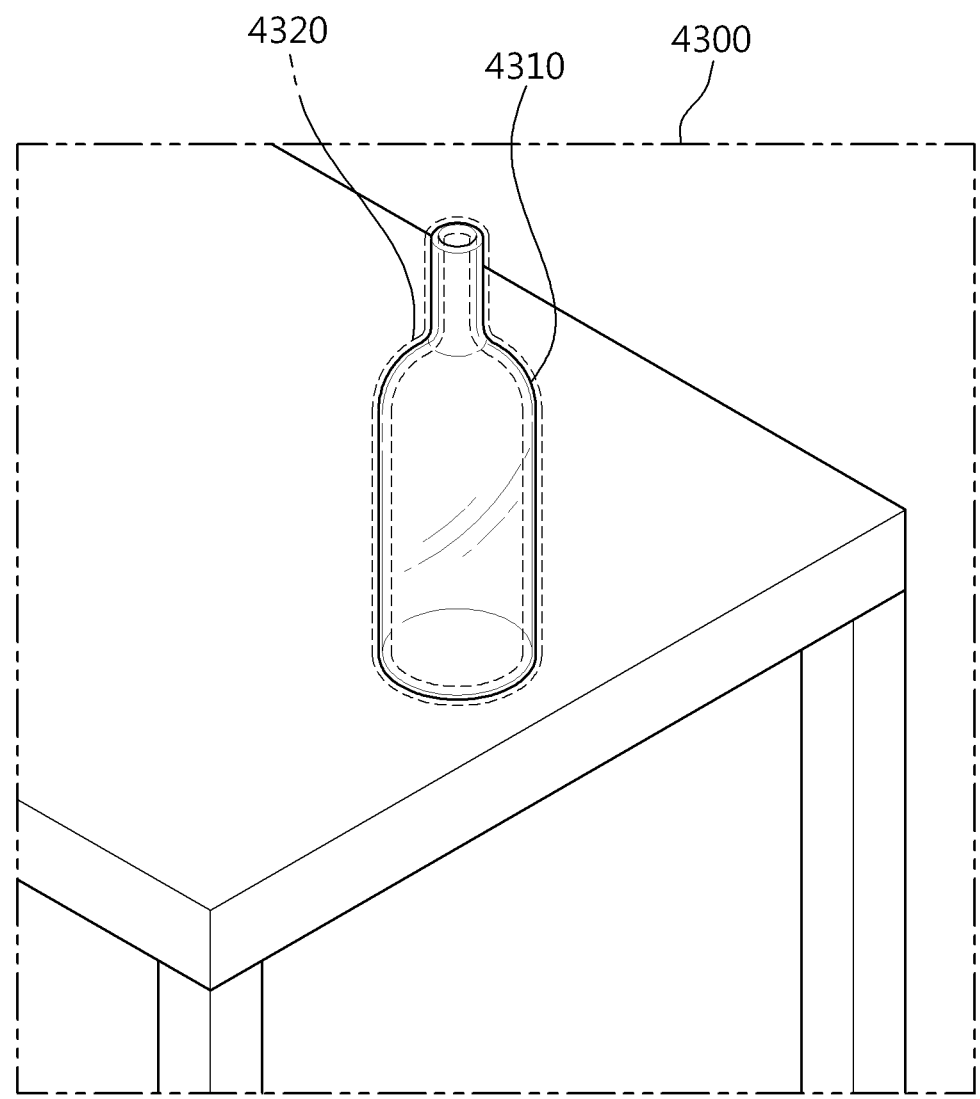
FIG. 34 is a diagram showing an example of a video frame into which a virtual indirect advertisement has been inserted according to the present invention.

FIG. 34 is a diagram showing an example of a video frame 4300 into which a virtual indirect advertisement 4310 has been inserted according to the present invention.

The device for calculating a boundary value for the insertion of a virtual indirect advertisement 4310 according to the present invention recognizes the boundary pixels of the virtual indirect advertisement 4310 in the video frame 4300 into which the virtual indirect advertisement 4310 has been inserted, and determines a boundary region 4320 including the boundary pixels.

In this case, the video frame 4300 includes the virtual indirect advertisement 4310.

That is, it can be seen that the device for calculating a boundary value for the insertion of the virtual indirect advertisement 4310 according to the present invention calculates the pixel value of the surroundings of a boundary line within which the inserted virtual indirect advertisement 4310 has been inserted after the step of inserting the virtual indirect advertisement 4310.

In this case, the boundary region 4320 may be a region composed of pixels present within a preset distance from the boundary line within which the virtual indirect advertisement 4310 has been inserted.

In this case, the boundary region 4320 is intended to enable the boundary line within which the virtual indirect advertisement 4310 has been inserted to be naturally viewed to a user, and thus the width of the boundary region 4320 may be determined by considering the overall resolution of the video frame 4300.

For example, the boundary region 4320 has a width of 9 pixels when the overall resolution of the video frame 4300 is 1280*4720, and has a width of 13 pixels when the overall resolution of the video frame 4300 is 1920*1080.

Figure 35:
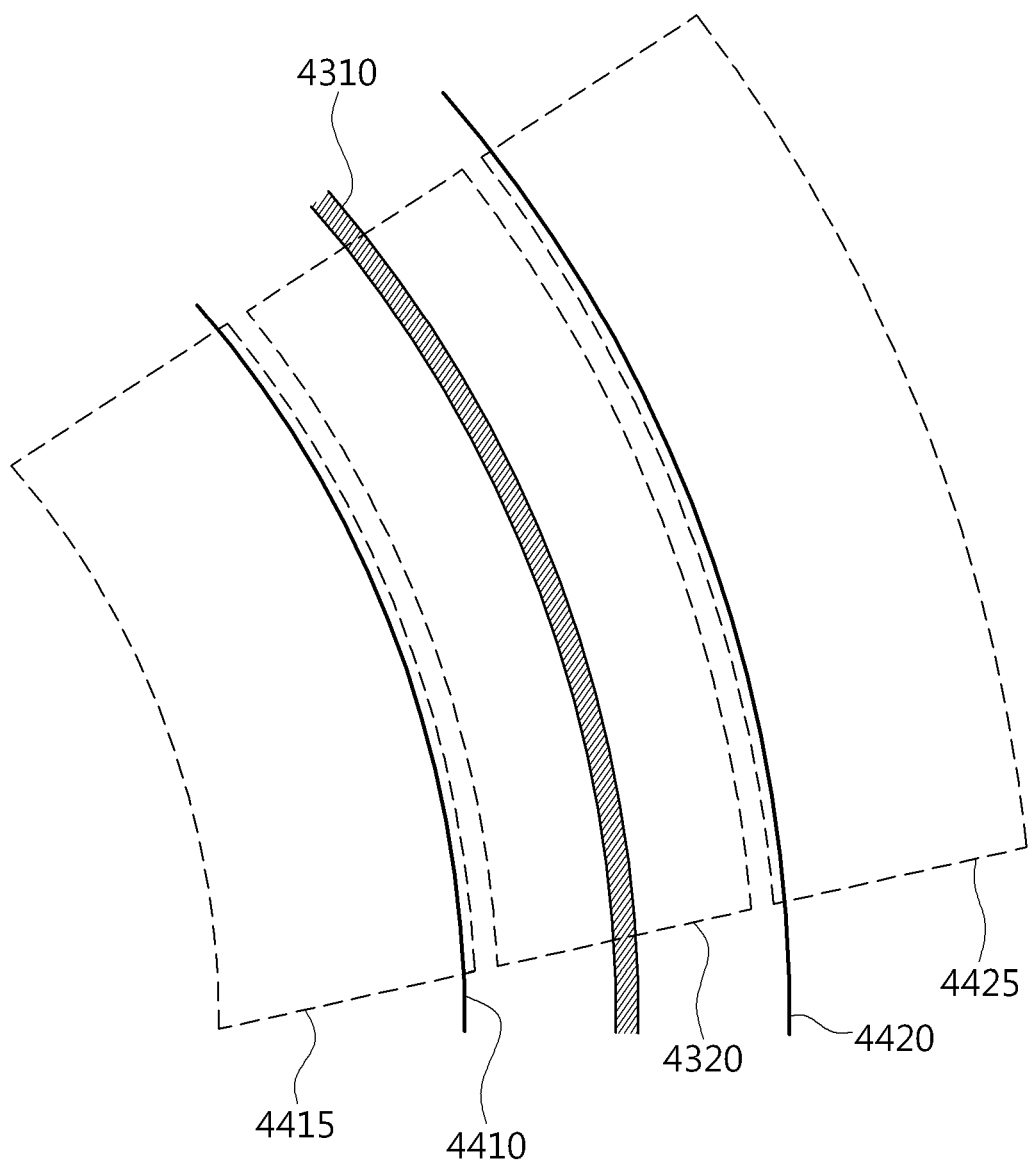
FIG. 35 is a diagram showing examples of a boundary region, a foreground region and a background region according to the present invention.

FIG. 35 is a diagram showing examples of a boundary region, a foreground region and a background region according to the present invention.

Referring to FIG. 35, it can be seen that FIG. 35 shows the extensions of part of the boundary line of the virtual indirect advertisement 4310 and the boundary region 4320 shown in FIG. 34.

The device for calculating a boundary value for the insertion of a virtual indirect advertisement 4310 according to the present invention determines a region, which belongs to a region excluding the boundary region 4320 and corresponds to the virtual indirect advertisement 4310, to be a foreground region 4415, and determines a region, which corresponds to a remaining portion corresponding to a background before the insertion of the virtual indirect advertisement 4310, to be a background region 4425.

In this case, the device for calculating a boundary value for the insertion of the virtual indirect advertisement 4310 according to the present invention selects reference pixels from the boundary line 4410 of the foreground region and the boundary line 4420 of the background region.

That is, it can be seen that the device for calculating a boundary value for the insertion of the virtual indirect advertisement 4310 according to the present invention determines a region, surrounding a boundary line within which the virtual indirect advertisement 4310 has been inserted, to be the boundary region 4320 and calculates a pixel value within the boundary region 4320 from pixels constituting the boundary line 4410 of the foreground region and the boundary line 4420 of the background region located outside the boundary region 4320.

Figure 36:
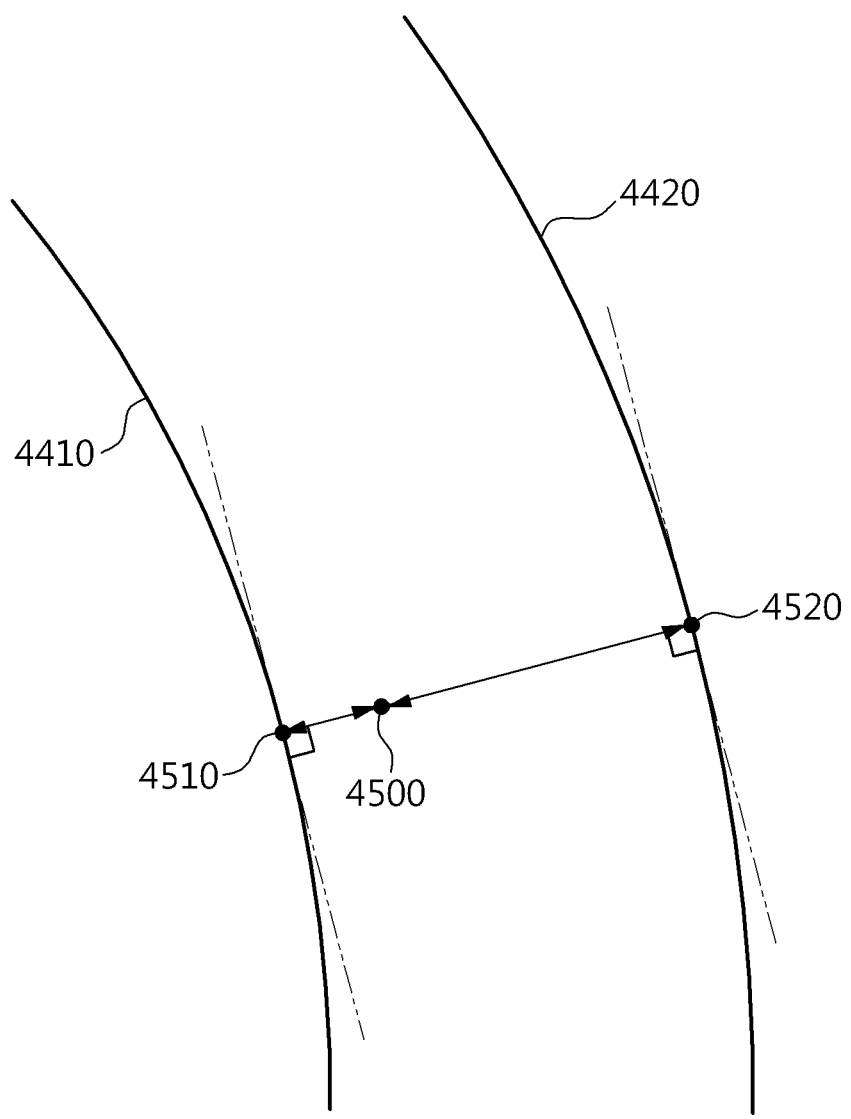
FIG. 36 is a diagram showing an example of selecting a foreground reference pixel and a background reference pixel according to the present invention.

FIG. 36 is a diagram showing an example of selecting a foreground reference pixel and a background reference pixel according to the present invention.

Referring to FIG. 36, the device for calculating a boundary value for the insertion of a virtual indirect advertisement according to the present invention, with respect to each boundary region pixel 4500 within a boundary region, selects a foreground reference pixel 4510 and a background reference pixel 4520 from a foreground region boundary line 4410 and a background region boundary line 4420, respectively, by considering the location of the boundary region pixel 4500.

In this case, the device for calculating a boundary value for the insertion of a virtual indirect advertisement according to the present invention may select one of the pixels of the foreground region boundary line 4410, which is closest to the boundary region pixel 4500, as the foreground reference pixel 4510.

Furthermore, the device for calculating a boundary value for the insertion of a virtual indirect advertisement according to the present invention may select one of the pixels of the background region boundary line 4420, which is closest to the boundary region pixel 4500, as the background reference pixel 4520.

In this case, the device for calculating a boundary value for the insertion of a virtual indirect advertisement according to the present invention may generate perpendicular lines between the boundary region pixel 4500 and the foreground region boundary line 4410 and between the boundary region pixel 4500 and the background region boundary line 4420.

In this case, the device for calculating a boundary value for the insertion of a virtual indirect advertisement according to the present invention may select one of the pixels of the foreground region boundary line 4410, corresponding to the foot of the perpendicular line, which is closest to the boundary region pixel 4500, as the foreground reference pixel 4510.

Furthermore, the device for calculating a boundary value for the insertion of a virtual indirect advertisement according to the present invention may select one of the pixels of the background region boundary line 4420, corresponding to the foot of the perpendicular line, which is closest to the boundary region pixel 4500, as the background reference pixel 4520.

That is, it can be seen that the reference pixel selection unit 4120 shown in FIG. 32 selects the foreground reference pixel and the background reference pixel using the foot of a perpendicular line.

Referring to FIG. 36, it can be seen that the device for calculating a boundary value for the insertion of a virtual indirect advertisement according to the present invention selects the foreground reference pixel and the background reference pixel using the foot of a perpendicular line.

Figure 37:
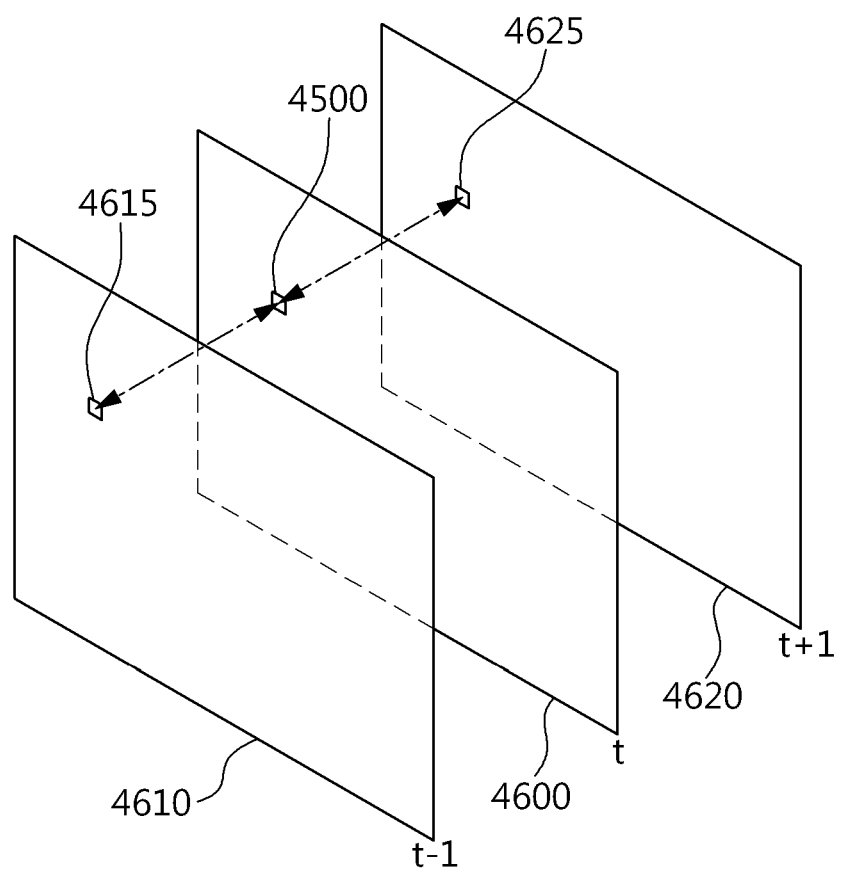
FIG. 37 is a diagram showing an example of selecting a previous frame reference pixel and a subsequent frame reference pixel according to the present invention.

FIG. 37 is a diagram showing an example of selecting a previous frame reference pixel and a subsequent frame reference pixel according to the present invention.

Referring to FIG. 37, the device for calculating a boundary value for the insertion of a virtual indirect advertisement according to the present invention, with respect to a boundary region pixel 4500 within a boundary region, may select a previous frame reference pixel 4615 from a frame 4610 previous to the current frame 4600 of a video and a subsequent frame reference pixel 4625 from a frame 4620 subsequent to the current frame 4600 of the video by considering the location of the boundary region pixel 4500.

In this case, the device for calculating a boundary value for the insertion of a virtual indirect advertisement according to the present invention may select a pixel corresponding to the location of the boundary region pixel 4500 from the previous frame 4610 as the previous frame reference pixel 4615, and may select a pixel corresponding to the location of the boundary region pixel 4500 from the subsequent frame 4620 as the subsequent frame reference pixel 4625.

Figure 38:
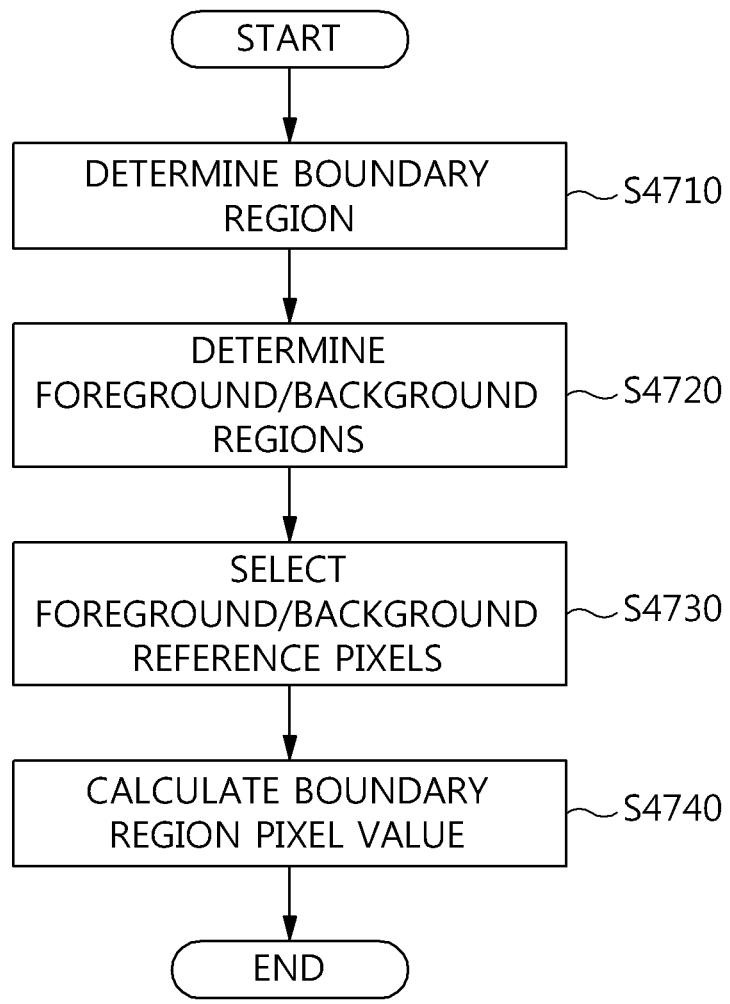
FIG. 38 is an operation flowchart showing a method of calculating a boundary value for the insertion of a virtual indirect advertisement according to an embodiment of the present invention.

FIG. 38 is an operation flowchart showing a method of calculating a boundary value for the insertion of a virtual indirect advertisement according to an embodiment of the present invention.

Referring to FIG. 38, in the method of calculating a boundary value for the insertion of a virtual indirect advertisement according to the embodiment of the present invention, a boundary region including a boundary pixel of a virtual indirect advertisement that is inserted into a frame of a video is determined at step 4710.

In this case, at step 4710, it may be determined whether each of the pixels of the frame of the video is present within a preset distance from the boundary pixel, and a region composed of pixels present within the preset distance may be determined to be a boundary region.

In this case, at step 4710, the preset distance may be set by considering the overall resolution of the video frame.

In this case, at step 4710, a longer preset distance may be set for the higher overall resolution of the frame of the video.

In this case, at step 4710, the preset distance may be set in proportion to the overall resolution of the frame of the video.

For example, at step 4710, the preset distance may be set to 4 pixels when the overall resolution of the frame of the video is 1280*4720, and the preset distance may be set to 6 pixels when the overall resolution of the frame of the video is 1920*1080.

In this case, in the method of calculating a boundary value for the insertion of a virtual indirect advertisement according to the embodiment of the present invention, a remaining region other than the boundary region may be determined to be a foreground region and a background region corresponding to the virtual indirect advertisement at step S4720.

For example, at step S4720, a remaining region, into which the virtual indirect advertisement has been inserted, excluding the boundary region, may be determined to be a foreground region, and a region, obtained by excluding the boundary region and the foreground region from the frame of the video, may be determined to be a background region.

As described above, in the method of calculating a boundary value for the insertion of a virtual indirect advertisement according to the embodiment of the present invention, pixels surrounding a virtual indirect advertisement insertion boundary line is designated as a boundary region, and the pixel value of the boundary region is newly calculated, thereby enabling a virtual indirect advertisement insertion boundary surface to be naturally viewed.

Furthermore, in the method of calculating a boundary value for the insertion of a virtual indirect advertisement according to the embodiment of the present invention, with respect to each boundary region pixel within the boundary region, a foreground reference pixel and a background reference pixel are selected from a remaining region other than the boundary region by considering the location of the boundary region pixel at step S4730.

In this case, at step S4730, one of the pixels of the foreground region, which is closest to the boundary region pixel, may be selected as the foreground reference pixel.

Furthermore, at step S4730, one of the pixels of the background region, which is closes to the boundary region pixel, may be selected as the background reference pixel.

In this case, the foreground reference pixel is a pixel of the foreground region, and the background reference pixel is a pixel of the background region.

In this case, at step S4730, a perpendicular line may be generated between the boundary region pixel and the boundary line of the remaining region.

For example, at step S4730, a perpendicular line may be drawn from the boundary region pixel to the boundary line of the foreground region.

In this case, at step S4730, one of the pixels of the foreground region, corresponding to the foot of the perpendicular line, which is closest to the boundary region pixel, may be selected as the foreground reference pixel.

Furthermore, at step S4730, a perpendicular line may be drawn from the boundary region pixel to the boundary line of the background region.

In this case, at step S4730, one of the pixels of the background region, corresponding to the foot of the perpendicular line, which is closest to the boundary region pixel, may be selected as the background reference pixel.

As described above, in the method of calculating a boundary value for the insertion of a virtual indirect advertisement according to the embodiment of the present invention, the pixel value of the boundary region is newly calculated by referring to the pixel values of the background and the foreground, with respect to pixels surrounding the virtual indirect advertisement insertion boundary line, thereby enabling a virtual indirect advertisement insertion boundary surface to be naturally viewed.

In this case, at step S4730, with respect to each boundary region pixel within the boundary region, a previous frame reference pixel may be selected from a frame previous to the video frame and a subsequent frame reference pixel may be selected from a frame subsequent to the video frame, by considering the location of the boundary region pixel.

As described above, in the method of calculating a boundary value for the insertion of a virtual indirect advertisement according to the present invention, the pixel value of the current frame is newly calculated by referring to not only pixels surrounding the virtual indirect advertisement insertion boundary line but also the pixel values of the previous/subsequent frames, thereby enabling a virtual indirect advertisement insertion boundary surface to be naturally viewed during the playback of video.

In this case, at step S4730, a pixel corresponding to the location of the boundary region pixel may be selected from the previous frame as the previous frame reference pixel, and a pixel corresponding to the location of the boundary region pixel may be selected from the subsequent frame as the subsequent frame reference pixel.

Furthermore, in the method of calculating a boundary value for the insertion of a virtual indirect advertisement according to the embodiment of the present invention, the boundary region pixel value is calculated using the pixel values of the foreground reference pixel and the background reference pixel and the weights of the foreground reference pixel and the background reference pixel at step S4740.

In this case, at step S4740, the boundary region pixel value may be calculated, as in Equation 2.

In this case, at step S4740, the weight of the foreground reference pixel may be set based on the distance between the boundary region pixel and the foreground reference pixel, and the weight of the background reference pixel may be set based on the distance between the boundary region pixel and the background reference pixel.

In this case, at step S4740, the weight of the foreground reference pixel and the background reference pixel may be set in inverse proportion to the distance from the boundary region pixel.

In this case, at step S4740, the weights may be set such that the sum of the weight of the foreground reference pixel and the weight of the background reference pixel becomes 1.

For example, at step S4740, when the distance between the boundary region pixel and the foreground reference pixel is 1 and the distance between the boundary region pixel and the background reference pixel is 3, the weight of the foreground reference pixel may be set to 0.75 and the weight of the background reference pixel may be set to 0.25.

As described above, in the method of calculating a boundary value for the insertion of a virtual indirect advertisement according to the present invention, the pixel value of the boundary region is newly calculated by referring to the pixel values of the background and the foreground, with respect to pixels surrounding the virtual indirect advertisement insertion boundary line, thereby enabling a virtual indirect advertisement insertion boundary surface to be naturally viewed.

In this case, at step S4740, the boundary region pixel value may be calculated using the pixel values of the previous frame reference pixel and the subsequent frame reference pixel and the weights of the previous frame reference pixel and the subsequent frame reference pixel.

In this case, at step S4740, the boundary region pixel value may be calculated, as in Equation 3.

In this case, at step S4740, the weights may be set such that the sum of the weight of the previous frame reference pixel, the weight of the subsequent frame reference pixel and the weight of the reference frame reference pixel becomes 1.

For example, at step S4740, when the distance between the boundary region pixel and the foreground reference pixel is 1 and the distance between the boundary region pixel and the background reference pixel is 3, the weight of the foreground reference pixel may be set to 0.75, the weight of the background reference pixel may be set to 0.25, the weight of the previous frame reference pixel may be set to 0.25, the weight of the subsequent frame reference pixel may be set to 0.25, and the weight of the reference frame reference pixel may be set to 0.5.

As described above, in the method of calculating a boundary value for the insertion of a virtual indirect advertisement according to the present invention, the pixel value of the current frame is newly calculated by referring to not only pixels surrounding the virtual indirect advertisement insertion boundary line but also the pixel values of the previous/subsequent frames, thereby enabling a virtual indirect advertisement insertion boundary surface to be naturally viewed during the playback of video.

Figure 39:
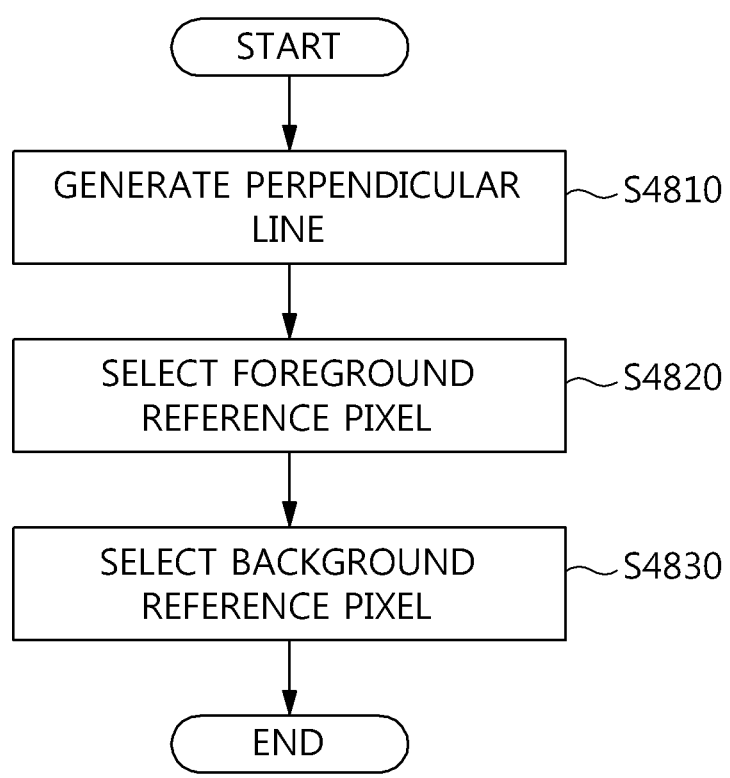
FIG. 39 is an operation flowchart showing an example of the step of selecting a foreground reference pixel and a background reference pixel, which is shown in FIG. 38.

FIG. 39 is an operation flowchart showing an example of step S4730 of selecting a foreground reference pixel and a background reference pixel, which is shown in FIG. 38.

Referring to FIG. 39, in step S4730, a perpendicular line may be drawn from a boundary region pixel to the boundary line of a foreground region at step S4810.

Furthermore, in step S4730, one of the pixels of the foreground region, corresponding to the foot of the perpendicular line, which is closest to a boundary region pixel, may be selected as a foreground reference pixel at step S4820.

Furthermore, in step S4730, one of the pixels of the background region, corresponding to the foot of the perpendicular line, which is closest to the boundary region pixel, may be selected as a background reference pixel at step 4830.

The steps shown in each of FIGS. 38 and 39 may be performed in the sequence shown in FIG. 38 or 39, in a sequence reverse to the former sequence, or concurrently.

The method of calculating a boundary value for the insertion of a virtual indirect advertisement according to the present invention may be implemented as a program or smart phone app that can be executed by various computer means. In this case, the program or smart phone app may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

The device and method for calculating a boundary value for the insertion of a virtual indirect advertisement according to the present invention are not limited to the configurations and methods of the above-described embodiments, but some or all of the embodiments may be configured to be selectively combined such that the embodiments can be modified in various manners.

INDUSTRIAL APPLICABILITY

According to the present invention, to insert an advertisement into a video, advertisement insertion target frames including advertisement insertion regions are searched for and clustered in order to insert the advertisement for all the frames in a uniform manner. In particular, when an increasing need for natural image insertion technology for virtual indirect advertising is considered, the utilization of the technology for inserting an advertisement using frame clustering according to the present invention will be high.

Furthermore, according to the present invention, candidate regions into which a virtual indirect advertisement will be inserted are determined, the exposure levels of the candidate regions are measured, and the measured exposure levels are provided to a user, thereby providing guide information so that the user can select a virtual indirect advertisement insertion region while more intuitively recognizing the advertising effects of the respective candidate regions. In particular, when the trend in which interest in virtual indirect advertising that increases an advertising effect by inserting an image of an advertising item into a drama or sports broadcast has been increasing in line with a recent increase in the scale of the advertising market is considered, the utilization of the technology for providing insertion region guide information for the insertion of an virtual indirect advertisement according to the present invention will be high.

Furthermore, according to the present invention, when markers are directly indicated at a shooting spot, a region into which a virtual indirect advertisement will be inserted is determined using the markers and then the markers are eliminated, a region from which the markers will be eliminated is limited to a region that does not overlap the region into which a virtual indirect advertisement will be inserted, and then inpainting is performed. In particular, when the trend in which interest in virtual indirect advertising that increases an advertising effect by inserting an image of an advertising item into a drama or sports broadcast has been increasing in line with a recent increase in the scale of the advertising market is considered, the utilization of the technology for eliminating markers for the insertion of an virtual indirect advertisement according to the present invention will be high.

Furthermore, according to the present invention, a virtual indirect advertisement can be inserted into video image content in place of an existing advertisement. In this case, inpainting must be performed on the region of the existing advertisement to harmonize with a surrounding image. A region on which inpainting will be performed can be minimized by comparing the region of the existing advertisement region with the region of the virtual indirect advertisement. Accordingly, the operation costs required for inpainting can be reduced, and the advertising profits from a virtual indirect advertisement can be maximized.

Furthermore, according to the present invention, the boundary region pixel value of a virtual indirect advertisement to be inserted into video image content is automatically calculated, and is processed such that a boundary line within which the virtual indirect advertisement has been inserted can harmonize with a surrounding image. In particular, when the trend in which interest in virtual indirect advertising that increases an advertising effect by inserting an image of an advertising item into a drama or sports broadcast has been increasing in line with a recent increase in the scale of the advertising market is considered, the utilization of the technology for calculating a boundary value for the insertion of an virtual indirect advertisement according to the present invention will be high.

The invention claimed is:

1. A device for inserting an advertisement, comprising:
a memory; and
a processor configured to execute instructions stored in the memory and to:
set an advertisement insertion region in at least one video frame of a plurality of successive video frames;
search for advertisement insertion target frames including advertisement insertion regions by at least predicting locations of the advertisement insertion regions using global movements in the plurality of successive video frames;
group the advertisement insertion target frames;
select an advertisement insertion target frame of a plurality of the advertisement insertion target frames having a widest advertisement insertion region as a reference frame;
stitching the advertisement insertion target frames other than the reference frame to the reference frame;
add an advertisement absent from the advertisement insertion target frames into an advertisement insertion region of the stitched reference frame by:
dividing the stitched reference frame into a structure image and a texture image,
generating a processed structure image by performing inpainting of the advertisement on the structure image so that a pixel proximate to a periphery of the advertisement insertion region diffuses into the advertisement insertion region along a line of an equal gray value,
generating a processed texture image by performing texture synthesis on the texture image, and
synthesizing the processed structure image with the processed texture image; and separate the stitched reference frame with the advertisement into a plurality of
advertisement insertion target frames inserted with the advertisement.

2. The device of claim 1, where the processor is further configured to stitch the advertisement insertion frames other than the reference frame to the reference frame by:
detecting a homography matrix for each of the advertisement insertion target frame other than the reference frame using feature points of each of the advertisement insertion target frames, and
applying the homography matrix to each of the advertisement insertion target frames other than the reference frame for stitching.

3. The device of claim 2, wherein the processor is further configured to separate the stitched reference frame inserted with the advertisement by applying inverse of the homography matrices to the stitched reference frame inserted with the advertisement.

4. The device of claim 1, wherein the processor is further configured to display the stitched reference frame.

5. The device of claim 1, wherein the structure image includes a shape, color or brightness of an object.

* * * * *